US008555352B2

(12) United States Patent  (10) Patent No.: US 8,555,352 B2
Moisand et al.  (45) Date of Patent: Oct. 8, 2013

(54) CONTROLLING ACCESS NODES WITH NETWORK TRANSPORT DEVICES WITHIN WIRELESS MOBILE NETWORKS

(75) Inventors: Jerome Moisand, Arlington, MA (US); Sanjay Wadhwa, Acton, MA (US); Dilip Pillaipakkamnatt, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 966 days.

(21) Appl. No.: 12/506,755

(22) Filed: Jul. 21, 2009

(65) Prior Publication Data

US 2009/0279701 A1  Nov. 12, 2009

Related U.S. Application Data

(63) Continuation-in-part of application No. 10/601,131, filed on Jun. 20, 2003, now Pat. No. 7,746,799.

(60) Provisional application No. 61/158,620, filed on Mar. 9, 2009.

(51) Int. Cl.
*G06F 17/30* (2006.01)

(52) U.S. Cl.
USPC .................................................. 726/5

(58) Field of Classification Search
USPC .................................................. 726/5
See application file for complete search history.

(56) References Cited

U.S. PATENT DOCUMENTS

| 6,055,571 | A | 4/2000 | Fulp et al. |
| 6,212,561 | B1 * | 4/2001 | Sitaraman et al. ............ 709/225 |
| 6,522,627 | B1 | 2/2003 | Mauger |
| 6,754,224 | B1 | 6/2004 | Murphy |
| 6,778,494 | B1 | 8/2004 | Mauger |
| 6,826,196 | B1 | 11/2004 | Lawrence |
| 6,937,596 | B2 * | 8/2005 | Sjolund et al. ................ 370/352 |
| 6,937,608 | B1 | 8/2005 | Deng |

(Continued)

FOREIGN PATENT DOCUMENTS

| EP | 1 134 932 A1 | 9/2001 |
| EP | 1 296 487 A2 | 3/2003 |

(Continued)

OTHER PUBLICATIONS

Office Action from Chinese patent application No. 200480023282.1, dated May 9, 2008, 2 pp.

(Continued)

*Primary Examiner* — Kambiz Zand
*Assistant Examiner* — Abiy Getachew
(74) *Attorney, Agent, or Firm* — Shumaker & Sieffert, P.A.

(57) ABSTRACT

A network controls provision of access functionality by an access node to provide a network service to a subscriber device. For example, the network device may control the queuing and forwarding of packets by the access node to facilitate packet transmission according to, for example, a Quality of Service class. The network device may send control messages to the access node to dynamically configure a control object stored by the access node, such as a Quality of Service profile. The network device may be a router, and the access node may be a base station that wireless communicates with a subscriber device, e.g., a cellular phone. The access node may then delivery the packets in accordance with the dynamically configured control object.

42 Claims, 21 Drawing Sheets

(56) References Cited

U.S. PATENT DOCUMENTS

| | | | |
|---|---|---|---|
| 6,947,418 B2 | 9/2005 | Boura et al. | |
| 6,996,110 B1 | 2/2006 | Amara et al. | |
| 7,023,838 B1* | 4/2006 | Hahn et al. | 370/352 |
| 7,245,614 B1* | 7/2007 | Podar et al. | 370/389 |
| 7,356,001 B1* | 4/2008 | Jones et al. | 370/331 |
| 7,613,188 B1 | 11/2009 | French et al. | |
| 8,121,124 B2* | 2/2012 | Baykal et al. | 370/390 |
| 2002/0010782 A1 | 1/2002 | Hoebeke et al. | |
| 2002/0026525 A1 | 2/2002 | Armitage | |
| 2002/0143951 A1 | 10/2002 | Khan et al. | |
| 2003/0081616 A1 | 5/2003 | Anders et al. | |
| 2003/0123453 A1 | 7/2003 | Ooghe et al. | |
| 2003/0126289 A1 | 7/2003 | Aggarwal et al. | |
| 2004/0068571 A1 | 4/2004 | Ahmavaara | |
| 2004/0090970 A1 | 5/2004 | Sanchez et al. | |
| 2004/0133700 A1 | 7/2004 | De Clercq et al. | |
| 2004/0258003 A1 | 12/2004 | Kokot et al. | |
| 2005/0152370 A1 | 7/2005 | Meehan et al. | |
| 2006/0187950 A1 | 8/2006 | Bou-Diab et al. | |
| 2007/0286090 A1 | 12/2007 | Rusmisel et al. | |
| 2007/0286204 A1 | 12/2007 | Ould-Brahim | |
| 2009/0010182 A1 | 1/2009 | Tochio | |
| 2009/0168783 A1 | 7/2009 | Mohan et al. | |

FOREIGN PATENT DOCUMENTS

| | | |
|---|---|---|
| EP | 1 318 628 A1 | 6/2003 |
| EP | 1 453 260 A1 | 9/2004 |
| EP | 1480405 A1 | 11/2004 |
| WO | WO 99 66736 A2 | 12/1999 |
| WO | WO 02 14979 A2 | 2/2002 |

OTHER PUBLICATIONS

"L2TP Multicast Extension" http://www.ietf.org/internet-drafts/draft-ietf-12tpext-mcast-03.txt Mar. 2003.
Ooghe, "Framework and Requirements for an Access Node Control Mechanism in Broadband Multi-Service Networks," May 2006, Network Working Group Internet-Draft (28 pgs.).
European Search Report for International Application No. PCT/EP2004/051184, Apr. 21, 2005, 2 pgs.
Wu et al., "Cisco Systems Router-port Group Management Protocol (RGMP)," Internet Draft, RFC 3488, Feb. 2003, pp. 1-17, XP002299262: p. 4, line 17-p. 6, last line.
Fenner., "Internet Group Management Protocol, Version 2," Internet Draft, RFC 2236, Nov. 30, 1997, XP002230720, p. 4, line 1-p. 6, line 8.
Wang et al. "IGMP Snooping: A VLAN-based multicast protocol," 5th IEEE International Conference on High Speed Networks and Multimedia communication, Jul. 3, 2002, pp. 335-340, XP010603050, p. 336, right-hand column, line 1-p. 337, left-hand column, line 25.
Aggarwal et al., "MPLS Upstream Label Assignment and Context Specific Label Space," Network Working Group Internet-Draft, Oct. 2005, 9 pp.
Wadhwa et al., "GSMP extensions for layer2 control (L2C) Topology Discovery and Line Configuration," Network Working Group Internet-Draft, Jan. 2006, 37 pp.
U.S. Appl. No. 11/621,409, entitled "Using Layer Two Control Protocol (L2CP) for Data Plane MPLS Within an L2 Network Access Node," filed Jan. 9, 2007.
U.S. Appl. No. 11/621,386, entitled "Layer Two (L2) Network Access Node Having Data Plane MPLS," filed Jan. 9, 2007.
Office Action for U.S. Appl. No. 11/621,386, dated Jun. 10, 2009, 14 pp.
Response to Office Action dated Jun. 10, 2009, in U.S. Appl. No. 11/621,386, filed Sep. 10, 2009, 14 pp.
Office Action for U.S. Appl. No. 11/621,386, dated Dec. 1, 2009, 16 pp.
Response to Office Action dated Dec. 1, 2009, in U.S. Appl. No. 11/621,386, filed Mar. 1, 2010, 15 pp.
Office Action for U.S. Appl. No. 11/621,409, dated Sep. 22, 2009, 17 pp.
Response to Office Action dated Sep. 22, 2009, for U.S. Appl. No. 11/621,409, filed Dec. 22, 2009, 12 pp.
Restriction Requirement for U.S. Appl. No. 10/601,131, dated Nov. 14, 2007, 7 pp.
Response to Restriction Requirement dated Nov. 14, 2007, for U.S. Appl. No. 10/601,131, filed Dec. 10, 2007, 2 pp.
Office Action for U.S. Appl. No. 10/601,131, dated Mar. 6, 2008, 27 pp.
Response to Office Action dated Mar. 6, 2008, for U.S. Appl. No. 10/601,131, filed Sep. 5, 2008, 27 pp.
Office Action for U.S. Appl. No. 10/601,131, dated Dec. 18, 2008, 19 pp.
Response to Office Action dated Dec. 18, 2008, for U.S. Appl. No. 10/601,131, filed Mar. 18, 2009, 21 pp.
Office Action for U.S. Appl. No. 10/601,131, dated Jul. 1, 2009, 10 pp.
Response to Office Action dated Jul. 1, 2009, for U.S. Appl. No. 10/601,131, filed Oct. 1, 2009, 18 pp.
Notice of Allowance for U.S. Appl. No. 10/601,131, dated Feb. 1, 2010, 8 pp.
Response to Office Action dated Apr. 20, 2010, for U.S. Appl. No. 11/621,386, filed Jul. 20, 2010, 18 pp.
Office Action from U.S. Appl. No. 11/621,386, dated Oct. 14, 2010, 23 pp.
Restriction Requirement for U.S. Appl. No. 11/068,523, dated Jul. 10, 2008, 5 pp.
Response to Restriction Requirement dated Jul. 10, 2008, for U.S. Appl. No. 11/068,523, filed Aug. 11, 2008, 1 pg.
Office Action from U.S. Appl. No. 11/068,523, dated Dec. 11, 2008, 27 pp.
Response to Office Action dated Dec. 11, 2008, for U.S. Appl. No. 11/068,523, filed Mar. 9, 2009, 17 pp.
Office Action from U.S. Appl. No. 11/068,523, dated Jul. 7, 2009, 26 pp.
Response to Office Action dated Jul. 7, 2009, for U.S. Appl. No. 11/068,523, filed Oct. 7, 2009, 18 pp.
Office Action from U.S. Appl. No. 11/068,523, dated Dec. 24, 2009, 38 pp.
Response to Office Action dated Dec. 24, 2009, for U.S. Appl. No. 11/068,523, filed Mar. 24, 2010, 14 pp.
Office Action from U.S. Appl. No. 11/621,409, dated Apr. 2, 2010, 16 pp.
Response to Office Action dated Apr. 2, 2010, for U.S. Appl. No. 11/621,409, filed Jun. 2, 2010, 13 pp.
Office Action from U.S. Appl. No. 11/621,386, dated Apr. 20, 2010, 20 pp.
Office Action from U.S. Appl. No. 11/621,409, dated Dec. 14, 2010, 13 pp.
Response to Office Action dated Dec. 14, 2010, from U.S. Appl. No. 11/621,409, filed Apr. 1, 2011, 16 pp.
Office Action from U.S. Appl. No. 11/068,523, dated Jan. 6, 2011, 9 pp.
Response to Office Action dated Jan. 6, 2011, from U.S. Appl. No. 11/068,523, filed Feb. 25, 2011, 12 pp.
Notice of Allowance from U.S. Appl. No. 11/068,523, mailed Mar. 28, 2011, 9 pp.
Non-Final Office Action from U.S. Appl. No. 12/825,054, dated Oct. 12, 2012, 14 pp.
Response to Final Office Action dated Feb. 25, 2013, from U.S. Appl. No. 12/825,054, filed May 28, 2013, 13 pp.
Response to Non-Final Office Action dated Oct. 12, 2012, from U.S. Appl. No. 12/825,054, filed Jan. 14, 2013, 14 pp.
International Search Report from European patent application No. PCT/EP2004/051184, dated Jan. 13, 2005, 5 pp.
European Office Communication from European patent application No. 04741850.4, dated May 18, 2006, 3 pp.
Response to European Office Communication dated May 18, 2006, from European patent application No. 04741850.4, filed Jan. 15, 2007, 23 pp.
Second European Office Communication from European patent application No. 04741850.4, dated Aug. 10, 2007, 4 pp.

Second Response to European Office Communication dated Aug. 10, 2007, from European patent application No. 04741850.4, filed Nov. 27, 2007, 13 pp.

Summons to Oral Proceedings form European patent application No. 04741850.4, dated May 26, 2009, 6 pp.

Statement on Grounds of Appeal from European patent application No. 04741850.4, dated Oct. 27, 2009, 7 pp.

Decision on Application from European patent application No. 04741850.4, dated Nov. 3, 2009, 17 pp.

Final Office Action from U.S. Appl. No. 12/825,054, dated Feb. 25, 2013, 17 pp.

\* cited by examiner

CONTROLLING ACCESS NODES WITH NETWORK TRANSPORT DEVICES WITHIN WIRELESS MOBILE NETWORKS

This application is continuation-in-part of application Ser. No. 10/601,131, filed Jun. 20, 2003, which is hereby incorporated by reference. This application also claims the benefit of U.S. Provisional Application No. 61/158,620, filed Mar. 9, 2009, which is also hereby incorporated by reference.

TECHNICAL FIELD

The invention relates to computer networks and, more particularly, to communications within a computer network.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within a network, referred to as routers, maintain routing information that describes available routes through the network. Each route defines a path between two locations on the network. Upon receiving an incoming data packet, the router examines header information within the packet to identify the destination for the packet. Based on the header information, the router accesses the routing information, selects an appropriate route for the packet and forwards the packet accordingly.

Network Service Providers (NSPs) provide services to subscribers via subscriber devices and routers maintained by the NSPs. Routers operate within the third layer, i.e., the network layer, of the Open Systems Interconnection (OSI) reference model, and typically communicate with each other using layer three protocols. As a result, routers are often referred to as network layer devices or layer three devices. Similarly, the functionality provided by routers that facilitates provision of Internet services is often referred to as network layer functionality. The routers maintained by NSPs and used by NSPs to provide services may be referred to as Service Edge (SE) routers. NSPs may use SE routers to provide these services that are differentiated on a per-subscriber basis.

For example, an NSP may allow subscribers to receive multicast streams on their respective subscriber devices. In order to allow subscribers to receive multicast streams, SE routers process requests from subscriber devices for the multicast streams, e.g., Internet Group Management Protocol (IGMP) host membership reports. To provide requested multicast streams, the SE routers must replicate and forward packets of a multicast stream for each subscriber device that has requested the multicast stream. Replication of multicast streams on a per-subscriber basis consumes significant processing and memory resources of the routers, as well as bandwidth on the outbound network links from the routers.

The NSP may also provide service profiles for subscribers that differ from subscriber to subscriber. Each service profile may include, for example, one or more Quality of Service (QoS) classes for packets originating from or destined for the associated subscriber device. A QoS class may define a bandwidth allocation and burst size to support a level of communication throughput for subscriber devices within that QoS class. Further, the NSP may provide a QoS class for subscribers for certain packet flows on request, such as unicast packet flows associated with a Voice over Internet Protocol (VoIP) call. In order to enable throughput according to QoS class indicated in a service profile for a subscriber or requested by a subscriber for a packet flow, routers maintained by NSPs may forward packets originating from or destined for the subscriber on particular packet flows through a network, which may be designated for the QoS class and engineered to support the throughput, e.g., provide the bandwidth, associated with the QoS class.

SUMMARY

In general, the invention is directed to techniques that allow a network layer device, such as a router, of a transport network to control functionality of a data link layer device in order to provide a requested service to a subscriber. The data link layer device may comprise a wireless access node or device of a wireless access network that operates primarily within a data link layer of the Open Systems Interconnection (OSI) reference model, i.e., the second layer of the OSI reference model. In the context of wireless access networks, such as a cellular network, the wireless access node may be referred to as a "base station." The base station may communicate wirelessly with subscriber devices, such as a cellular phone or other mobile device. The router may generate and forward control messages to the base station, where the control messages dynamically configure control objects maintained by the base station. The base station may then deliver a requested service to a subscriber in accordance with the dynamically configured control object.

The router may generate and forward the control message in accordance with an Access Node Control Protocol (ANCP). As described below, ANCP defines a standard protocol for communicating between access networks, such as the above wireless access network, and a transport network. Access networks typically include data link layer devices, e.g., access nodes, by which to interface with subscriber devices. Transport networks commonly include network layer devices, e.g., routers, by which to transport large amounts of packets to each packet's intended destination. ANCP may therefore enable each of the access and transport networks to operate independent of one another but still communicate with each other via the standard inter-network interface defined by ANCP. The ANCP inter-network interface may be extensible to account for different control messages for different contexts, such as the wireless context described herein. In this respect, ANCP may adapt to any type of access and transport network and may promote a standardized or general purpose inter-network interface.

In operation, a router of a transport network, such as those maintained by network service providers, may receive a request to provide a service to a subscriber device. For example, the request may request a Voice over Internet Protocol (VoIP) service, a web-conference service, a IP Television (IPTV) service, a multicast service, a streaming video service or any other type of service commonly provided by a network service provider.

In response to the request, the router accesses a subscriber context associated with the subscriber device. The subscriber context defines information for providing the service to the subscriber device, such as a level or quality of service, encryption keys, address information, multicast group memberships, and charging and accounting information to account for the services provided to the particular subscriber device. The router may, for example, access the subscriber context to retrieve a quality of service (QoS) class contracted by the subscriber device for particular flows associated with a particular application, e.g., VoIP.

Based on the information defined within the subscriber context, e.g., the QoS class, the router generates a control message in accordance with ANCP. Next, the router forwards the control message to the base station to dynamically configure a control object, e.g., list or other information, maintained by the base station in accordance with the subscriber context to facilitate packet transmission for the subscriber device between the base station and the router. In other words, the base station may maintain the control object such that another layer three network device (i.e., a network layer device) may, via control messages issued in accordance with ANCP, dynamically configure these control objects to control how the base station delivers services for the particular subscriber device.

As an example, the router may maintain a subscriber context defining a first QoS class for a first application, e.g., VoIP, and a second QoS class different from the first QoS class for a second application, e.g., Hyper-Text Transfer Protocol (HTTP). The router may receive a service request to which the subscriber context corresponds. The request may request a data service for HTTP content, e.g., a web page. The router may access the subscriber context and determine that the subscriber device has contracted with the network service provider such that the network service provider agrees to provide HTTP content in accordance with the second QoS class. The router may then parse the subscriber context to retrieve information defining the second QoS class.

Based on this information, the router may generate a control message that defines the second QoS class, the subscriber device and one or more flows to which the second QoS class is associated, e.g., the flows responsible for delivering the HTTP content. The router may forward this message to the base station, which proceeds to update a QoS profile or service profile based on the control message. This control object, e.g., the QoS profile or service profile, may represent a list, table, or other data structure that the base station maintains to enable this form of remote dynamic control by the router. The base station may then receive HTTP content from the router, perform a lookup of the control object to determine the HTTP content receives the second QoS class, and forward this HTTP content according to the second QoS class. Likewise, the base station may receive via a wireless signal from the subscriber device other HTTP requests or content, perform the lookup of the control object to resolve the forwarding treatment as the second QoS class, and forward this subscriber device originated traffic in accordance with the second QoS class. IN this manner, the router may issue control messages that dynamically configure a control object maintained by the base station in order to facilitate packet transmission for the subscriber device between the base station and the router.

While described above with respect to a router dynamically controlling a base station, ANCP may also provide for update messages from the base station to the router. In this respect, ANCP may represent a "two-way" protocol that permits the base station to issue update messages that keep the router apprised of wireless communications between the base station and the subscriber device. For example, the base station may monitor the wireless signals received from the subscriber device and determine metrics describing a status of the wireless signals, such as an attenuation level, a signal-to-noise level, a signal strength or any other commonly determined metric. Based on these metrics, the base station may determine whether the wireless signal has changed.

To illustrate, a subscriber device may move from a cell serviced by the base station to an adjacent cell serviced by another base station. This event is referred to as a "micro-mobility" event. The current base station may detect this change by monitoring a location and attenuation level of the wireless signals. Upon detecting a rise in attenuation and movement away from the current base station to the adjacent base station, the current base station may generate an update message signaling the micro-mobility event. The base station may then forward the micro-mobility update message to the router, which may utilize this update message to establish communications with the adjacent base station in preparation for the handover of the wireless signal from the current base station to the adjacent base station. In this manner, the base station may monitor the wireless signal and issue update messages to apprise the router of changes to the wireless signals.

As another example, the base station may monitor the wireless signal to determine the state of the wireless signal by, as described above, determining metrics descriptive of the signal. If the attenuation level increases due to rain, obstacles or other conditions, the base station may generate a status update message that indicates the increased attenuation level and forward this update message to the router. The router may receive this update message and update its forwarding table and subscriber context to account for the increased attenuation level. In other words, the router may utilize the status update message to adapt forwarding to overcome or account for the increased attenuation level and thereby assure the contracted for QoS class.

In one embodiment, a method comprises receiving, with a network device of a packet-based transport network, a request to provide a service to a subscriber device via an access node of a access network, wherein the subscriber device communicates wirelessly with the access node and accessing, with the network device, a subscriber context associated with the subscriber device in response to receiving the request, wherein the subscriber context defines information for providing the service to the subscriber device. The method also comprises generating, with the network device, a control message based on the information defined within the subscriber context and forwarding, with the network device, the control message to the access node to dynamically configure a control object maintained by the access node in accordance with the subscriber context to facilitate packet transmission between the subscriber device and the network device through the access node.

In another embodiment, a method comprises receiving, with an access node of an access network, wireless signals from a subscriber device, monitoring, with the access node, the wireless signals to detect a change in wireless communication between the access node and the subscriber device, generating, with the access node, an update message in response to detecting the change in the wireless communication between the access node and the subscriber device, and forwarding, with the access node, the update message to a network device of a transport network so as to facilitate delivery of packets by the network device for a service associated with the subscriber device.

In another embodiment, a router included within a transport network comprises at least one interface card that receives a request to provide a service to a subscriber device via an access node of an access network, wherein the subscriber device communicates wirelessly with the access node and a control unit that accesses a subscriber context associated with the subscriber device in response to receiving the request, wherein the subscriber context defines information for providing the service to the subscriber device, and generates a control message based on the information defined within the subscriber context. The at least one interface card further forwards the control message to the access node to dynamically configure a control object maintained by the access node in accordance with the subscriber context to facilitate packet transmission between the subscriber device and the network device through the access node.

In another embodiment, a base station included within a wireless access network comprises at least one wireless interface that receives wireless signals from a subscriber device, a control unit that monitors the wireless signals to detect a change in wireless communication between the access node and the subscriber device and generates an update message in response to detecting the change in the wireless communication between the access node and the subscriber device, and at least one interface card that forwards the update message to a network layer device of a transport network so as to facilitate delivery of packets by the network device for a service associated with the subscriber device.

In another embodiment, a network system comprises a transport network that includes a router, and an access network that includes a base station for wirelessly communicating with a mobile subscriber device. The router comprises a first interface card that receives a request to provide a service to the mobile subscriber device via the base station of the access network and a first control unit that accesses a subscriber context associated with the mobile subscriber device in response to receiving the request, wherein the subscriber context defines information for providing the service to the subscriber device, and generates a control message based on the information defined within the subscriber context, wherein the first interface card forwards the control message to the base station. The base station comprises a second interface card that receives the control message from the router, a second control unit that stores a control object and, in response to receiving the control message, dynamically configures the control object in accordance with the subscriber context to facilitate packet transmission for the service associated with the subscriber device between the subscriber device and the router through the base station, and at least one wireless interface that receives wireless signals from the subscriber device that define packets. The second interface card further forwards the packets in accordance with the dynamically configured control object to the router.

In another embodiment, a computer-readable storage medium comprising instructions that cause a programmable processor to receive, with a network layer device of a packet-based transport network, a request to provide a service to a subscriber device via an access node of an access network, wherein the subscriber device communicates wirelessly with the access node, access, with the network device, a subscriber context associated with the subscriber device in response to receiving the request, wherein the subscriber context defines information for providing the service to the subscriber device, generate, with the network device, a control message based on the information defined within the subscriber context, and forward, with the network device, the control message to the access node to dynamically configure a control object maintained by the access node in accordance with the subscriber context to facilitate packet transmission between the subscriber device and the network device through the access node.

In another embodiment, a computer-readable storage medium comprising instructions that cause a programmable processor to receive, with an access node of an access network, wireless signals from a subscriber device, monitor, with the access node, the wireless signals to detect a change in wireless communication between the access node and the subscriber device, generate, with the access node, an update message in response to detecting the change in the wireless communication between the access node and the subscriber device, and forward, with the access node, the update message to a network device of a transport network so as to facilitate delivery of packets by the network device for a service associated with the subscriber device.

The invention may provide one or more advantages. In general, by controlling the provision of data link layer functionality by a data link layer device, a network layer device may enhance the provision of multimedia services to subscribers, and/or reduce the burden associated with providing these services from the perspective of the NSP or the network layer device.

For example, by controlling the performance of multicast elaboration by a data link layer device, the network layer device is able to provide multicast streams to subscriber devices while only replicating the streams on a per-switch or per access node basis. Consequently, the network layer device may have a reduced processing burden associated with providing multicast streams when compared to conventional network devices, and may consume less bandwidth on the media that couple the network device to data link layer devices. Further, by differentiating the manner in which premium and non-premium streams are replicated and forwarded to subscribers, e.g., delivering premium multicast streams on a per data link layer device basis and to data link layer devices via dedicated paths, the network layer device may facilitate provision of premium streams with a greater QoS than non-premium streams.

As another example, by controlling data link layer device to facilitate transmission of packets according to a Quality of Service class for particular packet flows, or according to general Quality of Service class a indicated by subscriber service profiles, a network layer device may improve the overall Quality of Service provided to subscribers. Further, by providing subscriber service profile information to data link layer devices, a network layer device may streamline the processes of initializing a multimedia service account.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
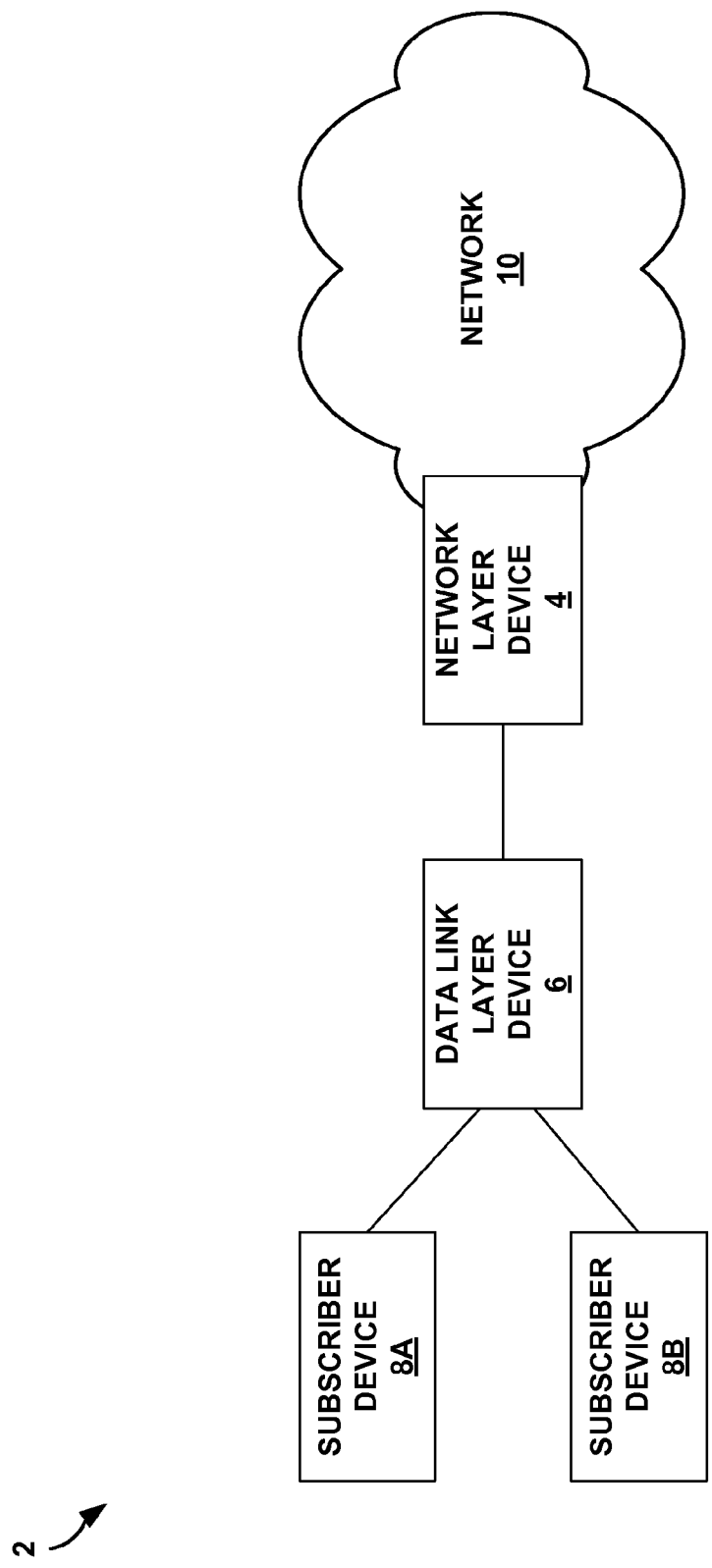
FIG. 1 is a block diagram illustrating an example multimedia networking environment in which a network layer device controls provision of data link layer functionality by a data link layer device consistent with the principles of the invention.

FIG. 1 is a block diagram illustrating an example multimedia networking environment 2 in which a network layer device 4 controls provision of data link layer functionality by a data link layer device 6 consistent with the principles of the invention. Network layer device 4 is a device, such as a router, that operates within the third layer, i.e., the network layer, of the Open Systems Interconnection (OSI) reference model. Data link layer device 6 is a device, such as a switch, an access multiplexer or a customer premises equipment (CPE) device, that operates within the second layer of the OSI reference model, i.e., the data link layer. CPE devices may be, for example, modems, wireless access points, or switches.

Network layer device 4 and data link layer device 6 may, as shown FIG. 1, couple subscriber devices 8A and 8B (collectively "subscriber devices 8") to a network 10. For exemplary purposes, network 10 is described in reference to a packet-based network, such as the Internet. Network 10 may include a number of autonomous systems (not shown), each of which include a variety of devices, such as routers and switches (not shown), to route packets across network 10. In particular, network 10 includes an autonomous system associated with a Network Service Provider (NSP) that provides multimedia services to subscribers associated with subscriber devices 8, i.e., a provider network.

The NSP maintains network layer device 4 to provide subscriber devices 8 with access to network 10, and to provide multimedia services to the subscribers via subscriber devices 8. Consequently, where network layer device 4 is a router, network layer device 4 may be referred to as a "service edge" (SE) router. Network layer device 4 may act as a Broadband Remote Access Server (B-RAS) for subscriber devices 8. Subscriber devices 8 may be, for example, personal computers, servers, laptop computers, personal digital assistants (PDAs), or network-enabled appliances, such as digital television set-top boxes.

In accordance with the principles of the invention, network layer device 4 sends control messages to data link layer device 6 to control the provision of data link layer functionality by data link layer device 6. The control messages contain information used by data link layer device 6 to dynamically update a control object maintained by data link layer device 6, which controls the provision of data link layer functionality by data link layer device 6. The control messages may be "in-band," so that they are more quickly processed by data link layer device 6. For example, the control messages may be conform to a network layer protocol, e.g., packets communicated via the Internet Protocol (IP).

The invention may be applied in a variety of environments and with a variety of types of data link layer devices 6. For example, as described above, data link layer device 6 may a switch or a CPE device. The invention may be applied in, for example, Digital Subscriber Line (DSL) or broadband cable environments, and data link layer device 6 may be a Digital Subscriber Line Access Module (DSLAM) or a Cable Modem Termination System (CMTS). In such embodiments, communication between network layer device 4, data link layer device 6, and subscriber devices 8 may be via Asynchronous Transfer Mode (ATM) Virtual Circuits (VCs), or a combination of ATM VCs and Virtual Local Area Networks (VLANs).

In other embodiments, data link layer device 6 may be an Ethernet Bridge, and communication between network layer device 4, data link layer device 6, and subscriber devices 8 may be via Ethernet frames in accordance with the IEEE 802.3 family of standards. In some embodiments, as will be described in greater detail below, the content of the control messages sent from network layer device 4 to data link layer device 6, and of the information maintained by network layer device 4 and data link layer device 6 to provide network layer functionality, may vary depending on the environment in which the invention is applied. For example, the content of the messages and information may vary based on the type of data link layer device 6 and mode of communication used by network layer device 4, data link layer device 6, and subscriber devices 8.

The NSP uses network layer device 4 to provide a variety of multimedia services to the subscribers associated with subscriber devices 8. For example, the NSP may allow the subscribers to receive multicast streams on subscriber devices 8 via network layer device 4. The NSP may also use network layer device 4 to provide packet transmission according to a Quality of Service (QoS) class for particular unicast packet flows, such as Voice over IP (VoIP) calls, for the subscribers. As another example, the NSP may use network layer device 4 to manage service profiles that vary from subscriber to subscriber. A service profile may define a one or more general QoS classes for all inbound or outbound packet traffic for a particular customer.

By controlling data link layer device 6, network layer device 4 may enhance these services, and/or reduce the burden associated with providing these services from the perspective of the NSP or network layer device 4. For example, network layer device 4 may control the performance of multicast elaboration by data link layer device 6, reducing the burden of delivering multicast streams to subscriber devices 8. As another example, network layer device 4 may control packet forwarding by data link layer device 6 to facilitate a QoS class for particular packet flows, or a general QoS class consistent with respective subscriber profiles. By controlling data link layer device 6 to facilitate QoS classes, the overall QoS provided to subscribers may be improved.

Figure 2:
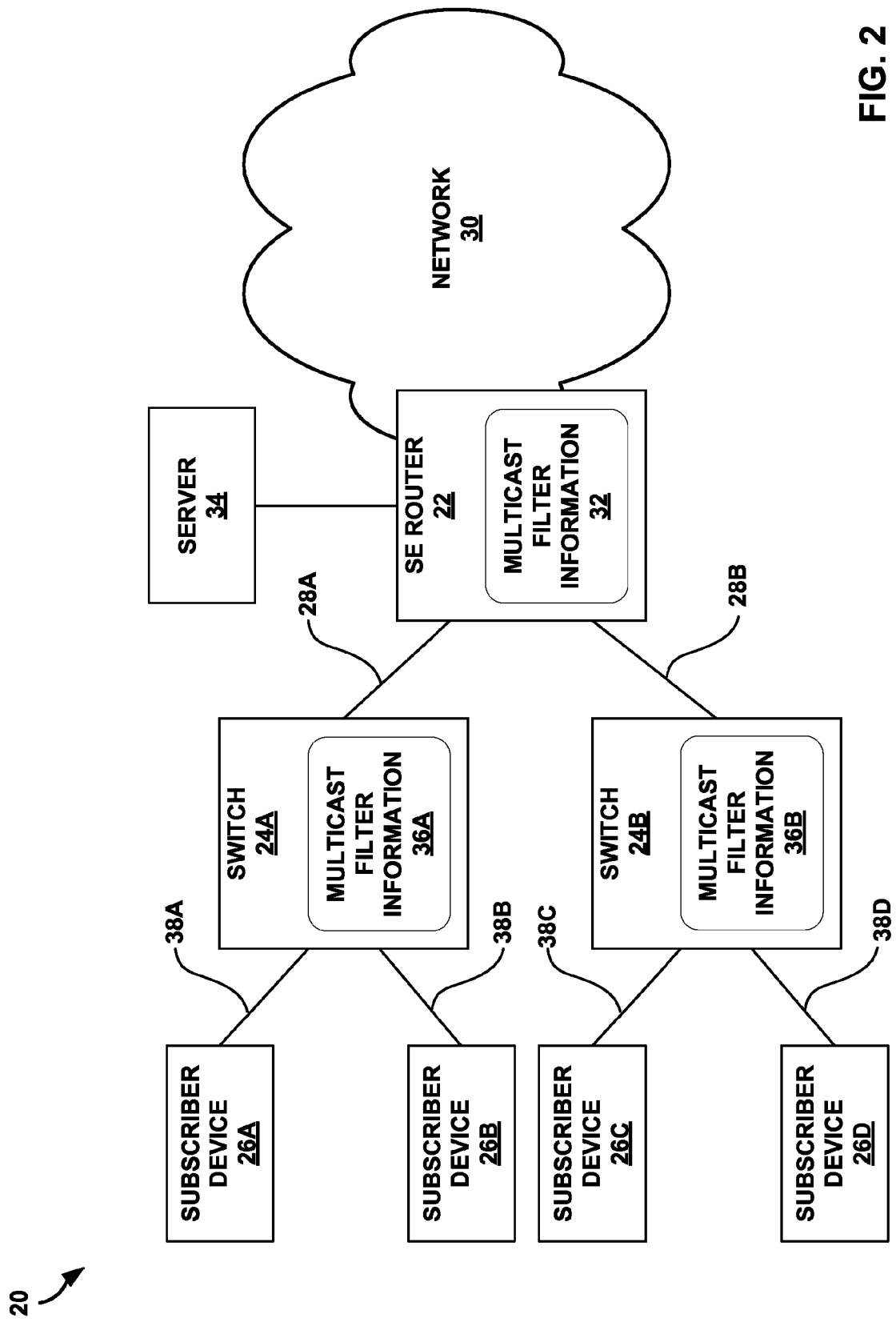
FIG. 2 is a block diagram illustrating an example multimedia networking environment in which a service edge router controls the performance of multicast elaboration by data link layer devices consistent with the principles of the invention.

FIG. 2 is a block diagram illustrating an example multimedia networking environment 20 in which an SE router 22 controls the performance of multicast elaboration by switches 24A and 24B (collectively "switches 24") consistent with the principles of the invention. Multicast elaboration includes the replication and forwarding of multicast packets. Multicasting, including multicast elaboration, is typically performed in accordance with IP multicasting protocols by devices, such as SE router 22, that operate within network layer of the OSI reference model.

Switches 24 operate within the second layer of the OSI reference model, i.e., the data link layer. Conventional switches do not process IP multicast control packets, i.e. Internet Group Management Protocol (IGMP) membership report packets. Further, conventional data link layer switches, although capable of performing multicast elaboration, typically do not perform multicast elaboration for the provision of multicast streams in a multimedia networking environment. Consequently, a conventional SE router that provides a multicast stream to multiple subscribers must replicate the stream for each subscriber.

By controlling the performance of multicast elaboration by switches 24 consistent with the principles of the invention, SE router 22 is able to provide multicast streams to subscriber devices 26A-D (collectively "subscriber devices 26") while only replicating the streams on a per-switch basis. Consequently, SE router 22 may have a reduced processing burden associated with providing multicast streams when compared to conventional SE routers. Further, SE router 22 may consume less bandwidth on the media 28A and 28B (collectively "media 28") that couple SE router 22 to switches 24 while providing multicasting streams than a conventional SE router would consume.

As illustrated in FIG. 2, SE router 22 is a router within a computer network 30. Network 30 is a packet-based network, such as the Internet. Network 30 may include a number of autonomous systems (not shown), and devices, such as additional routers and switches (not shown), to route packets across network 30. Network 30 includes an autonomous system (not shown) associated with a Network Service Provider (NSP) that maintains SE router 22, i.e., a provider network.

The NSP provides multimedia services to subscribers associated with subscriber devices 26 via SE router 22. For example, the NSP makes multicast streams available to the subscribers, and the subscribers receive requested multicast streams on their associated subscriber devices 26. Subscriber devices 26 may be, for example, personal computers, laptop computers, handheld computers, or television set-top boxes. Multicast streams may include, for example, video, audio, data, or any combination thereof.

SE router 22 maintains multicast filter information 32 that describes how received multicast packets should be replicated and forwarded to one or more of subscriber devices 26. SE router 22 updates multicast filter information based on messages received from subscriber devices 26 that indicate a desire to join or leave multicast groups, i.e., to receive or stop receiving multicast streams. For example, when a subscriber associated with subscriber device 26A requests a multicast stream, subscriber device 26A sends a multicast join message, e.g. an IGMP host membership report requesting membership in the multicast group associated with the requested multicast stream, to a neighboring router, i.e., SE router 22. As a data link layer device, switch 24A forwards the join message to SE router 22 without processing the join message.

SE router may act as a B-RAS for subscriber devices 26. Consequently, SE router 22 may authenticate the subscriber associated with subscriber device 26A, and determine whether the subscriber is authorized to receive the multicast stream. A server 34 available on network 30 may store information identifying subscribers and indicating what multicast streams the subscribers are authorized to receive. When a subscriber associated with one of subscriber devices 26 logs on or otherwise activates its multimedia service account, SE router 22 may query server 34 to authenticate the subscriber and receive authorization information for the subscriber. Server 34 may, for example, be a Remote Authentication Dial-In User Service (RADIUS) server.

When SE router 22 receives a multicast join/leave message from one of subscriber devices 26, SE router 22 accesses the authentication and authorization information to verify that the user is authenticated and authorized to receive the requested multicast stream, SE router 22 updates multicast filter information 32 to indicate that the requested multicast stream is to be replicated and forwarded to subscriber device 26A. Because SE router 22 controls the performance of multicast elaboration by switches 24, SE router 22, as discussed above, need only replicate multicast streams on a per-switch basis. Thus, SE router 22 determines whether multicast filter information 32 indicates that the associated multicast stream is currently forwarded to switch 24A, i.e., if subscriber device 26B is currently receiving the requested multicast stream, and if not, updates multicast elaboration information 32 to indicate that the associated multicast stream is to be forwarded to switch 24A. If SE router 22 is not currently receiving the requested multicast stream, SE router may send a Protocol Independent Multicast (PIM) join message to a neighboring, e.g., next-hop, router requesting the multicast stream.

In order to perform multicast elaboration, each of switches 24A and 24B maintains multicast filter information 36A and 36B, respectively, that describes how received multicast packets, or more particularly the data link layer frames or cells containing such multicast packets, should be replicated and forwarded to one or more of subscriber devices 26. Switches 24 dynamically configure multicast filter information 36 based on control messages received from SE router 22. For example, when SE router 22 receives the message from subscriber device 26A requesting the multicast stream and updates multicast filter information 32 as discussed above, SE router 22 will also send a control message to switch 24A indicating that subscriber device 26A is to receive the multicast stream.

Based on the control message, switch 24A will dynamically configure multicast filter information 36A to indicate that the frames or cells containing packets for the multicast received from SE router 22 are to be replicated and forwarded to subscriber device 26A. The control messages may be IP packets transmitted within data link layer frames or cells. The control messages may be in-band control messages, allowing the messages to be quickly received and processed by switches 26.

Media 38A-D (collectively "media 38") that couple switches 24 to subscriber devices 26 may be Digital Subscriber Lines (DSLs), and switches 24 may take the form of DSLAMs. Media 28 that couple switches 24 to SE router 22 may be, for example, take the form of optical links complying with the Synchronous Optical Network (SONET) or Synchronous Digital Hierarchy (SDH) standards.

In such embodiments, communication between SE router 22, switches 24, and subscriber devices 26 may be according to any of a number of data link layer communication modes. For example, communication between SE router 22, switches 24, and subscriber devices 26 may be according to ATM. Each of subscriber devices 26 may send ATM cells to and receive ATM cells from its respective switch 24 via one or more ATM VCs, and each of switches 24 may send ATM cells to and receive ATM cells from SE router 22 via one or more VCs. The VCs may include VCs dedicated to transmission of cells containing unicast packet traffic, and VCs dedicated to transmission of cells containing multicast packet traffic. A VC dedicated to communication of control messages to cause switches to perform multicast elaboration as described above may be established between SE router 22 and each of switches 24.

In some embodiments where switches 24 are DSLAMs, media 28 may take the form of optical fiber that supports Gigabyte Ethernet (G-Eth) communication as specified in the IEEE 802.3 family of standards. In such embodiments, instead of ATM cells and VCCs, switches 24 may send frames to and receive frames from SE router 22 via one or more VLANs established between switches 24 and SE router 22. The VLANs may include VLANs dedicated to transmission of frames containing unicast packet traffic, and VLANs dedicated to transmission of frames containing multicast packet traffic. A VLAN dedicated to communication of control messages to cause switches to perform multicast elaboration as described above may be established between SE router 22 and each of switches 24.

In some embodiments, switches 24 are Ethernet bridges. In such embodiments, media 28 may support G-Eth communication, and media 38 may support Metro Ethernet communication as specified in the IEEE 802.3 family of standards. In such embodiments, SE router 22, switches 24 and subscriber devices 26 may send, receive and/or forward IP packet traffic within frames according to the IEEE 802.3 family of standards.

In other embodiments, media 38 takes the form of coaxial cable, and switches 24 take the form of a CMTS. In such an embodiment, communication between SE router 22, switches 24 and subscriber devices 26 may be via ATM VCCs, in accordance with the Data Over Cable Service Interface Specifications (DOCSIS). As will be described in greater detail below, the content of control messages used by SE router 22 to cause switches 24 to perform multicast elaboration and multicast filter information 32 and 36 maintained by SE router 22 and switches 24 depends of the type of switches 24, i.e. DSLAM, Ethernet bridge, CMTS, and the data link layer communication mode or modes employed by SE router 22, switches 24 and subscriber devices 26, i.e., ATM VCs, VLANs, or communication according to the IEEE 802.3 family of standards.

In some embodiments, SE router 22 may be used by the NSP to provide some multicast streams to all subscribers associated with subscriber devices 26, and other, premium multicast streams to only to subscribers to a premium service. In such embodiments, as will be described in greater detail below, SE router 22 may maintain information classifying multicast streams as either premium or non-premium, and information indicating whether subscribers are authorized to receive premium multicast streams. Upon receiving a multicasting join message requesting a multicast stream from one of subscriber devices 26, SE router 22 may determine whether the requested stream is a premium or non-premium, and whether the subscriber associated with the requesting one of subscriber devices 26 is authorized to receive the requested stream.

In such embodiments, SE router 22 may handle the replication and forwarding of packets for premium multicast streams differently than for non-premium multicast streams. For example, the SE router 22 may replicate and forward non-premium multicast streams on a per subscriber basis, and premium multicast streams on a per switch basis, e.g. control the performance of multicast elaboration by switches 24 as described above. Further, the premium multicast streams may be delivered to switches 24 on dedicated VCs or VLANs, while all non-premium streams are delivered to switches 24 on VCs or VLANs shared with unicast packet traffic.

The configuration of network environment 20 illustrated in FIG. 2 is merely exemplary. For example, SE router 22 may be coupled to any number of switches 24. Further, switches 24 may each be coupled to any number of subscriber devices 26. Additionally, although not illustrated in FIG. 2, one or more of subscriber devices 26 may be coupled to one of switches 24 via one or more CPE devices, such as one or more modems, wireless access points, or switches.

Figure 3:
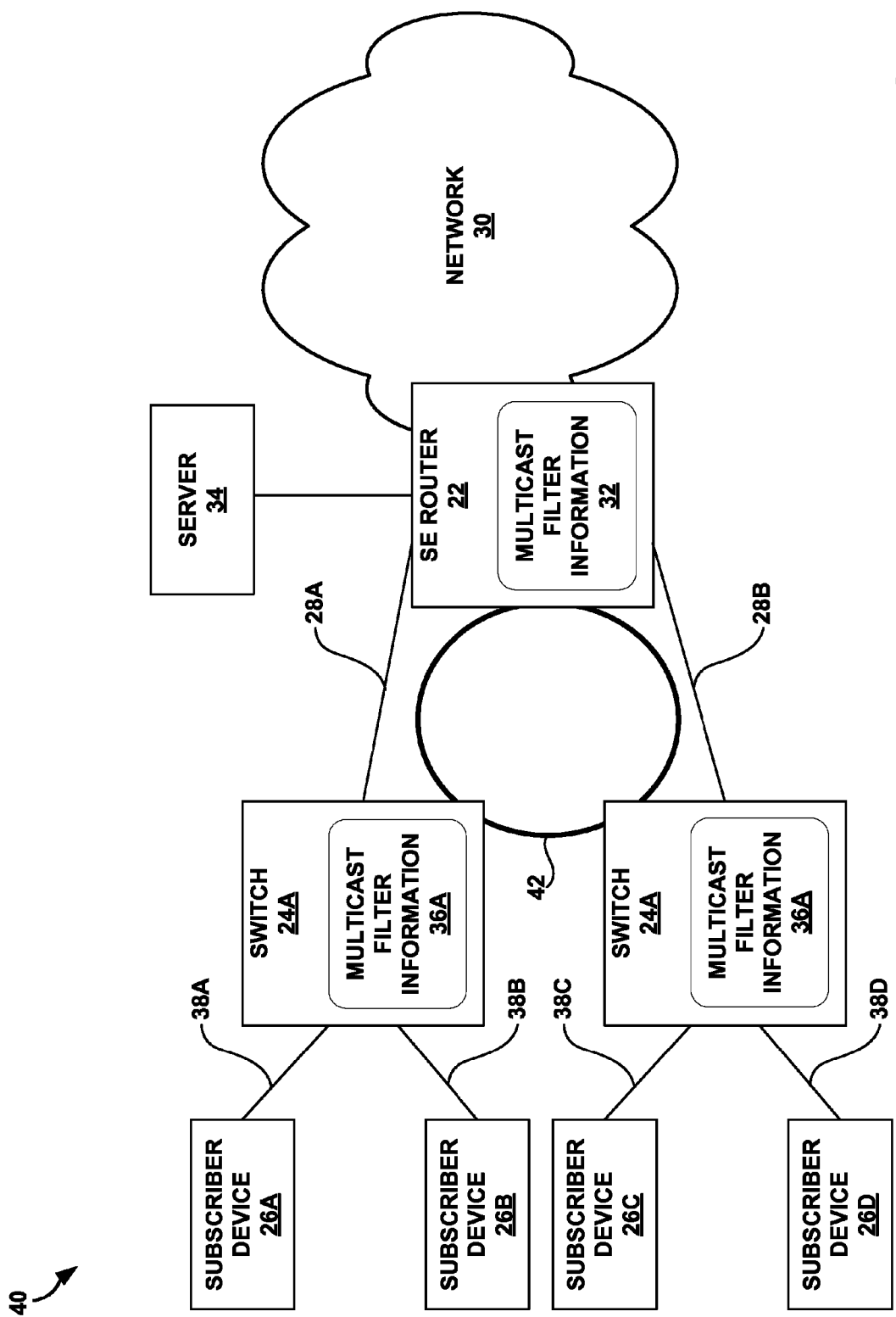
FIG. 3 is a block diagram illustrating another example networking environment in which a service edge router controls the performance of multicast elaboration by data link layer devices consistent with the principles of the invention.

FIG. 3 is a block diagram illustrating another example networking environment 40 in which SE router 22 controls the performance of multicast elaboration by switches 24 consistent with the principles of the invention. In the illustrated example environment, SE router 22 and switches 24 are coupled in a ring topology via an additional medium 42. Medium 42 may be an optical link complying with the SONET or SDH standards. Communication between SE router 22 and switches 24 on medium 42 may be, for example, via one or more ATM VCs or VLANs. Communication on medium 42 may be unidirectional.

Medium 42 is used by SE router 22 to forward multicast traffic to switches 24. Use of medium 42 to forward multicast traffic allows SE router 22 to forward a single copy of each multicast stream currently requested by one of subscriber devices 26, rather than replicating the streams on a per-switch basis. Switches 24 forward cells or frames received on medium 42 that contain multicast packets to one or more of subscriber devices 26 based on multicast elaboration information 36, and also forward the cells or frames along the ring formed by medium 42. If none of the subscriber devices 26 coupled to one of the switches 24 is receiving the multicast stream associated with a received cell or frame, that switch 24 forwards the cell or frame on medium 42.

Figure 4:
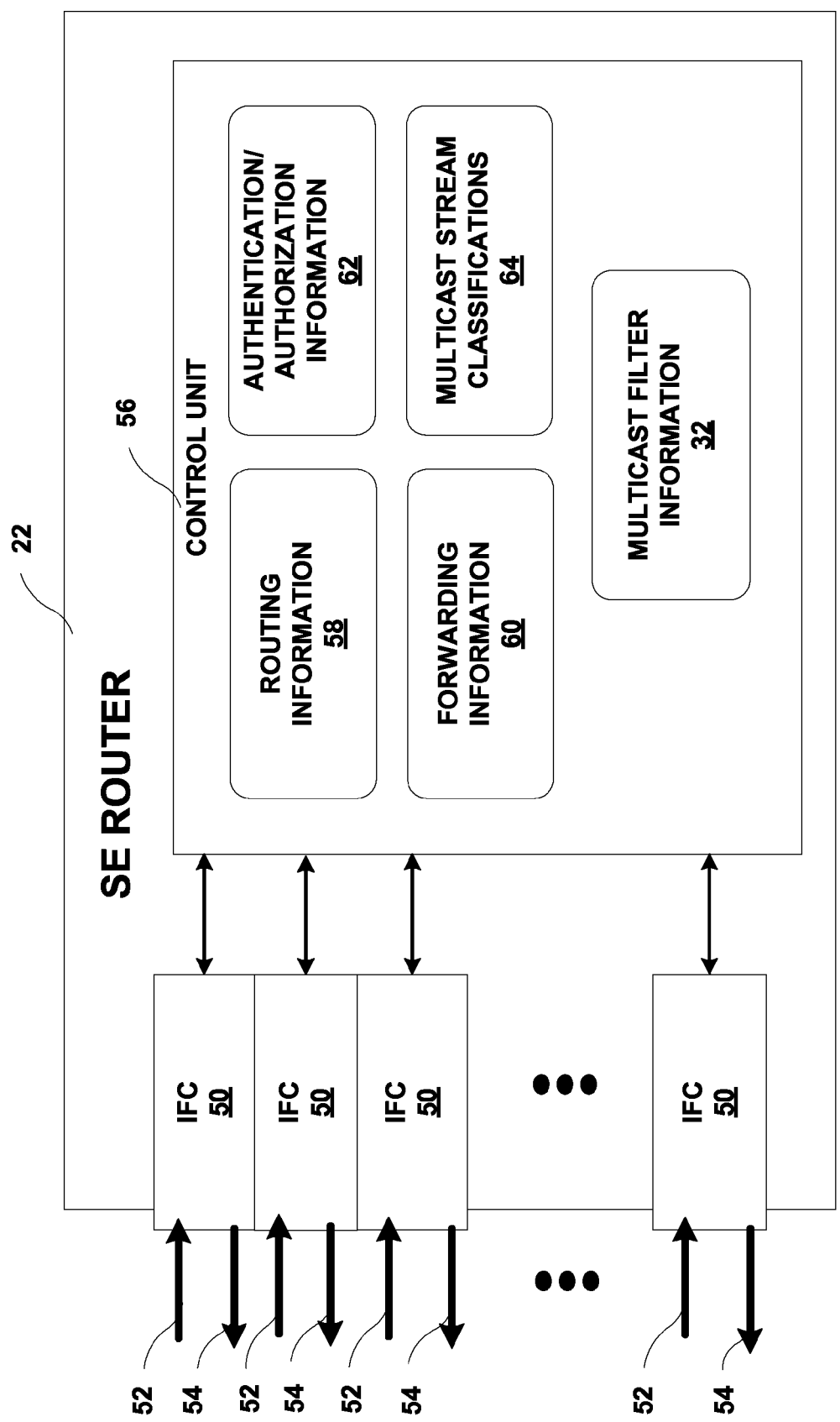
FIG. 4 is a block diagram illustrating an example service edge router that controls the performance of multicast elaboration by data link layer devices.

FIG. 4 is a block diagram further illustrating SE router 22. SE router 22 includes interface cards 50A-50N ("IFCs 50") that receive and send packet flows via network links 52 and 54, respectively. IFCs 50 are typically coupled to network links 52, 54 via a number of interface ports (not shown). SE router 22 may include a chassis (not shown) having a number of slots for receiving a set of cards, including IFCs 50. Each card may be inserted into a corresponding slot of a chassis for electrically coupling the card to a control unit 56 via a bus, backplane, or other electrical communication mechanism.

In general, SE router 22 receives inbound packets from network links 52, determines destinations for the received packets, and outputs the packets on network links 54 based on the destinations. More specifically, upon receiving an inbound packet via one of inbound links 52, a respective one of IFCs 50 relays the packet to control unit 56. In response, control unit 56 reads a block of data from the packet, referred to as the "key," which may include an IP address of the destination for the packet, and forwards the packet based on the key.

SE router 22 maintains routing information 58 that describes the topology of network 30, i.e., the routes through network 30. SE router 22 exchanges routing information with other routing devices within network 30, thereby learning routes through the network. SE router 22 may exchange routing information with other routing devices in accordance with one or more routing protocols, such as the Border Gateway Protocol (BGP).

Control unit 56 generates forwarding information 60 based on routing information 58. Control unit 56 selects routes for packets, e.g., determines which links 54 to forward the packets on, by comparing the keys of the packets to forwarding information 60. Forwarding information 60 includes information identifying which of links 54, and in some embodiments which VC or VLAN to forward IP unicast packets destined for one of subscriber devices 26 on.

Control unit 56 also maintains multicast filter information 32, and authentication/authorization information 62 received from server 34 (FIGS. 2 and 3), as discussed above. Control unit 56 receives multicast join/leave messages, e.g., IGMP host membership reports, from subscriber devices 26 via links 52 and IFCs 50. A multicast join/leave messages includes a source IP address of the requesting one of subscriber devices 26, a destination IP address identifying the multicast group associated with requested multicast stream, and the requested action, i.e., join or leave. Control unit 56 updates multicast filter information 32 based on received join/leave messages, and replicates and forwards received multicast packets based on multicast filter information 32.

For example, when one of subscriber devices 26 requests a multicast stream, and if the requesting one of subscriber devices 26 is authenticated and authorized to receive the requested stream as determined by checking authentication/ authorization information 62, control unit 56 updates multicast filter information 32 to associate the IP address of the requesting one of subscriber devices 26 with the IP address of the multicast group for the requested stream. Control unit 56 also identifies the VC for the requesting one of destination devices 26 based on its IP address, and associates the VC with the IP address of the multicast group for the requested stream. Control unit 56 also determines which of links 54 to forward multicast packets of the requested stream on to reach the requesting one of destination devices 26, and associates the determined link with the IP address of the multicast group for the requested stream within multicast elaboration information 32. In some embodiments, control unit 56 also identifies a preconfigured VC or VLAN associated with the IP address for the requested stream, or dynamically associates a VC or VLAN with the IP address for the requested stream. Control unit 56 forwards multicast packets of the requested stream on the associated VC or VLAN.

In other embodiment, where switches 24 take the form of Ethernet bridges, control unit 56 identifies a Media Access Control (MAC) address for the requesting one of subscriber devices 26 from the header of the frame in which the multicast join/leave message was encapsulated, and associates the MAC address with the IP address of the multicast group for the requested multicast stream. In such embodiments, control unit 56 further assigns a "multicast MAC address" for the multicast stream, and associates the multicast MAC address with the IP address of the multicast group for the requested stream, and forwards multicast packets within frames that include the multicast MAC address.

If SE router 22 is not currently receiving multicast packets for the requested stream, control unit may send a PIM join message requesting the stream to a neighboring router via one of links 54. As discussed above, SE router 22 replicates and forwards multicast packets on a per-switch basis. Consequently, where SE router 22 is already forwarding multicast packets to the one of switches 24 that couples the requesting one of subscriber devices 26 to SE router 22, control unit 56 may simply associate the IP address of the requesting one of subscriber devices 26 with the IP multicast group address of the requested stream, and a previously determined link 54 to the switch 24, and the associated VC or VLAN that is being used to transmit the multicast stream to the switch 24. In embodiments where switches 24 take the form of Ethernet bridges, control unit may associate the IP address and MAC address of the requesting one of subscriber devices with a previously determined link 54 to the switch 24, and a previously assigned multicast MAC address for the multicast stream.

In addition to replicating received multicast packets on a per-switch basis as indicated by multicast filter information 32, control unit 56 encapsulates multicast packets to forward the multicast packets to switches 24. For example, control unit 56 may encapsulate multicast packets with ATM cell headers or Ethernet frame headers for transmission to switches 24 on VCs or VLANs associated with the IP source address of the multicast group as indicated within multicast filter information 32. Where switches 24 take the form of Ethernet bridges, control unit 56 encapsulates multicast packets with Ethernet frame headers that include the assigned multicast MAC address as indicated within multicast filter information 32.

In order to control the performance of multicast elaboration by switches 24, i.e., to control switches 24 to complete the multicast elaboration of multicast packets received by SE router 22 and forwarded to switches 24 on a per-switch basis, control unit 56 sends control messages to switches 24. The control messages may be in-band, and control unit 56 may send the control messages to switches 24 via dedicated control VCs or VLANs. Further, the content of the control messages will, as mentioned above, depend on the type of switches 24, i.e. DSLAM, Ethernet bridge, or CMTS, and the data link layer communication mode or modes employed by SE router 22, switches 24 and subscriber devices 26, i.e., ATM VCs, VLANs, or communication according to the IEEE 802 standards.

For example, where a switch 24 is a DSLAM or CMTS, and communication between SE router 22 and the switch 24 is via VCs or VLANs, a control message sent by control unit 56 to the switch 24 in response to a multicast join/leave message received from one of subscriber devices 26 identifies the VC or VLAN that packets for the requested multicast stream will be sent to the switch 24 on, the VC associated with the requesting one of subscriber devices 26, and the requested action, i.e. join or leave. Where a switch 24 is an Ethernet bridge, a control message sent by control unit 56 to the switch 24 in response to a multicast join/leave message received from one of subscriber devices 26 identifies the MAC address assigned to the requested multicast that will be included in the header of frames containing multicast packets for the requested multicast, the MAC address of the requesting one of subscriber devices 26, and the requested action, i.e. join or leave. As will be described in greater detail below with reference to FIG. 5, switches 24 dynamically configure multicast filter information 36 maintained by switches 24 based on the control messages received from SE router 22.

As described above, SE router 22 may by used by an NSP to differentiate between premium and non-premium multicast streams, and may handle the replication and forwarding of premium multicast streams differently than for non-premium multicast streams. Specifically, SE router 22 may replicate and forward premium multicast streams on a per-switch basis, and control performance of multicast elaboration by switches 24, as described above, for premium multicast streams, while replicating and forwarding non-premium multicast streams on a per-subscriber basis. Further, in such embodiments, delivery via VCs dedicated to traffic for an associated multicast stream may be reserved for premium multicast streams In such embodiments, control unit 56 may maintain information classifying multicast streams a premium or non-premium, e.g., multicast stream classifications 64. When control unit 56 receives a multicast join message from one of subscriber devices 26, control unit 56 determines whether the requested multicast stream is premium or non-premium based on multicast stream classifications 64. Control unit 56 determines whether to configure multicast filter information 32 and send a control message to one of switches 24 in the manner described above based on the determination.

Control unit 56 may include one or more microprocessors, digital signal processors (DSPs), Application Specific Integrated Circuits (ASICs), Field Programmable Gate Arrays (FPGAs), or other logic circuitry. Control unit 56 may include memory (not shown) that stores computer-readable program instructions that cause control unit 56 to perform the functions ascribed to it herein. The memory may include any magnetic, optical, or electrical media, such as a Random Access Memory (RAM), Read Only Memory (ROM), hard disk, CD-ROM, or Electronically Erasable Programmable ROM (EEPROM). Control unit 56 may maintain routing information 58, forwarding information 60, authentication/authorization information 62, multicast stream classifications 54, and multicast elaboration information 32 in memory in the form of one or more tables, databases, link lists, radix trees, databases, flat files, or any other data structures.

Figure 5:
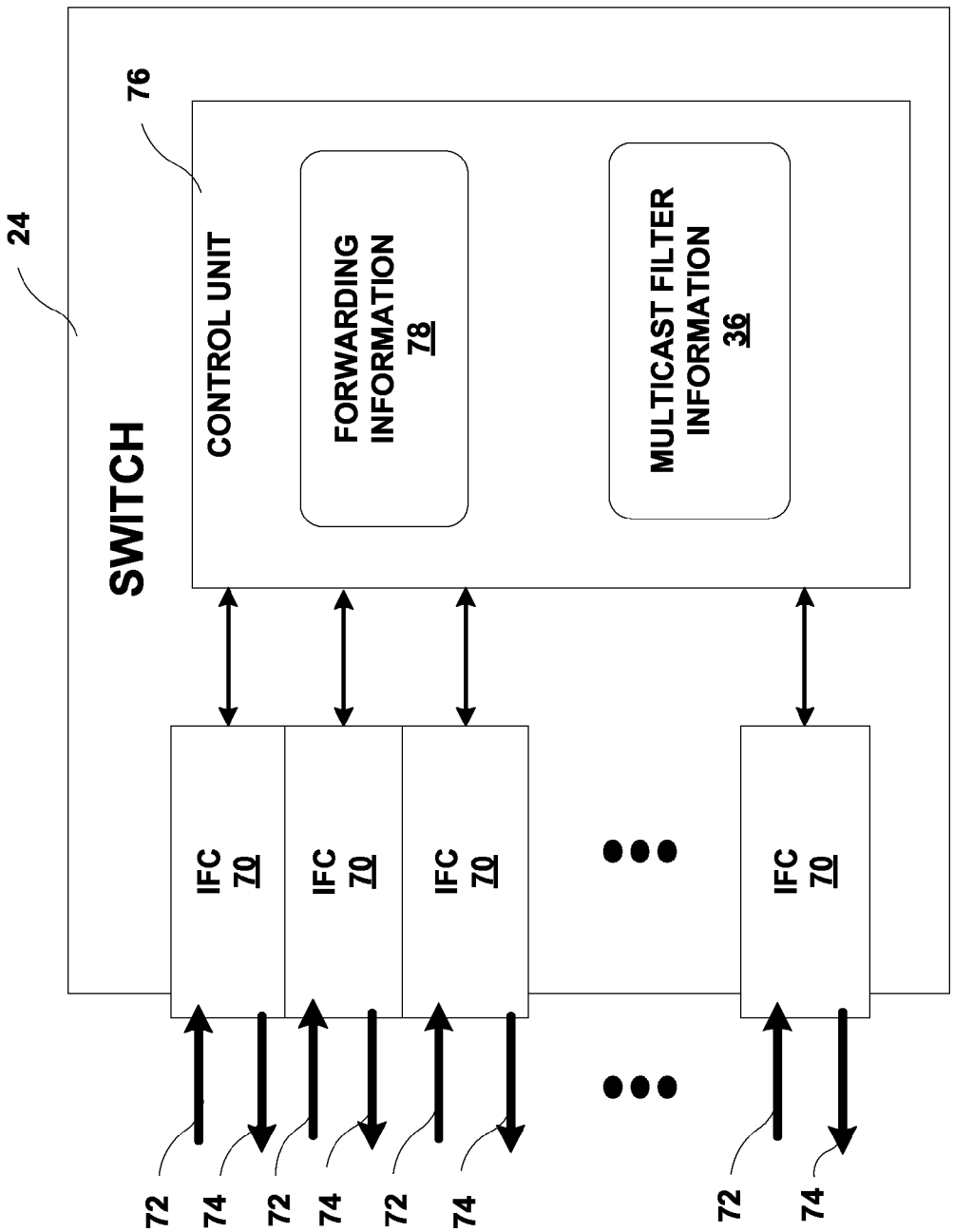
FIG. 5 is a block diagram illustrating an example switch that performs multicast elaboration as indicated by a router.

FIG. 5 is a block diagram illustrating an example switch 24. Switch 24 may be, for example, a DSLAM, CMTS, or Ethernet bridge, as described above. Switch 24 includes IFCs 70 that receive and send flows of ATM cells or Ethernet frames via links 72 and 74, respectively. In general, switch 24 receives cells or frames from network links 72, and forwards the cells or frames via network links 74 based on information contained in the header of the cells, frames, or encapsulated packets.

More specifically, upon receiving an inbound cell or frame, a respective one of IFCs 70 relays the cell or frame to a control unit 76. Control unit 76 identifies an appropriate outbound link 74 to forward the received cell or frame on by comparing information in the header of the cell or frame to forwarding information 78 maintained by control unit 76. In some cases, control unit may reencapsulate, i.e. modify the header, of the cell or frame to forward the cell or frame on a particular VC or VLAN indicated by forwarding information 78.

Control unit 78 maintains multicast filter information 36, and dynamically configures multicast filter information 38 based on control messages received from SE router 22. As described above, the control messages may identify the VC or VLAN that packets for the requested multicast stream will be sent to switch 24 on or the multicast MAC address assigned to the requested multicast stream by SE router 22. The control messages also identify an associated VC or the MAC address of the requesting one of subscriber devices 26, and the requested action, i.e. join or leave.

For each multicast stream, control unit 76 maintains multicast filter information 36 to include the indicated inbound VC or VLAN, or the indicated multicast MAC address. Based on the control messages received from SE router 22, control unit 76 associates the VC or MAC addresses of subscriber devices 26 that have joined the multicast with the indicated VC, VLAN, or multicast MAC address. Where switch 24 is an Ethernet bridge and control unit 76 receives Ethernet frames that include a multicast MAC address, control unit 76 replicates and forwards the frames to subscriber devices 26 based on the subscriber device MAC addresses associated with the multicast MAC address within multicast filter information 36. Switch 24 reencapsulates the replicated multicast packets with Ethernet frames headers that include the MAC address of the respective subscriber devices 26.

In embodiments where switch 24 is a DSLAM, control unit 76 maintains multicast filter information 36 that associates VCs or VLANs that deliver multicast streams with VCs associated subscriber devices 26 that receive the streams. Control unit 76 may also dynamically assign dedicated multicast VCs for subscriber devices 26 that receive the streams based on the VCs associated with the subscriber devices 26, and associates a dedicated multicast VC with each of the subscriber device VCs indicated within multicast filter information 36. In some embodiments, for each of the subscriber devices 26 that are receiving a multicast stream, control unit 76 may select one of a plurality of VCs dedicated to transmitting multicast streams to that subscriber device 26 based on availability. When control unit 76 receives ATM cells or Ethernet frames that contain multicast packets on a VC or VLAN, control unit 76 replicates the multicast packets for each of the subscriber devices 26 associated with the VC or VLAN within multicast filter information 36. Control unit 76 encapsulates the replicated multicast packets for delivery via the multicast VCs associated with VC or VLAN on which the multicast packets were received within multicast filter information 36.

Control unit 76 may include one or more microprocessors, DSPs, ASICs, FPGAs, or other logic circuitry. Control unit 76 may include memory (not shown) that stores computer-readable program instructions that cause control unit 76 to perform the functions ascribed to it herein. The memory may include any magnetic, optical, or electrical media, such as a RAM, ROM, hard disk, CD-ROM, or EEPROM. Control unit 76 may maintain forwarding information 78 and multicast elaboration information 36 in memory in the form of one or more tables, databases, link lists, radix trees, databases, flat files, or any other data structures.

Figure 6A:
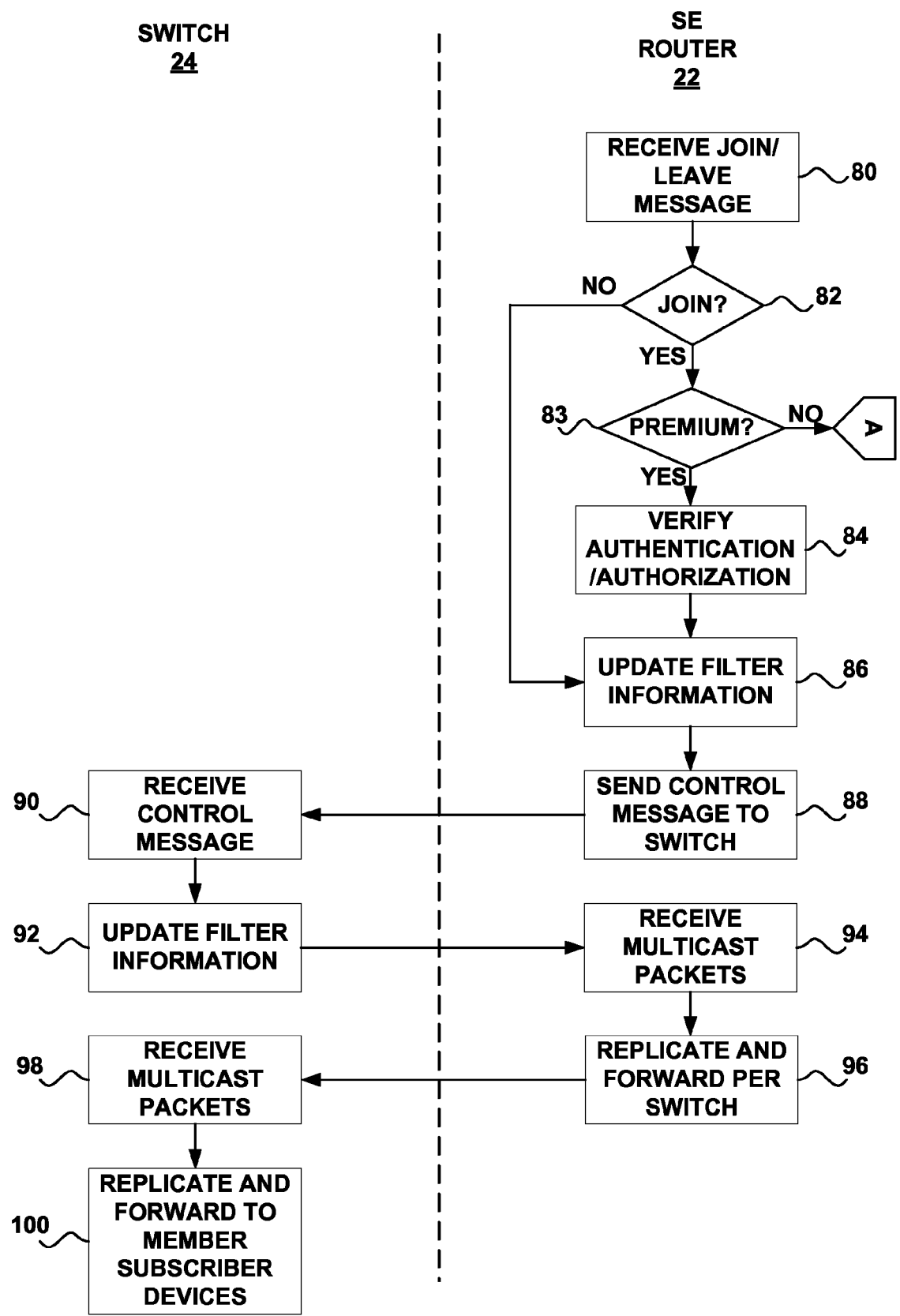
FIGS. 6A and 6B are flowcharts illustrating an example method in which a service edge router controls the performance of multicast elaboration by data link layer devices.
Figure 6B:
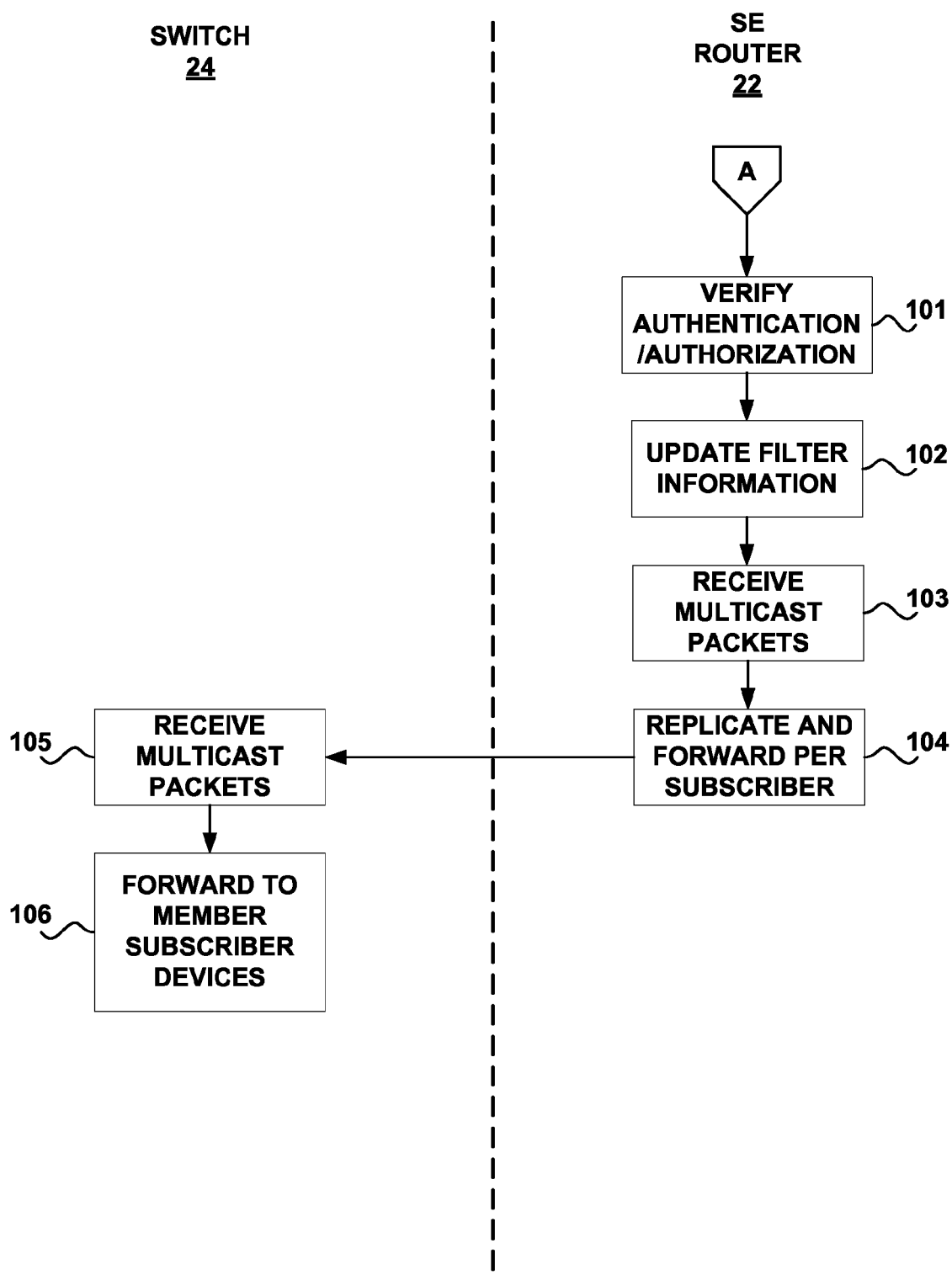

FIGS. 6A and 6B are flowcharts illustrating an example method in which SE router 22 controls the performance of multicast elaboration by a switch 24 consistent with the principles of the invention. As illustrated in FIG. 6A, SE router 22 receives a multicast join/leave message, e.g., an IGMP host membership report, from a subscriber device 26 (80). If SE router 22 determines that the message is a join message (82), SE router 22 checks multicast stream classifications 64 to determine whether the requested multicast stream is premium or non-premium (83). If the stream is premium, SE router checks authentication/authorization information 62 received from server 34 to verify that the subscriber associated with the requesting subscriber device 26 is authenticated associated authorized to receive the multicast stream requested in the join message (84), e.g., has subscribed to a level of multimedia service that includes receipt of premium multicast streams. If the subscriber is authenticated and authorized, or if SE router 22 determines that the message is a leave message, SE router 22 updates filter information 32 (86). SE router 22 may associate an IP address and a VC or MAC address for the requesting subscriber device 26 with a selected or previously associated VC or VLAN, or an assigned multicast MAC address, as described above.

SE router 22 sends a control message to switch 24 to dynamically update multicast filter information 36 maintained by switch 24 (88). The message includes the VC or MAC address of the requesting one of subscriber devices 26, and the requested action, i.e., join or leave. The message also may include the selected VC or VLAN, or the assigned multicast MAC address. As described above, the message may be an in-band IP message, and may be sent to switch 24 via a designated control VC or VLAN.

Switch 24 receives the control message (90), and dynamically configure multicast filter information 36 based on the control message (92). For each active multicast stream, i.e., each multicast stream that SE router 22 is currently delivering to switch 24, switch 24 associates the VC or MAC addresses of subscriber devices 26 that have requested a multicast stream with the VC or VLAN that switch 24 is receiving that multicast stream on, or with the multicast MAC address assigned to that multicast stream by SE router 22, as described above. In embodiments where switch 24 is a DSLAM, switch 24 further associates an outbound multicast-dedicated VC with each of the VCs for the requesting subscriber devices 24.

SE router 22 receives multicast packets for a multicast stream (94), and replicates and forwards the multicast packets on a per-switch basis according to multicast filter information 32 (96), as described above. To forward the multicast packets to switch 24, SE router 22 encapsulates the multicast packets for delivery via the selected VC or VLAN indicated within multicast filter information 32, or within an Ethernet frame that includes the assigned multicast MAC address for the multicast as the destination address within the header for the frame, as described above. Switch 24 receives the multicast packets (98), and replicates and forwards the multicast packets to subscriber devices 26 based on multicast filter information 36 (100).

By comparing the VC or VLAN that multicast packets arrive on, or the multicast MAC address of the Ethernet Frames containing multicast packets to multicast elaboration information, switch 24 identifies the subscriber devices 24 that are to receive the multicast packets. Switch replicates the multicast packets for each indicated subscriber device 26. Switch 24 may forward the replicated multicast packets within Ethernet frames addressed to indicated subscriber devices 26, i.e., containing MAC addresses of indicated subscriber devices 26 as the destination addresses within the headers of the frames, or may encapsulate the replicated multicast packets for delivery via VCs indicated within multicast filter information 36, as described above.

If SE router 22 determines that the requested stream is a non-premium stream (83), SE router 22 will check authentication/authorization information to verify the authentication and authorization of the subscriber (101) and update filter information 32 (102) to associate the IP address for the requesting subscriber device 26 and a common unicast VC to switch 24 with the IP address for the multicast group associated with the requested multicast stream. When SE router 22 receives packets for the requested non-premium multicast stream (103), SE router 22 replicates the multicast packets on a per-subscriber basis for forwarding on the indicated unicast VCs (104). Switch 24 receives a copy of the multicast packets per subscriber (105), and forwards them to the indicated subscriber devices without replication (106).

Figure 7:
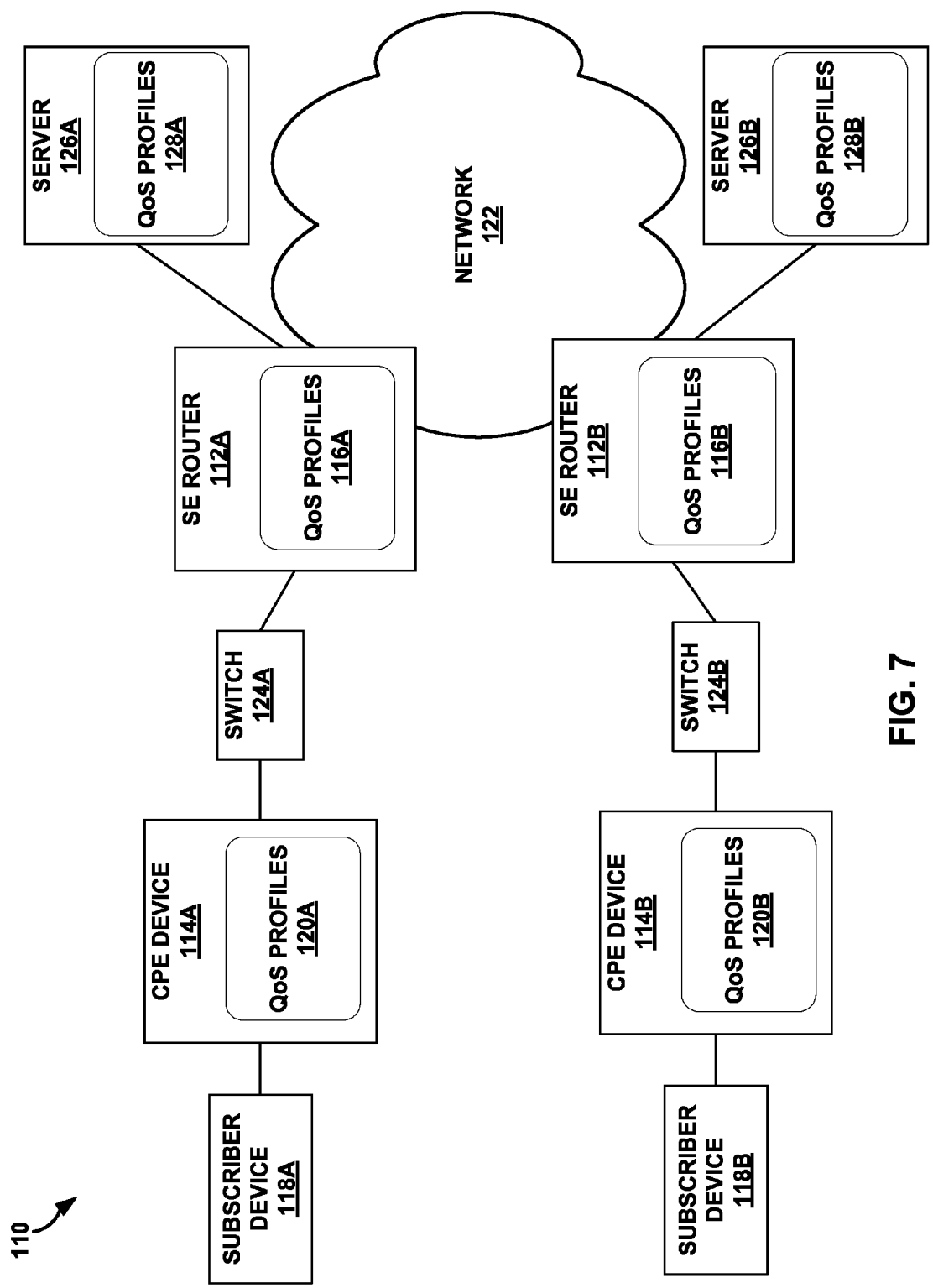
FIG. 7 is a block diagram illustrating an example multimedia networking environment in which a service edge router controls packet forwarding by a customer premises equipment device to facilitate a requested Quality of Service class for a unicast packet flow consistent with the principles of the invention.

FIG. 7 is a block diagram illustrating an example networking environment 110 in which SE routers 112A and 112B (collectively "SE routers 112") control packet forwarding by Customer Premises Equipment (CPE) devices 114A and 114B (collectively "CPE devices 114") to facilitate transmission of packets according to a requested Quality of Service (QoS) class for a unicast packet flow consistent with the principles of the invention. In general, network layer devices, such as SE routers 112, use QoS information so that an NSP that administers the network layer devices can provide subscribers a requested QoS class for a packet flow. A requested QoS class may include preferential routing of the packet flow, e.g., routing through designated or engineered packet flows to improve the speed of transmission of the packet flow and to reduce the occurrence of dropped packets from the packet flow.

SE routers 112 use QoS profiles 116A and 116B (collectively "QoS information 116") to provide subscribers using subscriber devices 118A and 118B (collectively "subscriber devices 118") a requested QoS class for unicast packet flows. Further, SE routers 112 provide QoS information to CPE devices 114 to dynamically configure QoS profiles 120A and 120B (collectively "QoS profiles 120") maintained by CPE devices 114 for layer-2 links, e.g., VCs or VLANs, between CPE devices 114 and subscriber devices 118. QoS profiles 120 control CPE devices 114 to forward packets on the layer-2 links facilitate packet transmission according to the requested QoS class. By dynamically configuring QoS profiles 120 maintained by CPE device 114, SE routers 112 may provide improved QoS for subscriber devices 118 than conventional SE routers 112 that do not provide QoS information to CPE devices 114.

An exemplary unicast packet flow for which SE routers 112 may provide an enhanced QoS is a unicast Voice over Internet Protocol (VoIP) call between subscriber devices 118 over a network 122. Subscriber devices 118 used for a VoIP call may be, for example, personal computers, laptop computers, or handheld computers that include or are coupled to a speaker and microphone to facilitate voice communication. A subscriber device 118 may also be a telephone coupled to or incorporating a computing device that interfaces with CPE devices 114 and performs upper layer functions necessary to establish a VoIP call.

CPE devices 114 are data link layer customer premises devices that couple subscriber devices 118 to SE routers 112 and network 122. CPE devices 114 may be modems, wireless access points, or switches. CPE devices 114A and 114B are coupled to SE routers 112A and 112B via switches 124A and 124B (collectively "switches 124"), respectively. Switches 124 may be DSLAMS, CMTSs, or Ethernet bridges, as described above.

Network 122 may be a packet-based network, such as the Internet, and may include a number of autonomous systems (not shown), and devices, such as additional routers and switches (not shown), to route packets across network 122. SE routers 112 may be maintained by a single NSP, or different NSPs that provide multimedia services to subscribers associated with subscriber devices 118. SE routers 112 may serve as B-RASs for subscriber devices 118.

Subscriber device 118A places a VoIP call to a subscriber device 118B via network 122 by negotiating a VoIP session with subscriber device 118B. Subscriber devices 118 also send request messages to SE routers 112 requesting an enhanced QoS for the packet flow that will carry the VoIP call. In response to the request messages, SE routers 112 verify authentication and authorization information previously received from respective servers 126A and 126B to authenticate the respective subscribers, and to determine whether the respective subscribers are authorized to receive a requested QoS class for a VoIP call. Servers 126 may be, for example, RADIUS servers. In some embodiments, SE routers 112 are served by a single server 126.

Servers 126A and 126B store QoS profiles 128A and 128B (collectively "QoS profiles 128"), respectively. QoS profiles 128 describe the QoS classes, if any, that subscribers, such as the subscribers associated with subscriber devices 118, are authorized to receive. QoS profiles 116 maintained by SE routers 112 includes QoS information received from servers 126 when subscriber associated with subscriber devices 118 previously logged on or otherwise activated their multimedia service accounts. If SE routers 112 determine that the subscribers associated with subscriber devices 118 are authorized to use the requested QoS class for the VoIP call based on information contained in QoS profiles 116, SE routers 112A and 112B identify information within QoS profiles 116A and 116B, respectively, describing packet transmission according to the QoS class requested by subscriber devices 118A and 118B for the call. QoS profiles 116 may include, for example, information describing a designated route or packet flow that may be used by SE routers 112 to provide an enhanced QoS for the VoIP call. The indicated route or packet flow may provided greater bandwidth, or may be dedicated to or provide priority for VoIP packets.

QoS profiles 116 also includes information for use by CPE devices 114 to provide an enhanced QoS for the VoIP call. SE routers 112 provide such information to CPE devices 114 to cause CPE devices to facilitate the requested QoS class for the VoIP call. CPE devices 114 store the QoS information provided by SE routers 112 as QoS profiles 120 for the layer-2 links between CPE devices 114 and subscriber devices 118. QoS profiles 120 may include, for example, information directing CPE devices 114 to provide preferential queuing for VoIP packets.

Figure 8:
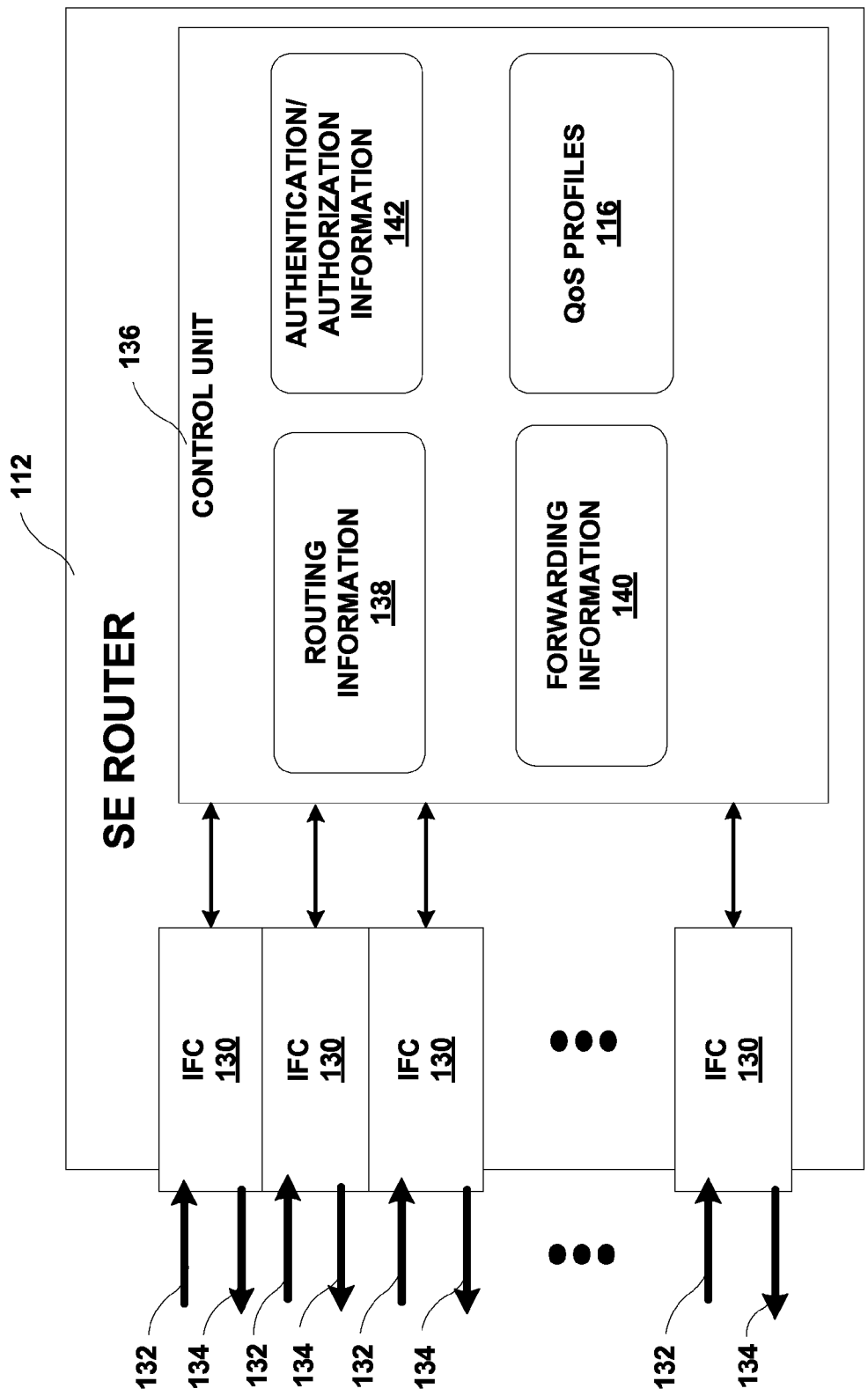
FIG. 8 is a block diagram illustrating an example service edge router that controls packet forwarding by a customer premises equipment device to facilitate a requested Quality of Service class for a unicast packet flow.

FIG. 8 is a block diagram illustrating an example SE router 112. SE router 112 can provide a requested QoS class for a packet flow, such as a VoIP call, and can also control a CPE device 114 to facilitate the requested QoS class for the packet flow, as described above. SE router 112 includes IFCs 130, inbound and outbound links 132 and 134, and a control unit 136 that maintains routing information 138 and forwarding information 140 to forward packets received on inbound links 134 as described above with reference to SE router 22, which included IFCs 50, inbound and outbound links 52 and 54, and control unit 56 that maintains routing information 58 and forwarding information 60, and FIG. 4.

Control unit 136 maintains QoS profiles 116 that are used by control unit 136 to provide a requested QoS class to one or more subscribers for one or more packet flows. Control unit 136, for example, may receive a message requesting authentication and authorization for a VoIP call with a particular QoS class from a subscriber device 118 via one of inbound links 132 and IFCs 130. Control unit 136 checks authentication/authorization information 142 to authenticate and authorize the subscriber associated with the requesting subscriber device 118, and to accesses QoS information for the VoIP call stored within QoS profiles 116. As described above, the QoS profiles may include information describing a route packet flow that may be used by control unit 136 to provide packet transmission according to the requested QoS class for the VoIP call.

QoS profiles 116 may also include information indicating a queuing preference for VoIP packets to be used by a CPE device 114 to facilitate packet transmission according to the requested QoS class for the VoIP call. Control unit 136 sends a control message to the CPE device 114 via one of IFCs 130 and a respective one of outbound links 134 to direct the CPE device 114 to implement the indicated preferential queuing for the VoIP call. Control unit 136 may send control messages to the CPE device 114 on a dedicated control ATM VC, as described above with reference communication between SE routers 22 and switches 24 of FIG. 2.

Control unit 136 may include one or more microprocessors, DSPs, ASICs, FPGAs, or other logic circuitry. Control unit 136 may include memory (not shown) that stores computer-readable program instructions that cause control unit 136 to perform the functions ascribed to it herein. The memory may include any magnetic, optical, or electrical media, such as a RAM, ROM, hard disk, CD-ROM, or EEPROM. Control unit 136 may maintain routing information 138, forwarding information 140, and QoS information 116 in memory in the form of one or more tables, databases, link lists, radix trees, databases, flat files, or any other data structures.

Figure 9:
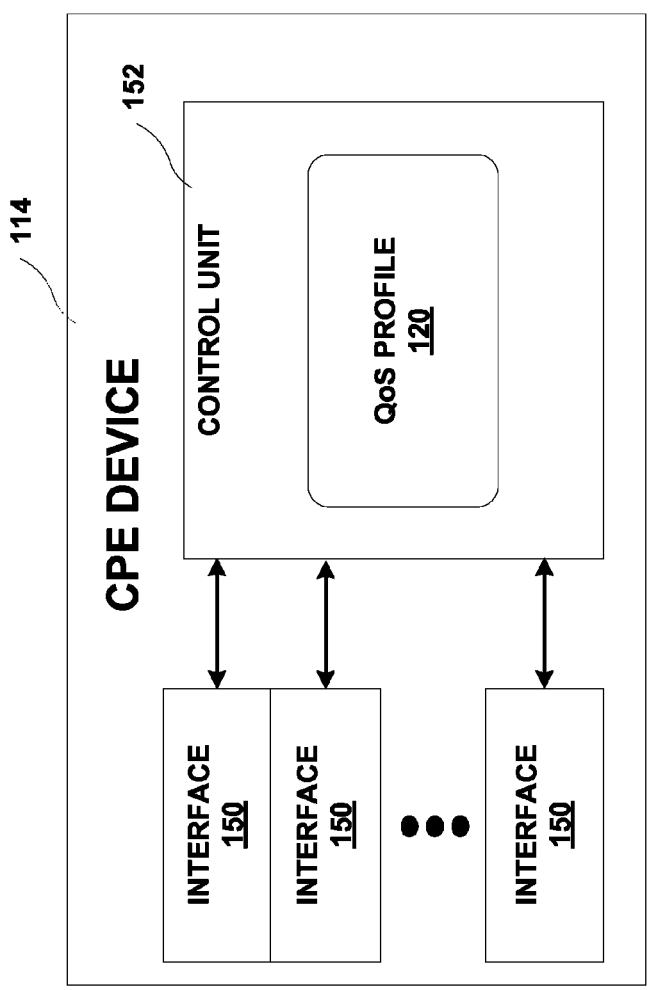
FIG. 9 is a block diagram illustrating an example customer premises equipment device that receives Quality of Service information from a service edge router to facilitate a requested Quality of Service for a unicast packet flow based on the information.

FIG. 9 is a block diagram illustrating an example CPE device 114 that receives QoS information from a SE router 112, and dynamically configures a QoS profile 120 for a layer-2 link between CPE device 114 and a subscriber device 118 based on the QoS information. As described above, CPE device 114 may be, for example, a modem, wireless access point, or switch. CPE device 114 includes interfaces 150 for coupling CPE device 114 to one or more subscriber devices or one or more other CPE devices, and for coupling CPE device 114 to network 122, e.g., to a SE router 112 via a switch 124. Interfaces 150 may include, for example, IFCs, such as IFCs 50, 70 and 130 described above, or transceivers for communication via a wireless medium, such as communication according to one of the IEEE 802.11 family of standards. Where CPE device 114 is a modem, interfaces 150 may include or be coupled to a control unit 152 via circuitry (not shown) for modulating and demodulating signals sent or received by CPE device 114 via interfaces 150.

Control unit 152 receives cells, frames, or otherwise encapsulated packets from a switch 124, and forwards the packets therein to a connected subscriber device 118 within Ethernet frames according to either of the IEEE 802.3 or 802.11 families of standards. Control unit 152 also receives Ethernet frames from the connected subscriber device 118, and encapsulates the packets therein for transmission to the switch 124. Control unit 152 receives a control message from SE router 112, as described above, and dynamically configures a QoS profile 120 based on the control message. Based on QoS profile 120, control unit 152 provides packet transmission on the layer-2 link according to a requested QoS class for a packet flow for the connected subscriber device 118. For example, as described above, control unit may preferentially queue packets for the packet flow based on QoS profile 120.

Control unit 152 may include one or more microprocessors, DSPs, ASICs, FPGAs, or other logic circuitry. Control unit 152 may include memory (not shown) that stores computer-readable program instructions that cause control unit 152 to perform the functions ascribed to it herein. The memory may include any magnetic, optical, or electrical media, such as a RAM, ROM, hard disk, CD-ROM, or EEPROM. Control unit 152 may maintain QoS information 120 in the memory.

Figure 10:
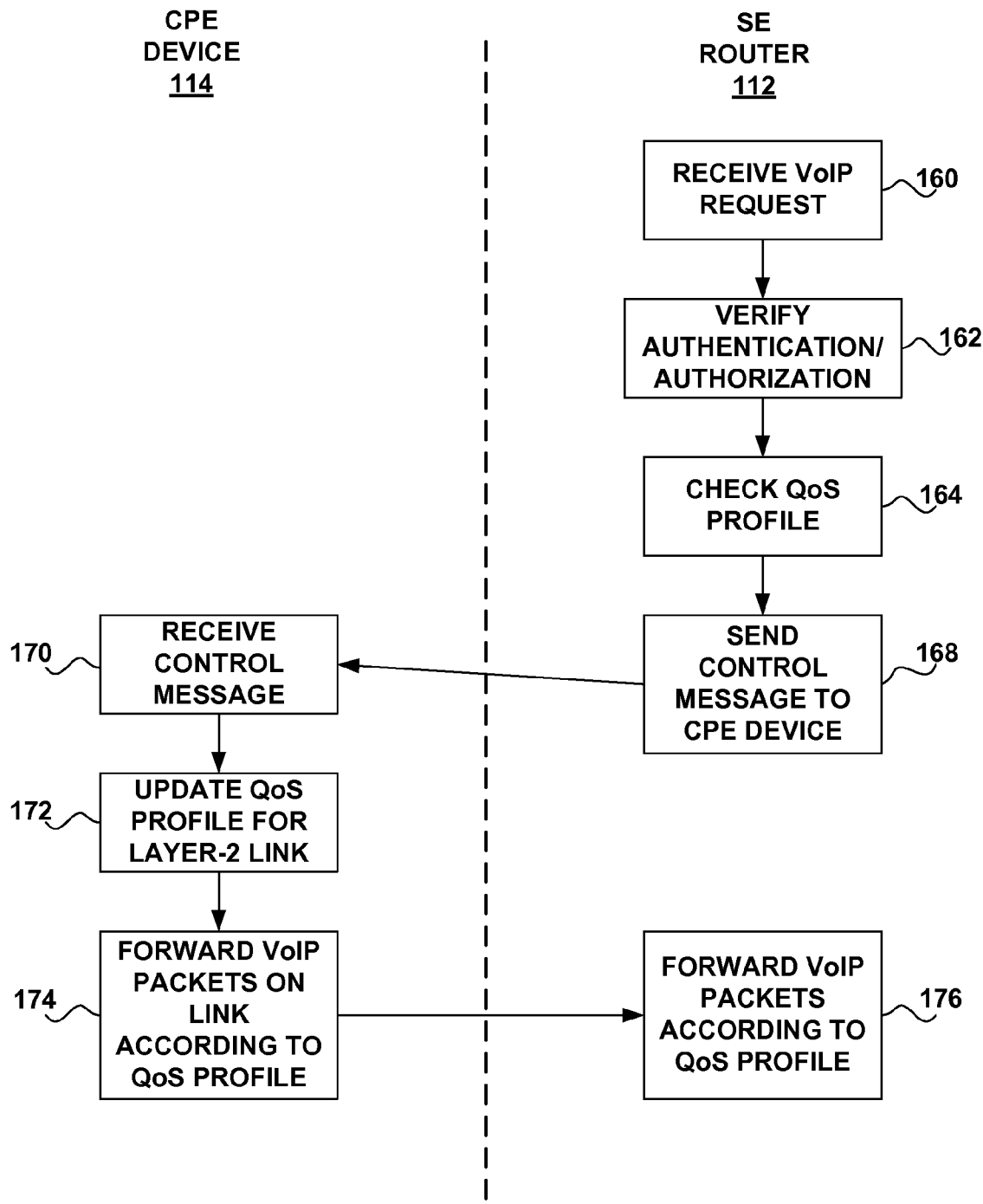
FIG. 10 is a flowchart illustrating an example method in which a service edge router controls packet forwarding by a customer premises equipment device to facilitate a requested Quality of Service class for a unicast packet flow consistent with the principles of the invention.

FIG. 10 is a flowchart illustrating an example method in which a SE router 112 provides QoS information to a CPE device 114 consistent with the principles of the invention. In particular FIG. 10 illustrates an example method in which the SE router 112 and the CPE device use QoS information to provide packet transmission according to a requested QoS class for a unicast packet flow, which, in the illustrated example, is a VoIP call. When a subscriber using a subscriber device 118 initiates a VoIP call, SE router 112 receives a VoIP request message from the subscriber device 118 (160). The request message may request authentication and authorization for a VoIP call with packet transmission according to a particular QoS class.

SE router 112 checks authentication/authorization information 142 to authenticate and authorize the subscriber (162), and to retrieves QoS information for the VoIP call from QoS profiles 116 (164). As described above, the QoS profiles 116 may include information describing a route or packet flow that may be used by SE router 112 to provide packet transmission according to the requested QoS class for the VoIP call, and information describing preferential queuing that may be used by CPE device 114 to provide packet transmission according to the requested QoS class for the VoIP call.

SE router 112 sends a control message to CPE device 114 that includes the QoS information used by CPE device 114 to provide packet transmission according to the requested QoS class for the VoIP call (168). As described above, the control message may be an in-band message, and may be sent to CPE via a dedicated control VC or VLAN. Based on the information contained in the control message, CPE device 114 dynamically configures a QoS profile 120 for a layer-2 link between CPE device 114 and the subscriber device 118 (172). CPE device 114 forwards VoIP packets to the attached subscriber device and to switch via the layer-2 link to provide packet transmission according to the requested QoS class by, for example, preferentially queuing the VoIP packets (174). SE router 112 forwards VoIP packets to provide packet transmission according to the QoS class indicated by QoS information 116 by, for example, forwarding the VoIP packets on a route or packet flow across network 122 that is designated for VoIP packet traffic (176).

Figure 11:
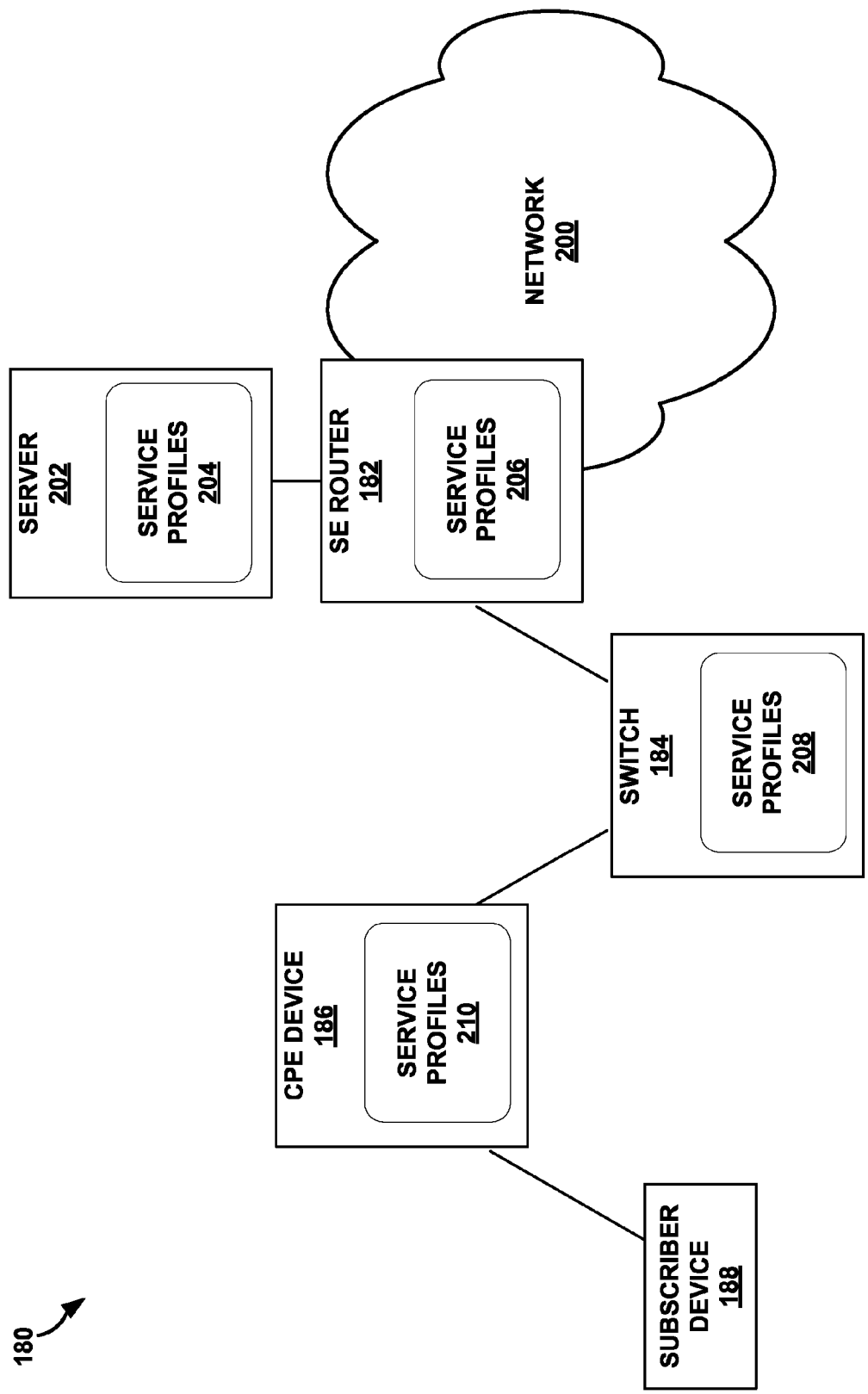
FIG. 11 is a block diagram illustrating an example multimedia networking environment in which a service edge router controls packet forwarding by a switch and a customer premises equipment device to provide multimedia services to a subscriber according to an associated service profile consistent with the principles of the invention.

FIG. 11 is a block diagram illustrating an example multimedia networking environment 180 in which a SE router 182 controls packet forwarding by a switch 184 and a CPE device 186 to provide multimedia service to a subscriber according to an associated service profile consistent with the principles of the invention. A service profile for a subscriber may include, for example, a one or more general QoS classes for packet flows originating from or destined for a subscriber device 188 associated with the subscriber. The service profile may identify, for example, routes or packet flows through a network 190 that SE router 182 may forward packets originating from subscriber device 188 on. The service profile may also identify layer-2 links, e.g., VCs, VLANs, or the like, configured between SE router 182, switch 184 and CPE device 186, that packet flows originating from or destined for subscriber device 188 may be forwarded on. The service profile may identify classes of packets that may be forwarded on preferential packet flows, VCs, VLANs, or the like. Further, the service profile may identify a preference level for queuing of packets originating from or destined for subscriber device 188.

Network 200 may be a packet-based network, such as the Internet, as described above. Switch 184 may be, for example, a DSLAM, CMTS, or Ethernet bridge, as described above. CPE device 186 may be, for example, a modem, wireless access point, or switch, as described above. Subscriber device 188 may be, for example, a personal computer, laptop computer, handheld computer, television set-top box, or Internet phone, as described above. Although not shown in FIG. 11 for ease of description, it is understood that SE router 182 may be coupled to a plurality of switches, that each of the switches may be coupled to a plurality of CPE devices, and that each of the devices 182-186 may provide service according to a respective service profile for each of multiple subscribers served by that device.

By controlling packet forwarding by switch 184 and CPE device 186 in order to provide multimedia service for a subscriber according to a service profile, PE router 182 may improve the service from the perspective of the subscriber, e.g., improve the overall QoS provided to the subscriber. Further, to the extent that conventional data link layer devices have received some service profile information, PE router 182 provides more streamlined distribution of the service profile information to switch 184 and CPE device 186.

A service profile for the subscriber may be created upon initiation of the multimedia service account for the subscriber, and may be updated as services or the subscription of the subscriber to those services changes. Consequently, it is desirable that devices 182-186 receive service profile information when such events occur.

For example, from the perspective of devices 182-186, an event indicating initiation of a new subscriber service account is the physical coupling of CPE device 186 to switch 184. When CPE device 186 is physically coupled to switch 184, CPE device 186 and switch 184 perform a synchronization protocol, and switch 184 reports the synchronization rate to SE router 182. In DSL embodiments where switch 184 is a DSLAM, the synchronization may be performed by switch 184 and CPE device 186 in accordance with the ATM Integrated Local Management Interface (ILMI) protocol. Switch 184 may also exchange queuing profile information between CPE device 186 and SE router 182, and provide a MAC address for CPE device 186 to SE router 182. Switch 184 may exchange information with SE router 182 using the same messaging protocol described herein as being used by routers to provide control messages to data link layer devices, e.g., may send in-band IP packets containing the messages.

In response to receiving the MAC address for CPE device 186 from switch 184, SE router 182 queries a server 202 for a service profile 204 stored therein for a subscriber associated with CPE device 186. SE router 182 retrieves the portion of service profile 204 used by devices 182-186, and stores the information as service profile 206. Server 202 may be a RADIUS server. Further, as described above, SE router 182 may act as a B-RAS for subscriber device 188.

SE router sends control messages to dynamically configure services profiles 208 and 210, maintained by switch 184 and CPE device 186, respectively. The control messages provide appropriate portions of service profiles 206 to the devices. Service profiles 208 and 210 may include QoS profiles for layer-2 links between devices 182-188.

Figure 12:
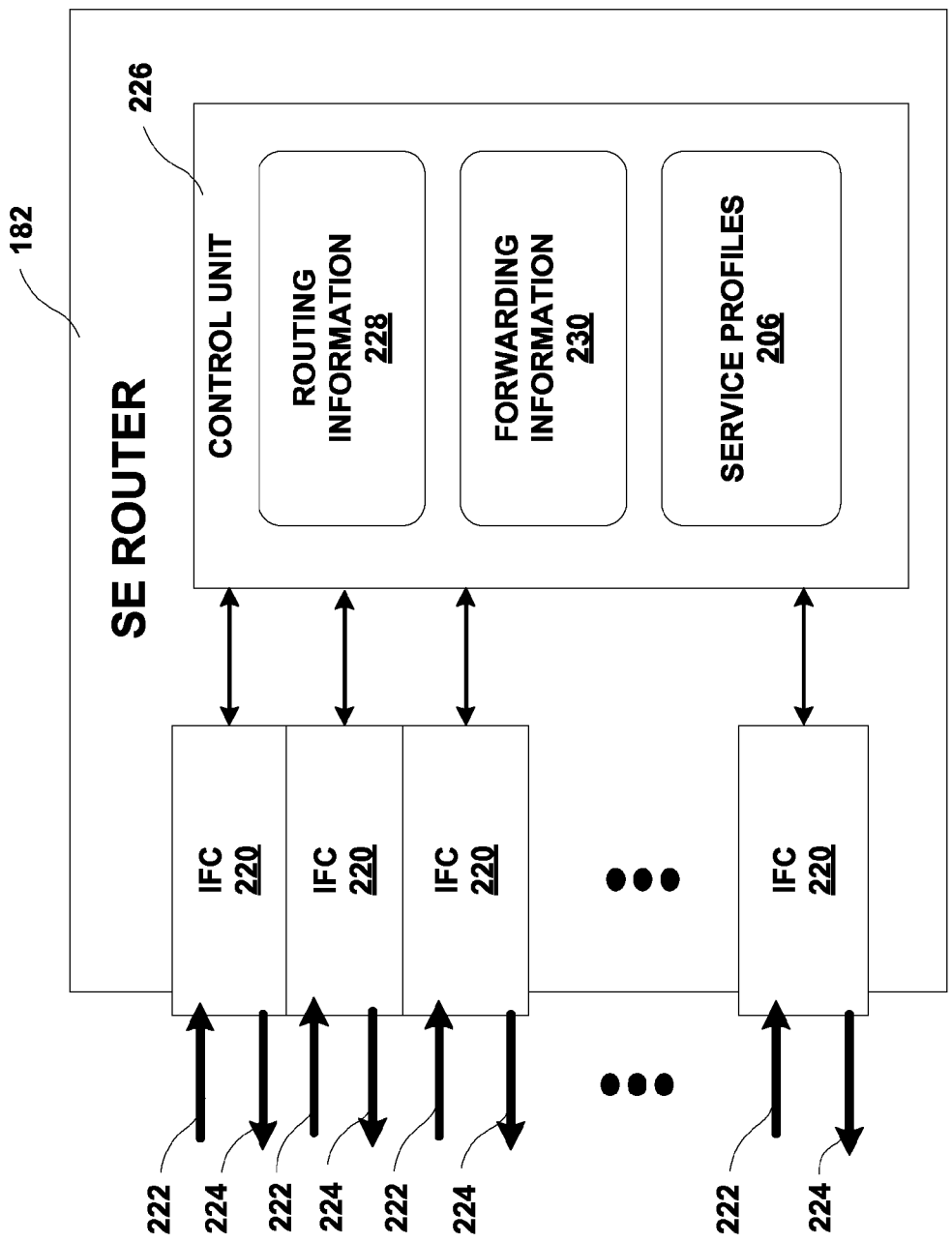
FIG. 12 is a block diagram illustrating an example service edge router that controls packet forwarding by a switch and a customer premises equipment device to provide multimedia services to a subscriber according to a service profile.

FIG. 12 is a block diagram illustrating an example SE router 182. SE router 182 includes IFCs 220, inbound and outbound links 222 and 224, and a control unit 226 that maintains routing information 228 and forwarding information 230 to forward packets received on inbound links 222 as described above with reference to SE router 22, which included IFCs 50, inbound and outbound links 52 and 54, and control unit 56 that maintains routing information 58 and forwarding information 60, and FIG. 4.

Control unit 226 maintains service profiles 206 that are used by control unit 226 to provide multimedia services to one or more subscribers according to respective service profiles. Control unit 226, for example, may receive a message indicating a synchronization rate, queuing profile, and MAC address for a new CPE device 186 from a switch 184 via one of inbound links 22 and IFCs 220. Control unit 226 queries a server 202 retrieve a service profile 206 for a subscriber associated with the MAC address. As described above, a service profile 206 for a subscriber may include information describing a general QoS level for packet flows originating from or destined for a subscriber device 188 associated with the subscriber.

Further, as described above, service profiles 206 may include information used by SE router 182 to control packet forwarding by switch 184 and CPE device 186 to provide multimedia services according to the service profile. Control unit 226 sends control messages to the switch 184 and CPE device 186 via one of IFCs 130 and a respective one of outbound links 134 to control the data link layer devices to provide Internet service according to the service profile information. Control unit 226 may send control messages to switch 184 and CPE device 186 on a dedicated control ATM VC, as described above with reference communication between SE routers 22 and switches 24 of FIG. 2.

Control unit 136 may include one or more microprocessors, DSPs, ASICs, FPGAs, or other logic circuitry. Control unit 136 may include memory (not shown) that stores computer-readable program instructions that cause control unit 136 to perform the functions ascribed to it herein. The memory may include any magnetic, optical, or electrical media, such as a RAM, ROM, hard disk, CD-ROM, or EEPROM. Control unit 136 may maintain routing information 138, forwarding information 140, and QoS information 116 in memory in the form of one or more tables, databases, link lists, radix trees, databases, flat files, or any other data structures.

Figure 13:
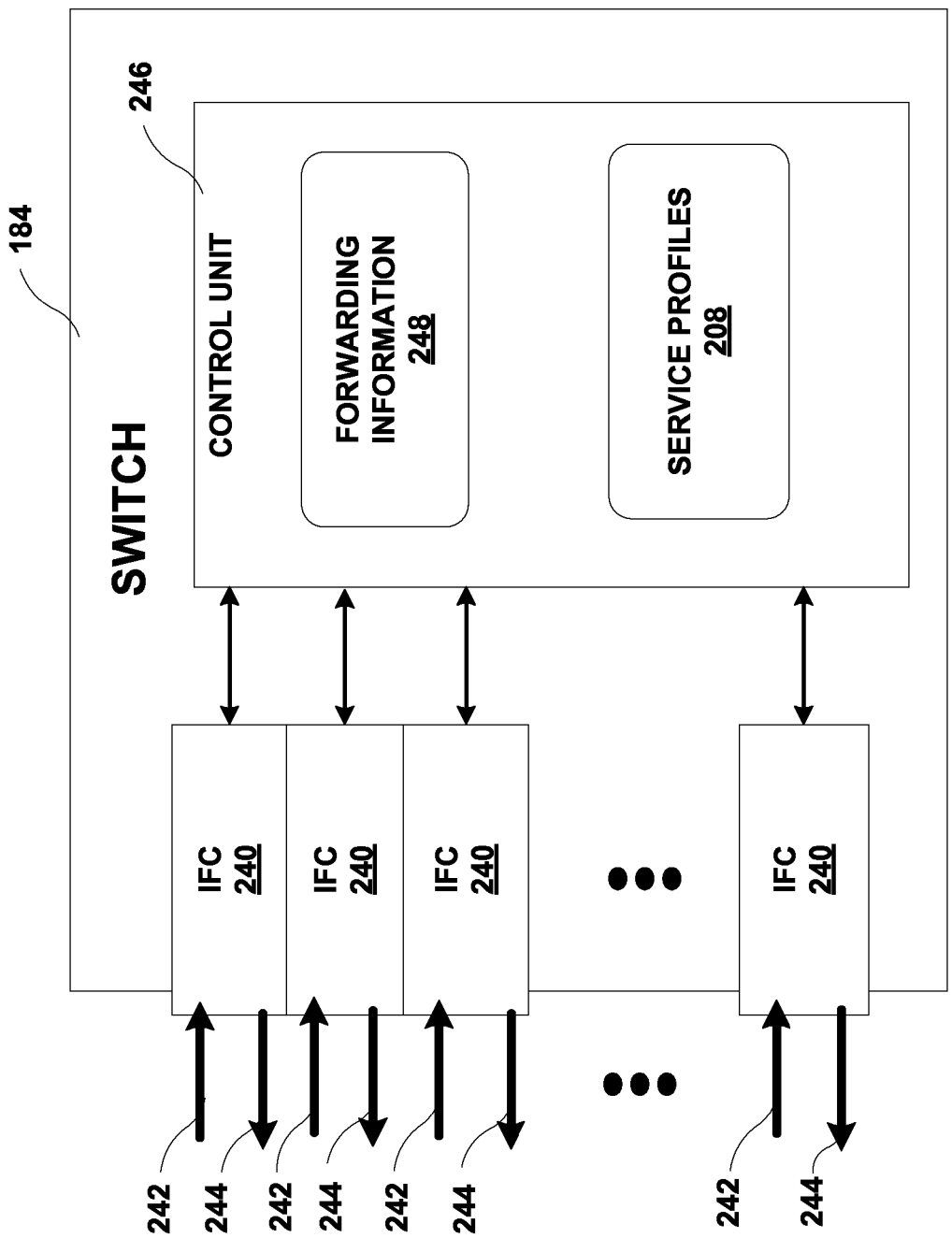
FIG. 13 is a block diagram illustrating an example switch that receives subscriber service profile information from a service edge router and forwards packets for a subscriber according to the service profile information.

FIG. 13 is a block diagram illustrating an example switch 184. Switch 184 may be, for example, a DSLAM, CMTS, or Ethernet bridge, as described above. Switch 184 includes IFCs 240 that receive and send flows of ATM cells or Ethernet frames via links 242 and 244, respectively, and a control unit 246 to control forwarding of the cell, frames or other encapsulated packets based on forwarding information 248. Switch 184 may be configured and function as described above with reference to switch 24 of FIG. 4, which included IFCs 70, inbound and outbound links 72 and 74, and control unit 76 that maintain forwarding information 78.

Control unit 246 performs a synchronization protocol with newly connected CPE device 186, and receives synchronization rate information and a MAC address for CPE device 186. Control unit 246 sends one or more control messages, which may be in-band IP messages, to SE router 182. The control messages include the synchronization rate information and the MAC address for CPE device 186. Control unit 246 may also exchange queuing profile information with CPE device 186 and SE router 182.

Control unit 246 receives a control message including service profile information from SE router 182, as described above, and stores service profile information as a service profile 208. Control unit 246 forwards packets for subscriber device 188 based on the associated service profile 208. For example, control unit 246 may place outbound packets on particular VCs, or queue inbound and outbound packets as indicated by the associated service profile 208. Service profile 208 may include QoS profiles for layer-2 links, such as VCs Control unit 246 may include one or more microprocessors, DSPs, ASICs, FPGAs, or other logic circuitry. Control unit 246 may include memory (not shown) that stores computer-readable program instructions that cause control unit 246 to perform the functions ascribed to it herein. The memory may include any magnetic, optical, or electrical media, such as a RAM, ROM, hard disk, CD-ROM, or EEPROM. Control unit 246 may maintain service profile information 210 in the memory.

Figure 14:
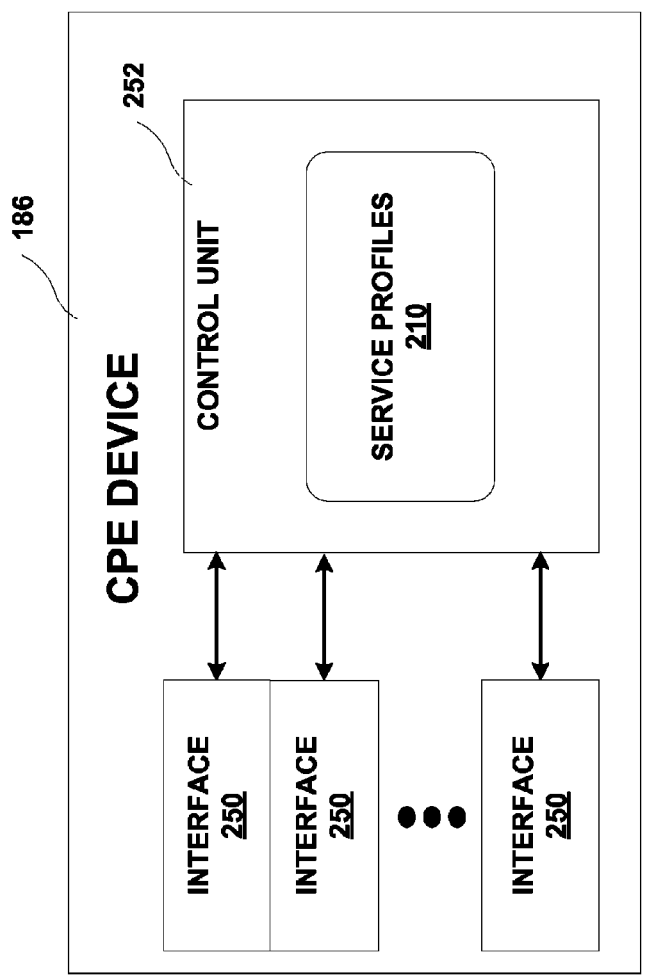
FIG. 14 is a block diagram illustrating an example customer premises equipment device that receives subscriber service profile information from a service edge router and forwards packets for a subscriber according to the service profile information.

FIG. 14 is a block diagram illustrating an example CPE device 186. As described above, CPE device 186 may be, for example, a modem, wireless access point, or switch. CPE device 186 includes interfaces 250, which may be configured as described above with reference to interface 150, CPE device 114, and FIG. 9, and a control unit 252, which forwards packets to and from subscriber device 188, as described above with reference to CPE device 114 and FIG. 9.

Control unit 252 detects physical connection of one or more of interfaces 250 to switch 184, and performs a synchronization protocol with switch 184 as described above. Control unit 252 receives a control message including service profile information from SE router 182, as described above, and stores the service profile information as a service profile 210. Control unit 252 forwards packets for the subscriber associated with subscriber device 188 based on service profile 210. For example, control unit 252 may place outbound packets on particular VCs, or queue inbound and outbound packets as indicated by service profile 210. Service profile 210 may include quality of service profiles for layer-2 links, such as VCs.

Control unit 252 may include one or more microprocessors, DSPs, ASICs, FPGAs, or other logic circuitry. Control unit 252 may include memory (not shown) that stores computer-readable program instructions that cause control unit 252 to perform the functions ascribed to it herein. The memory may include any magnetic, optical, or electrical media, such as a RAM, ROM, hard disk, CD-ROM, or EEPROM. Control unit 252 may maintain service profile information 210 in the memory.

Figure 15:
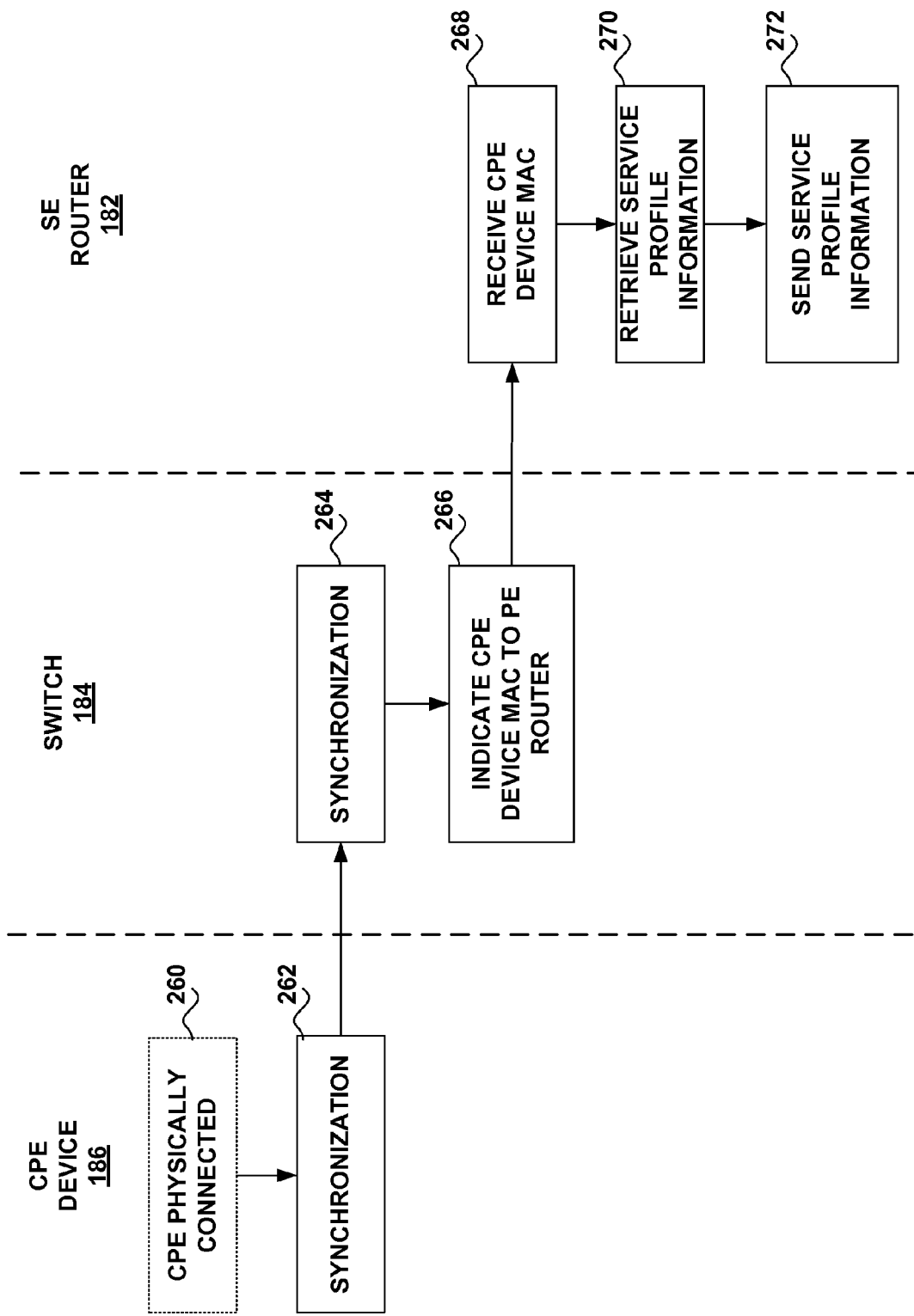
FIG. 15 is a flowchart illustrating an example method in which a service edge router controls packet forwarding by a switch and a customer premises equipment device to provide multimedia services to a subscriber according to a service profile.

FIG. 15 is a flowchart illustrating an example method in which a SE router 182 controls packet forwarding by a switch 184 and a CPE device 186 to provide multimedia service to a subscriber according to a respective service profile. CPE device 186 detects a physical connection to switch 184 (260), and initiates a synchronization protocol between CPE device 186 and switch 184 in response to the detection (262, 264). After the synchronization routine is completed, switch 184 reports the synchronization rate, and the MAC address of CPE device 186 to SE router 182 (266). Switch 184 may also exchange queuing profile information between CPE device 186 and SE router 182. As mentioned above, switch 184 may exchange information with SE router 182 using the same messaging protocol described herein as being used by routers to provide control messages to data link layer devices, e.g., may send in-band IP packets containing the messages.

In response to receiving the MAC address from switch 184 (268), SE router 182 queries a server 202 for service profile information from a service profile 204 associated with the MAC address stored therein. SE router 182 retrieves the portion of the service profile information used by devices 182-186 (270), and stores the information as service profile 206. SE router 182 sends control messages to switch 184 and CPE device 186 to provide appropriate portions of service profile 206 to the devices to control packet forwarding by switch 184 and CPE device 186 to provide multimedia service according to a service profile for the subscriber associated with the MAC address (272). Providing multimedia service according to the service profile may include providing data transmission according to a QoS class indicated by the profile, as discussed above.

The techniques described above may generally describe a "Layer two (2) Control Protocol" or, L2CP for short, as these techniques enable control of a L2 device. The various layer three (3) devices described above, e.g., SE routers, may therefore transmit the above control messages in accordance with this L2CP to control various operations of the L2 device. While these techniques are described above for purposes of example with respect to various network environments involving wired forms of communication, which may be referred to collectively as "wireline" environments, the techniques may readily be applied to network contexts involving other forms of communication, including wireless network environments. In this sense, the techniques may be extended to these other forms of communication.

Once extended, the techniques may set forth a general purpose control protocol, whereby a layer three (L3) network device may control a L2 network device regardless of the network environment in which the techniques are implemented. This extended form of the L2CP is referred to herein generally as an "Access Node Control Protocol" or ANCP for short. An access node may refer to a device that facilitate either wired or wireless access by subscriber devices to a network service, such as a multicast service, an Internet or data service, a VoIP service, a text messaging service, a video telephony service, a multimedia messaging service, an instant messaging service, an IP Television (IPTV) service, a web conferencing service, a video conferencing service, or any other service generally made available by a service provider for use by subscribers. Generally, an access node sits or resides at the edge of an access network and interacts directly with subscriber devices.

The following FIGS. 16-20 describe this general purpose ANCP in terms of a wireless mobile or cellular network. However, while described with respect to this form of communications, the techniques may apply to any network environment in which a L3 device issues control messages in accordance with ANCP to control actions of or operations performed by an access node. Moreover, the techniques may apply to any network environment in which the L2 device or access node transmits update messages to the L3 device in accordance with ANCP to update the L3 device with information describing a status of subscriber devices to which the data link layer access node connects. L2 in this context refers to a device, such as an access node, that connects or "faces" a subscriber device and performs forwarding of subscriber traffic without performing any L3 routing functions. In this context, the access node may be referred to as a data link layer access node even though the access node may implement some L3 functionality with respect to other operations, such as tunneling and signaling.

In any event, the following disclosure sets forth the techniques in terms of the wireless or cellular network environment merely to illustrate a further example in which the L2 control techniques may be implemented. Although described with respect to this wireless or cellular network environment, the techniques may be implemented in other environments. For example, the techniques may be implemented in the enterprise environment, where a set of WiFi or Wireless Local Area Network (WLAN) access nodes and switches implement the techniques.

Figure 16:
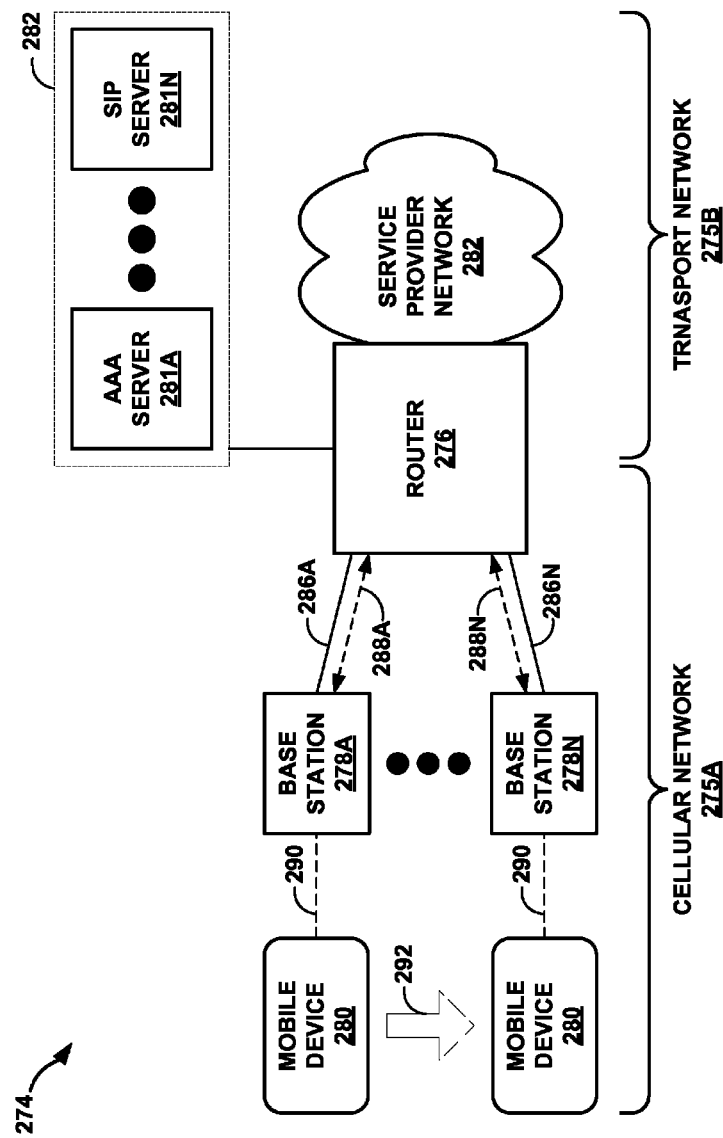
FIG. 16 is a block diagram illustrating an example cellular network environment in which a router implements the techniques described herein.

FIG. 16 is a block diagram illustrating an example cellular network environment 274 in which a router 276 implements the techniques described herein. As shown in FIG. 16, cellular network environment 274 may comprise two portions or networks, a cellular network 275A and a packet-based transport network 275B. Cellular network 275A may represent an access network by which mobile devices may access via radio or other wireless signals transport network 275B.

Packet-based transport network 275B may represent a transmission or delivery network in which data is packetized, e.g., divided into discreet units, for transmission via service provider network 282 to destinations within the Internet, other publically accessible networks and/or private networks. Typically, transport network 275B includes high-speed fiber optic links that make up a "backbone" or main transport pathway for delivery of the packets to each packets intended destination. While described with respect to packet-based networks 275B, the techniques may be implemented with respect to any form of transmission or delivery network, such as an Asynchronous Transfer Mode (ATM) network, a Ethernet network and a Multi-Protocol Label Switching (MPLS) network.

Cellular network 275A includes router 276, base stations 278A-278N ("base stations 278"), a mobile device 280. Router 276 may represent a service edge (SE) router 276 that resides at the edge of service provider network 282. Router 276 may be similar to the various SE routers described above. Router 276 may also, in some instances, be referred to as a provider edge (PE) router in that router 276 resides at the edge of provider network 282. Router 276 may implement the techniques described herein to issue control messages to access nodes, such as base stations 278 in the wireless context or switches 24, as one example, in the wireline context, in accordance with ANCP. Router 276 couples to base stations 278 via network links 286A-286N ("network links 286"). The messages, both control and update messages, sent in accordance with ANCP to each of base stations 278 are shown in FIG. 16 as messages 288A-288N ("messages 288") respectively.

Base stations 278 may each represent a tower located within a cell (not shown) of cellular network 275A. Generally, a "cell" denotes a distinct geographical area that operates according to a specific frequency or range of frequencies. Adjacent cells within a cellular network, such as cellular network 275A, typically operate according to different frequencies in order to limit interference among cells and promote frequency reuse. "Frequency reuse" refers to a property of cellular networks, such as cellular network 275A, where cells not adjacent to one another may use or reuse the same frequency without causing much if any interference due to the distance between the cells. Base stations 278 may each include one or more antennas that transmit and receive cellular signals over the specified frequency or frequency range. Base stations 278 therefore each represents any device, structure, or combination of both capable of transmitting and receiving signals from one or more mobile devices, such as mobile device 280.

Moreover, base stations 278 each represents an example access node that operates primarily in L2 or the data link layer of the OSI model to facilitate access by mobile devices to packet-based transport network 275B. Again, L2 in this context refers to a device, such as an access node, that connects or "faces" a subscriber device and performs forwarding of subscriber traffic without performing any L3 routing functions. In this context, the access node may be referred to as a data link layer access node even though the access node may implement some L3 functionality with respect to other operations, such as tunneling and signaling. Base stations 278 may each receive requests from mobile devices, such as mobile device 280, and communicate with router 276 to establish a network tunnel or other dedicated logical communication pathway between each of base station 278 and router 276. These tunnels may enable both of base stations 278 and router 276 to individually distinguish between each of the plurality of subscriber devices. Generally, a tunnel may comprise one example of a virtual data path, where a virtual data path may comprise any one of an ATM virtual circuit, an Ethernet Virtual Local Area Network (VLAN), an IP tunnel, or any other form of logical or virtual connection.

While described herein with respect to particular examples of an access node, e.g., base stations 278, the techniques may generally apply to any type of wireless access node, including the above mentioned WiFi or WLAN access nodes. Moreover, base station derivatives such as picocells and femtocells may implement the techniques.

Mobile device 280 represents a device that is usually lightweight and easily portable with relatively low power consumption, but may also include larger devices that may be stored within a vehicle or other mode of transportation. Mobile device 280 typically include one or more of a cellular or mobile phone, a smart phone, a camera phone, a personal digital assistant (PDA), a global positioning system (GPS) device, a laptop computer and any other device cable of accepting a wireless cellular access card or other input to enable communication with base stations 278. Mobile devices 280 may further include larger devices, such as a desktop computer, a workstation, and or, again, any other device capable of accepting a wireless cellular access card or other input to enable communication with base stations 278.

In general, cellular network 275A may implement any commonly defined cellular network architecture including those defined by standards bodies, such as a Global System for Mobile communication (GSM) Association, a 3rd Generation Partnership Project (3GPP), a 3rd Generation Partnership Project 2 (3GGP/2), an Internet Engineering Task Force (IETF) and a Worldwide Interoperability for Microwave Access (WiMAX) forum.

For example, cellular network 275A may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GGP. Cellular network 275A may, alternatively or in conjunction with one of the above, implement one or more of a code division multiple access-2000 ("CDMA2000") architecture, a Mobile Internet Protocol (MIP) standard, and a Fast-MIP (FMIP) standard, each as standardized by 3GGP/2. This cellular portion may, again as an alternative or in conjunction with one or more of the above, implement a WiMAX architecture defined by the WiMAX forum.

Depending on the standard, cellular network 275A may further facilitate access to network 282 or, more generally, packet-based network 275B, by implementing a mobile data protocol. For example, within the GSM architecture, cellular network 275A may implement a general packet radio service (GPRS) protocol to facilitate access to network 282. As another example, within the WiMAX Forum set of standards, cellular network 275A of environment 274 may implement a Mobile Internet Protocol (MIP) to facilitate access to network 282.

For example, in the above described GSM architecture that implements the GPRS mobile data protocol, cellular network 275A may include a serving GPRS support node (SGSN) and a gateway GPRS support node (GGSN) positioned between base stations 278 and router 276. Although not shown in FIG. 16, these special purpose devices handled voice calls and coordinated delivery of data to and from mobile devices 280. As another example, in the above described 3GPP/2 set of standards where MIP is implemented to facilitate access to network 282, cellular network 275A may include a packet data servicing node (PDSN) positioned between base stations 278 and router 276. Again, although not shown in FIG. 16, the PDSN, in this instance, is responsible for managing sessions between a cellular service provider's core or backbone network, e.g., network 282, and mobile devices, such as mobile device 20.

The architectures described above were typically not streamlined for higher performance. Recently however, subscriber interest in mobile data services and convergence of voice and data traffic onto a general purpose packet switched network, has led service providers and industry players to propose a newer cellular access architecture defined by a set of standards referred to generally as fourth (4) Generation (4G)/Next Generation Mobile Networks (NGMN), which is the name of the industry forum formed primarily by service providers.

Contrary to past conventional architectures, the 4G/NGMN set of standards attempt to isolate the packet infrastructure, e.g., packet-based network 275B, from the specificities of radio interfaces, e.g., cellular network 275A. Thus, the 4G/NGMN set of standards attempts to bifurcate the cellular radio interactions from the packet-based interactions to streamline mobile access and mobile data delivery. The 4G/NGMN set of standards, once implemented, may facilitate delivery of data from bases stations 278 to mobile devices 280 at speeds of 1 to 100 Mbs per second, which may equal or even exceed wireline broadband data delivery rates.

Cellular network environment 274, as shown in FIG. 16, may represent a next generation 4G/NGMN compliant network that is bifurcated into the above two portion, cellular network 275A and backbone or packet-based transport network 275B. Router 276, as described above, may represent a bridge between these two portions of cellular network environment 274 that replaces those specialized devices described above with respect to past cellular architectures. In other words, router 276 may implement the functionality, although in a more streamlined and efficient manner, of those specialized devices but also perform L3 services or packet-based services in addition to the cellular or L2 access services. In this respect, router 276 may bridge the bifurcation while also reducing costs associated with cellular network 275A by eliminating the need for the specialized devices.

Packet-based network 275B therefore also includes router 276 as well as servers 281A-281N ("servers 281") and service provider network 282. Router 276 may, as described above, represent a L3 device that implements L3 protocols, e.g., IP. Servers 281 generally represent support servers that provide support services, such as authentication authorization and accounting (AAA) services, and manage particular forms of communication, e.g., by providing a host for voice sessions. Service provider network 282 may include a number of computing device communicatively coupled to one another, such as routers, switches, hubs, gateways, servers, and other similar devices, by which to route or forward data in the form of packets to a destination.

Router 276 may implement the techniques described herein in order to control access nodes, e.g., base stations 278, of cellular network 275A. In this sense, router 276 may implement the techniques to extend control across the bifurcation between the two portions of cellular network environment and thereby provide for a streamlined and efficient manner by which to interact with base stations 278, while also reducing costs by eliminating the need for architecture-specific devices. Moreover, base stations 278 may implement ANCP in accordance with the techniques to update router 276 with respect to changes in communications between each of base stations 278 and mobile device 280. The techniques described herein may standardize interactions between access network and packet-based or transport networks by way of ANCP to promote efficient interaction and cost reductions, while also promoting the goal of bifurcating the access network from the transport network.

As described below in more detail, router 276 may, in one example, implement the techniques to issue control messages in accordance with ANCP to base stations 278 so as to exchange encryption keys. Router 276 may also, in another example, implement the techniques to issue control messages in accordance with ANCP to base stations 278 so as to control replication of multicast traffic at base stations 278, much as described above with respect to FIGS. 1-6B. Router 276 may also, as yet another example, implement ANCP in accordance with the techniques described herein to issue control messages to base stations 278 so as to inform base stations 278 of Quality of Service (QoS) classes or levels each subscriber device, such as mobile device 280, is to receive.

With respect to base stations 278, each of base stations 278 may also implement ANCP in accordance with the techniques described herein to, as another example, inform router 276 of changes to radio communications between mobile device 20 and base stations 278. Each of base stations 278 may, as another example, implement ANCP in accordance with the techniques described herein to, as one example, keep router 276 apprised of movement of mobile device 20 between base stations 278 (so-called "micro-mobility"). While describe below with respect to these examples, the techniques may be implemented by router 276 and base stations 278 or, more generally access nodes, to facilitate efficient communication between an access network (e.g., cellular network 275A) and a backbone or packet-based transmission network (e.g., packet-based network 275B). Moreover, these techniques may promote a standard, e.g., ANCP, by which these two networks, access and transport networks, communicate with one another. In this respect, the techniques may enable 4G/NGMN compliant networks to maintain the bifurcation of these two types of networks while promoting efficient communication and cost reduction.

In accordance with the techniques described herein, router 276 may implement ANCP to issue control messages to one or more of base stations 278 so as to exchange encryption keys. Initially, mobile device 280 may interact with one or more of base stations 278 by issuing a signal, such as a TDMA signal in a GSM-compliant cellular network 275A or a CDMA signal in a CDMA2000 compliant cellular network 275A. Mobile device 280 may further initiate a session using a mobile data protocol, such as GTP or MIP, over which mobile device 280 may access service provider network 282 or services supported by service provider network 282, e.g., a voice over Internet protocol (VoIP) or Internet protocol television (IPTV). Mobile device 280 may encode the session request in accordance with the mobile data protocol and transmit the session request via a signal to one of base stations 278.

In this manner, mobile device 280 may initiate a session requesting access to a data services provided by cellular network 275A by transmitting signals 290, e.g., a TDMA or CDMA signal, to base station 278A. A data service may comprise any service supported by service provider network 282, including browsing the Internet, VoIP, IPTV or any other packet-based service that requires a packet-based protocol, such as IP. For example, mobile device 280 may request a session to support a VoIP call.

Base station 278A may receive this signal and forward the signal to router 276. Router 276 may, in response to this signal, establish a session for mobile device 280 in accordance with a service profile, as described above, or, in terms of cellular vernacular, a "subscriber context." Router 276 may include a memory or storage device that stores this subscriber context or retrieve the subscriber context from another device located within service provider network 282, such as one of support servers 281. Regardless, the subscriber context may define, for example, a level or quality of service, encryption keys, address information, multicast group memberships, and charging and accounting information to account for the services provided to the particular mobile device. Router 276 may retrieve and maintain this subscriber context in accordance with techniques set forth in co-pending U.S. patent application Ser. No. 12/190,276, entitled "Transferring Dynamic Subscriber Contexts During Handover in Cellular Networks," filed Aug. 12, 2008, by inventors Jerome P. Moisand et al., herein incorporated by reference as if fully set forth herein.

As the subscriber context or service profile may define the encryption keys, router 276 may transmit these encryption keys via one of control messages 288A to base station 278A in accordance with ANCP. Alternatively, if the subscriber context does not include the encryption keys, router 276 may access Authentication, Authorization, and Account (AAA) server 281A ("AAA server 281A"), which may comprise a Remote Authentication Dial In User Service (RADIUS) server, and request encryption keys for use by mobile device 280 from AAA server 281A. In any event, router 276 may in some manner determine encryption keys and forward these encryption keys to base station 278A via one of control messages 288A in accordance with ANCP.

Base station 278A may forward the encryption keys to mobile device 280 via radio or other wireless or cellular signal 290. Mobile device 280 may utilize these encryption keys to encrypt communications originating from mobile device 280, e.g., both a voice call and data traffic. Mobile device 280 may also utilize these encryption keys to decrypt communications received by mobile device 280.

As another example, router 276 may also implement ANCP in accordance with the techniques described herein to issue control messages by which to control replication of multicast traffic, which may be referred to as "multicast elaboration," by base station 278A. As described above with respect to SE router 22, router 276 may receive a multicast join/leave message, e.g., an IGMP host membership report, from a subscriber device, which in this context comprises mobile device 280. Router 276 may access the above described subscriber context associated with mobile device 280 to determine whether mobile device 280 is authorized to access the requested multicast content similar to that described above with respect to SE router 22.

In this context, if authorized, router 276 may send or issue a control message in accordance with ANCP to base station 278A to dynamically update multicast filter information maintained by base station 278A, which may be similar to above described multicast filter information 36 maintained by switch 24. This one of control messages 288A may include the VC or MAC address of the requesting one of the subscriber devices, e.g., mobile device 280, and the requested action, i.e., join or leave. The message also may include the selected VC or VLAN or Tunnel-Id, or the assigned multicast MAC address. As described above, the message may be an in-band IP message, and may be sent to base station 278A via a designated control VC or VLAN or Tunnel-Id. Base station 278A may utilize the information sent via the control message to elaborate or replicate multicast packets received from router 276, as described above.

Router 276 may, as yet another example, implement ANCP in accordance with the techniques described herein to issue control messages to base stations 278 so as to inform base stations 278 of Quality of Service (QoS) classes or levels each subscriber device, such as mobile device 280, is to receive. Router 276 may determine these QoS classes from the above described subscriber context, which may indicate similar QoS criteria as QoS profiles 116 described above with respect to FIGS. 7-10. In fact, router 276 may implement ANCP to perform substantially similar operations to those described above with respect to SE routers 112.

To illustrate, router 276 may implement many of the same techniques described with respect to the wireline example of FIG. 10 above in the context of this cellular environment. That is, router 276 and base stations 278 device use QoS information to provide packet transmission according to a requested QoS class for a packet flow, which, in the illustrated example, is a VoIP call. When a subscriber using a subscriber device, e.g., mobile device 280 initiates a VoIP call, router 276 receives a VoIP request message from mobile device 280. The request message may request authentication and authorization for a VoIP call with packet transmission according to a particular QoS class.

Router 276 checks authentication/authorization information, which may be similar to the above information 42, to authenticate and authorize the subscriber (162), and to retrieves QoS information for the VoIP call the subscriber context. Router 276 may then send a control message in accordance with ANCP to base station 278A that includes the QoS information used by base station 278A to provide packet transmission according to the requested QoS class for the VoIP call. As described above, the control message may be an in-band message, and may be sent to base station 278A via a dedicated control VC or VLAN or IP tunnel. Based on the information contained in the control message, base station 278A may dynamically configures a QoS profile similar to QoS profile 120 for a layer-2 link between base station 278A and the subscriber device, e.g., mobile device 280. Router 276 may also communicate with SIP server 281N to set up the VoIP call.

Base station 278A may forward VoIP packets to the attached subscriber device and to provide packet transmission according to the requested QoS class by, for example, preferentially queuing the VoIP packets. Router 276 forwards VoIP packets to provide packet transmission according to the QoS class indicated by QoS information by, for example, forwarding the VoIP packets on a route or packet flow across network 122 that is designated for VoIP packet traffic and configured by SIP server 281N.

Base stations 278 may also each implement ANCP to not only receive these control messages but also to issue update messages to router 276. As one example, base stations 278 may implement ANCP in accordance with the techniques described herein to issue update messages 288 to router 276 so as to inform router 276 of changes to signals 290. To illustrate, base station 278A may monitor attenuation or other metrics of signal 290 between mobile device 280 and base station 278A. Base station 278A may detect a change in the attenuation of signal 290 due to weather, such as rain, obstructions, such as building, or other events. Base station 278A may issue an update message, e.g., one of messages 288A, to router 276 to inform router 276 of the change in signal 290. This signal change update message may include the extent of the change, e.g., a drop in a capacity of signal 290 or attenuation of signal 290.

Upon receiving this signal change update message, router 276 may update queuing of data received from mobile device 280 according to the extent of the change defined by the signal change update message. The signal change update message may, as an example, indicate that radio capacity between mobile device 280 and base station 278A has decreased from 2 Mega-bits (Mb) per second (s) to 1 Mb/s. Router 276 may then decrease the quality of service for the session maintained for mobile device 280 considering that router 276 may not expect to receive as much traffic from mobile device 280. Alternatively, router 276 may increase the quality of service for the session maintained for mobile device 280 in order to compensate for the attenuation of the signal and likely increase in transmission errors.

In another embodiment, each of base stations 278 may implement ANCP to keep router 276 apprised of movement by mobile device 280 between base stations 278. This movement is referred to as "micro mobility." For example, base station 278A may have previously established a session for mobile device 280 and received signals from mobile device 280. Mobile device 280 may, however, not remain in a fixed position but instead move within various cells of cellular network 275A, where each cell communicates with mobile device 280 via a respective one of base stations 278.

As mobile device 280 moves towards the edge of the cell in which base station 278A is responsible for managing cellular or radio communications to the edge of the adjacent cell in which base stations 278N is responsible for managing cellular or radio communication, base station 278A may detect this movement as an attenuation of the strength of radio signal 290. FIG. 16 illustrates this movement by mobile device 280 as micro-mobility event 292 indicated by a large arrow labeled 292. While described with respect to attenuation, base stations 278 may detect these events 292 in any number of other ways, including measuring a signal-to-noise ratio or other metrics associated with signal 290.

Upon detecting the upcoming occurrence of micro-mobility event 292 in this manner, base station 278A may issue an update message, such as one of messages 288A, in accordance with ANCP to inform router 276 of upcoming micro-mobility event 280. Base station 278A may include within this micro-mobility update message the one of base stations 278, e.g., base station 278N, to which mobile device 280 will reestablish communication upon entering the cell in which that one of base stations 278 is responsible for managing communications. Router 276 may utilize this micro-mobility update message to update necessary information required to forward information received from mobile device 280.

To illustrate, base station 278A may establish a tunnel between base station 278A and router 276 by which base station 278A forwards communications for mobile device 280 to router 276. Upon receiving the micro-mobility update message, router 276 may initiate a new tunnel with base station 278N and update internal information, such as flow tables, to reflect this new tunnel. Router 276 may therefore prepare for micro-mobility event 292 in advance of the actual occurrence of micro-mobility event 292. In this respect, rather than require a vendor-specific or architecture specific interface that often requires additional vendor-specific devices, ANCP enables a general network device, e.g., router 276, to communicate with access nodes, e.g., base stations 278, of the access network, e.g., cellular network 275A.

In this manner, router 276 of packet-based transport network 275B may receive a request via an access node of an access network, such as one of base stations 278 of cellular network 275A, from a mobile device 280 that requests one of the above described network services provided by service provider network 282. This request may be for general access, such as in the example above where router 276 exchanges encryption keys, or may be specific such as in the example above where router 276 receives a particular multicast join/leave message. The request may also be specific to a particular service, such as VoIP, as in the example above where router 276 receives a VoIP session request.

While described with respect to receiving a request from the subscriber device, the network device, e.g., router 276, may receive these requests from other devices as well, such as a management system that initiates a service request or some business logic application server that implements a calendar function. In this respect, router 276 may therefore receive a request to provide a service to the subscriber device rather than directly receive the request from the subscriber device. The techniques should therefore not be limited to the example described herein.

In any event, in response to receiving the request, router 276 may access information relating to a subscriber context that is associated with the subscriber. This subscriber context may comprise, as described above, one or more quality of service (QoS) levels or classes, encryption keys, address information, multicast group memberships, and charging and accounting information to account for the services provided to the particular mobile device. Router 276 may maintain this subscriber context locally or retrieve this subscriber context upon mobile device 280 first attempting to access service provider network 282.

Based on this subscriber context, router 276 may dynamically configure a control object stored by a data link layer device, e.g., base station 278A, in accordance with the subscriber context to control base station 278A to facilitate packet transmission for the subscriber, e.g., an operator of mobile device 280, between base station 278A and router 276 in accordance with the subscriber context. Particularly, router 276 may issue a message 288 in accordance with ANCP as set forth in the examples above to dynamically configure the control object.

Furthermore, an access node of an access network, such as base stations 278A, may, in this manner, receive a request from a mobile device via a wireless signal, such as a radio or cellular signal, requesting a service provided by a service provider network of a transmission network, e.g., network 275B. Base station 278A may forward this request to a layer three network device, e.g., router 276, of the packet-based transmission network 275B. Base station 278B may receive, in response to this request, a message 288 in accordance with ANCP that dynamically configures a control object maintained by base station 278B in accordance with the above described subscriber context. Base station 278B may then deliver subsequent packets received from mobile device 280 in accordance with the control object to router 276.

Base station 278A may also monitor wireless communications with mobile device 280 and based on these monitored communications forward update messages 288 to router 276 in accordance with ANCP. The update messages may inform router 276 of the status of the wireless communications so as to enable router 276 to adapt delivery of packets to and from mobile device 280 to account for changes in the status of the wireless communications.

Figure 17:
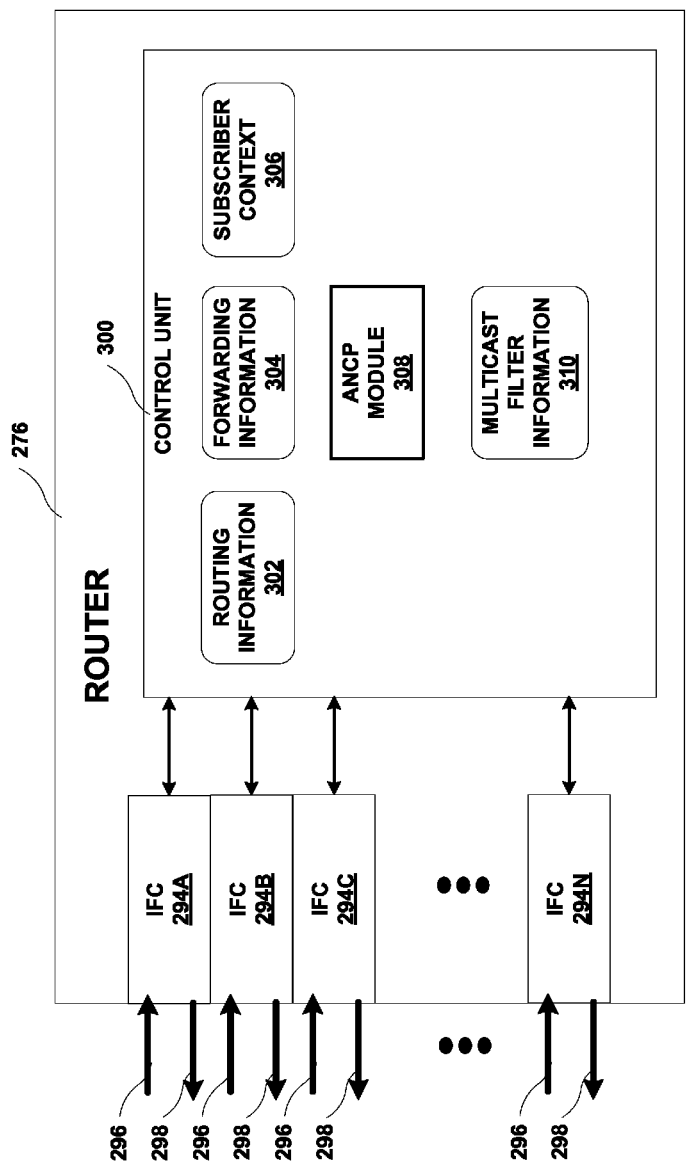
FIG. 17 is a block diagram illustrating an example embodiment of the router of FIG. 16 in more detail.

FIG. 17 is a block diagram illustrating an example embodiment of router 276 of FIG. 16 in more detail. Router 276 may be substantially similar to any of routers 22, 112 and 182 described above. In this example, router 276 includes interface cards 294A-294N ("IFCs 294") that each receives and sends packet flows via network links 296 and 298, respectively. IFCs 294 are typically coupled to network links 296, 298 via a number of interface ports (not shown). Router 276 may include a chassis (not shown) having a number of slots for receiving a set of cards, including IFCs 294. Each card may be inserted into a corresponding slot of a chassis for electrically coupling the card to a control unit 300 via a bus, backplane, or other electrical communication mechanism.

In general, router 276 receives inbound packets from network links 296, determines destinations for the received packets, and outputs the packets on network links 298 based on the destinations. More specifically, upon receiving an inbound packet via one of inbound links 296, a respective one of IFCs 294 relays the packet to control unit 300. In response, control unit 300 reads a block of data from the packet, referred to as the "header," which may include an IP address indicating the destination for the packet, and forwards the packet based on this IP address.

Control unit 300 may comprise hardware, e.g., one or more of a programmable processor, a Field Programmable Gate Array (FPGA), an Application Specific Special Product (ASSP), an Application Specific Integrated Circuit (ASIC), an integrated circuit, etc., and a computer-readable storage medium or memory, e.g., static memory (a hard drive, an optical drive, a disk drive, FLASH memory, etc.) and/or dynamic memory (a Random Access Memory or RAM, dynamic RAM or DRAM, etc.). In some instances, the computer-readable storage medium may comprise instructions, such as those used to define a software or computer program, that cause the above listed programmable processor to perform the techniques described herein.

Router 276, generally, and control unit 300, particularly, maintains routing information 302 that describes the topology of network 282, e.g., routes and/or next hops through network 282. Router 276 exchanges routing information with other routing devices within network 282, thereby learning routes and/or next hops through the network. Router 276 may exchange routing information with other routing devices in accordance with one or more routing protocols, such as the Border Gateway Protocol (BGP).

Control unit 300 then generates, based on routing information 302, forwarding information 304. Control unit 300 may select routes or next hops for packets, e.g., by determining on which of links 298 to forward the packets and then generate forwarding information 304 such that information 304 identifies those selected ones of links 298 and associates the selected links with particular IP destination addresses.

Control unit 300 may also maintain subscriber context 306, which as described above may define information pertinent for delivery of network services to a corresponding subscriber. Subscriber context 306 may include the above described QoS profile or information and service profiles. Thus, while not shown in FIG. 17 for ease of illustration purposes, control unit 300 may store both QoS information and service profiles separately rather than combined within the same data structure or file referred to herein as a "subscriber context." Control unit 300 may further include ANCP module 308 by which to generate and receive messages, such as messages 288, in accordance with ANCP. ANCP module 308 may represent a hardware and/or software module that implements ANCP and thereby enable control unit 300 to generate and issue control messages and receive update messages. Control unit 300 may also maintain multicast filter information 310, which may be similar to multicast filter information 32 discussed above.

Control unit 300 may receive via one of inbound links 396 and IFCs 294 a request from one of base stations 278, e.g., base station 278A. Mobile device 280 may generate and transmit this request wirelessly as a signal 290 to base station 278A, which forwards the request as a packet to control unit 300. Control unit 300 may inspect the packet to determine whether this request requests a new mobile session or refers to a previous mobile session. If a new session, control unit 300 may communicate with one or more of support servers 281 to retrieve subscriber context 306 associated with mobile device 280. After retrieving subscriber context 306, control unit 300 may parse subscriber context 306 to retrieve encryption keys. Alternatively, control unit 300 may parse subscriber context 306 to determine an address associated with mobile device 280 and request encryption keys from AAA server 281A for mobile device 280.

After determining the encryption keys in either one of these ways or any other common way, control unit 300 may employ ANCP module 308 to generate a control message that includes the encryption keys. ANCP module 308 may generate the control message such that the control message includes the encryption keys, whereupon control unit 300 forwards this control message to base station 278A via one of IFCs 294 and outbound links 298. In this manner, router 276 may implement the techniques to control delivery of encryption keys by base station 278A to mobile device 280.

Alternatively, if a session is previously established, control unit 300 may receive a request that requests a new set of encryption keys. This renegotiation and subsequent redistribution of new keys may occur periodically, e.g., every one, two or more hours, over the course of a connection to provide additional security. Control unit 300 may access AAA server 281A in response to this request to retrieve a new set of encryption keys, update subscriber context 306 with the new set of encryption keys and employ ANCP module 308 to generate another control message by which to transmit the new set of encryption keys. Control unit 300 may forward this control message to base station 278A in order to redistribute the new set of encryption keys.

In some instances, control unit 300 may receive the above described request for multicast content, e.g., IGMP join/leave messages, from mobile device 280. Control unit 300 may access subscriber context 306 to determine whether mobile device 280 is authorized to access the multicast content identified in the request. If not, control unit 300 may decline the request. However, if authorized, control unit 300 may update multicast filter information 310 in the manner described above with respect to router 22 and replicate and forward received multicast packets based on multicast filter information 310, also in the manner described above.

In addition, control unit 300 may employ ANCP module 308 to generate a control message. This multicast control message may indicate to base station 278A that mobile device 280 has joined a particular multicast group and that base station 278A is to replicate multicast content from the identified group to mobile device 280. In this sense, the multicast control message may offload a portion of the replication burden from router 276 to base station 278A.

In other instances, control unit 300 may receive requests pertinent to particular services, such as a VoIP call or session. Control unit 300 may inspect these requests to determine the particular service requested and then access subscriber context 306 to determine a QoS class or level the subscriber has contracted with the service provider. In some instances, the subscriber, e.g., operator of mobile device 280, may contract with the service provider such that the service provider guarantees a certain QoS class for particular service or on a per-service basis.

For example, the subscriber using mobile device 280 may contract with the service provider of service provider network 282 such that this service provider provides a first QoS class for VoIP services, a second QoS class different form the first for game services, and a third QoS class different from the others for a web conferencing service. The service provider may offer this as a package or on another basis. Subscriber context 306 may therefore indicate this combination of QoS classes using a single QoS class or by defining an association between services and QoS classes. Regardless, control unit 300 may identify the particular service requested and employ ANCP module 308 to generate a control message that identifies the particular QoS class associated with the determined service. Control unit 300 may forward this QoS control message to base station 278A. Base station 278A may then form a tunnel and take actions so as to ensure delivery of the contracted QoS class identified by the QoS control message, as described above.

In this manner, router 276, an example of an L3 device, may implement ANCP according to the techniques described herein to issue control messages to dynamically configure a control object maintained by a base station, such as base station 278A. By configuring this control object, router 276 may, in a wireless or cellular network environment, control base station 278A to provide data link layer or, in some instances, network layer functionality in accordance with the request.

Router 276 may also receive update messages 288 from one or more of base stations 278 in accordance with ANCP. In particular, control unit 300 may receive update message from, for example, base station 278A via one of inbound links 296 and a respective one of IFCs 294. ANCP module 308 may receive the update message and parse the update message to determine a type of update message, e.g., whether the update message refers to a micro-mobility event or a status of a wireless communication.

In some instances, ANCP module 308 may determine that the type of update message is a micro-mobility update message. ANCP module 308 may parse the message to retrieve information pertinent to this micro-mobility event, such as an address assigned to the current base station and an address assigned to the adjacent base station to which the mobile device is entering a cell serviced by this adjacent base station. Control unit 300 may use this information in order to update tunnel and other information maintained for each subscriber. In particular control unit 300 may update subscriber context 306 to reflect the micro-mobility event or other information maintained by control unit 300 to facilitate delivery of packets for the particular subscriber device.

In other instances, ANCP module 308 may determine that the type of update message is a status update message describing a status of wireless communication between base station 278A, for example, and mobile device 280. ANCP module 308 may parse the message to determine the impacted subscriber or mobile device, e.g., mobile device 280, and the extent of the impact, e.g., change in status, which may be represented as a change in attenuation, a reduction in wireless bandwidth, a signal-to-noise ratio, or other wireless status metric. Control unit 300 may update subscriber context 306 to reflect this change and also update flow tables or other information pertinent to forwarding data for the impacted mobile device, such as forwarding information 304.

In this manner, router 276 may not only issue control messages but also receive update messages so as to keep informed of communications between base stations 278 and mobile device 280. Router 276 may utilize these update message received in accordance with ANCP to facilitate the transfer of data for that subscriber and possibly account for the changes to the communications. IN this respect, ANCP may be considered a two-way protocol that provides for a standardized interface between access nodes and transport nodes, e.g., router 276. This standardized form of communication may facilitate the bifurcation of access networks and transport networks.

Figure 18:
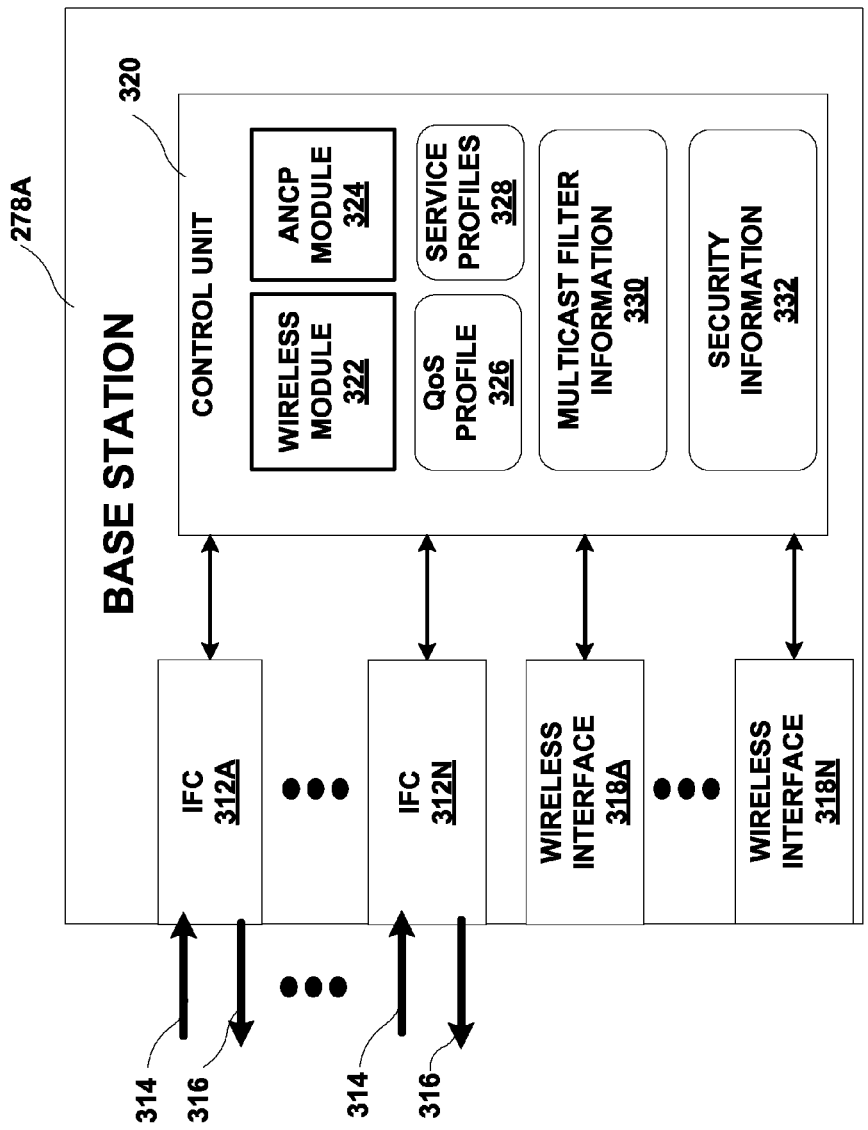
FIG. 18 is a block diagram illustrating an exemplary embodiment of the base station of FIG. 16 in more detail.

FIG. 18 is a block diagram illustrating an exemplary embodiment of base station 278A of FIG. 16 in more detail. Similar to switches 24, 184 and CPE device 114 described above, base station 278A includes IFCs 312A-312N ("IFCs 312") that each receives and sends flows of ATM cells or Ethernet frames via links 314 and 316, respectively. In general, base station 278A receives cells or frames from network links 314, and forwards cells or frames via network links 316 based on information contained in the header of the cells, frames, or encapsulated packets. Base station 278A may communicate with router 276 via one or more of links 314 and 316.

Base station 278A may also include wireless interfaces 318A-318N ("wireless interfaces 318") by which to communicate with wireless mobile devices, such as mobile device 280, via wireless signals. Wireless interfaces 318A may reside internal to base station 278A, as shown in FIG. 18, or external to base station 278A, such as in a separate rack or storage facility. In some instances, wireless interfaces 318 may comprise a port or other interface by which to couple antennas and other wide-range wireless equipment commonly required to communicate wirelessly with wireless mobile devices, e.g., cellular phones. Often, these antennas and other equipment may be installed on towers or other high locations to provide adequate coverage and reduce interference and wireless interface 318 may couple to the antennas and other equipment via the port or other interface.

Base station 278A may include a control unit 320 to which both of IFCs 312 and wireless interfaces 318 may couple. Control unit 320 may comprise hardware, e.g., one or more of a programmable processor, a Field Programmable Gate Array (FPGA), an Application Specific Special Product (ASSP), an Application Specific Integrated Circuit (ASIC), an integrated circuit, etc., and a computer-readable storage medium or memory, e.g., static memory (a hard drive, an optical drive, a disk drive, FLASH memory, etc.) and/or dynamic memory (a Random Access Memory or RAM, dynamic RAM or DRAM, etc.). In some instances, the computer-readable storage medium may comprise instructions, such as those used to define a software or computer program, that cause the above listed programmable processor to perform the techniques described herein.

Control unit 320 may include a wireless module 322 and an ANCP module 324. Wireless module 322 may monitor signals, such as signals 290, received via wireless interfaces 318. Wireless module 322 may determine attenuation, signal-to-noise rations, and any other wireless signal metric commonly used to determine deficiencies or a status of wireless communication signals. ANCP module 324 may be substantially similar to ANCP module 308 described above with respect to FIG. 17, except that ANCP module 324 may receive, not issue, control messages and issue, not receive, update messages.

Control unit 320 maintains QoS profile information 326 ("QoS profile 326"), service profiles 328 and multicast filter information 330. QoS profile 326 may be similar to QoS profile 120 described above. Service profiles 328 may be similar to service profiles 210 described above. Multicast filter information 330 may be similar to multicast filter information 36 described above. Control unit 320 may further maintain security information 332 that stores encryption keys used for encrypting communications originating from mobile device 280 between base station 278A and router 276. Each of QoS profile 326, service profiles 328, multicast filter information 330 and security information 332 may represent one or more control objects that control unit 320 may dynamically configure or update in response to receiving control messages from router 276.

That is, ANCP module 324 may receive control messages in accordance with ANCP and parse these messages to determine the type of the control message, e.g., whether the control message relates to a QoS for a particular flow, QoS for a particular subscriber, multicast replication or security and/or encryption keys. Based upon the type of control message, ANCP module 324 may parse the control message according to its type. For example, if ANCP module 324 determines that the control message is a security control message defining a set of one or more encryption keys, ANCP module 324 may parse this security control message to extract the keys and store these keys to security information 332.

Alternatively, upon determining that the control message is a QoS control message defining a set QoS for a subscriber regardless of the application, ANCP module 324 may parse the QoS class and update one of QoS profiles 326 corresponding to mobile device 280, as described above. If, as another example, ANCP module 324 determines that the type of message provides a QoS class for a particular application, ANCP module 324 may parse the QoS class and one or more flows to which the application is associated and update one of service profiles 328 to associate the QoS class with the flows, as described above. ANCP module 324 may also determine that the control message is, in some instances, a multicast control message that indicates whether mobile device 280 has joined or left a multicast group. ANCP module 324 may, in this instance, parse an address identifying mobile device 280 and the action taken, e.g., the join or leave, and update multicast filter information 330 accordingly.

In this manner, router 276 may issue control message in accordance with ANCP, which base station 278A may receive and parse to update control objects, e.g., one or more of QoS profile 326, service profile 328, multicast filter information 330, and security information 332. As described above, in so updating these control objects, router 276 may control how base station 278A delivery data originating from a particular wireless mobile device, such as mobile device 280. Base station 278A may receive this data via wireless interfaces 318 and forward this data in accordance with the various control objects described above via IFCs 312.

Base station 278A, generally, and wireless module 322, particularly, may also monitor signals received via wireless interface 318. Wireless module 322 may detect the above described micro-mobility event and inform ANCP module 324 of this micro-mobility event by indicating the current base station, e.g., base station 278A, and the base station to which the mobile device will subsequently interface with after the micro-mobility event. ANCP module 324 may, upon receiving this indication of the micro-mobility event, generate a micro-mobility update message and forward this micro-mobility update message via one of IFCs 312 to router 276.

Wireless module 322 may also detect changes in attenuation or, more generally, a status of signals received via wireless interfaces 318 and inform ANCP module 324 of these changes. ANCP module 324 may then generate a status update message that defines the change in status and the particular mobile device impacted by this change in the status of wireless communications. ANCP module 324 may, again, forward this status update message to router 276. In this respect, base station 278A may issue update message to keep router 276 apprised of the status of wireless communications with mobile cellular devices, such as mobile device 280, which router 276 may utilize in efficiently delivering or transporting data from these mobile device, as described above.

Figure 19:
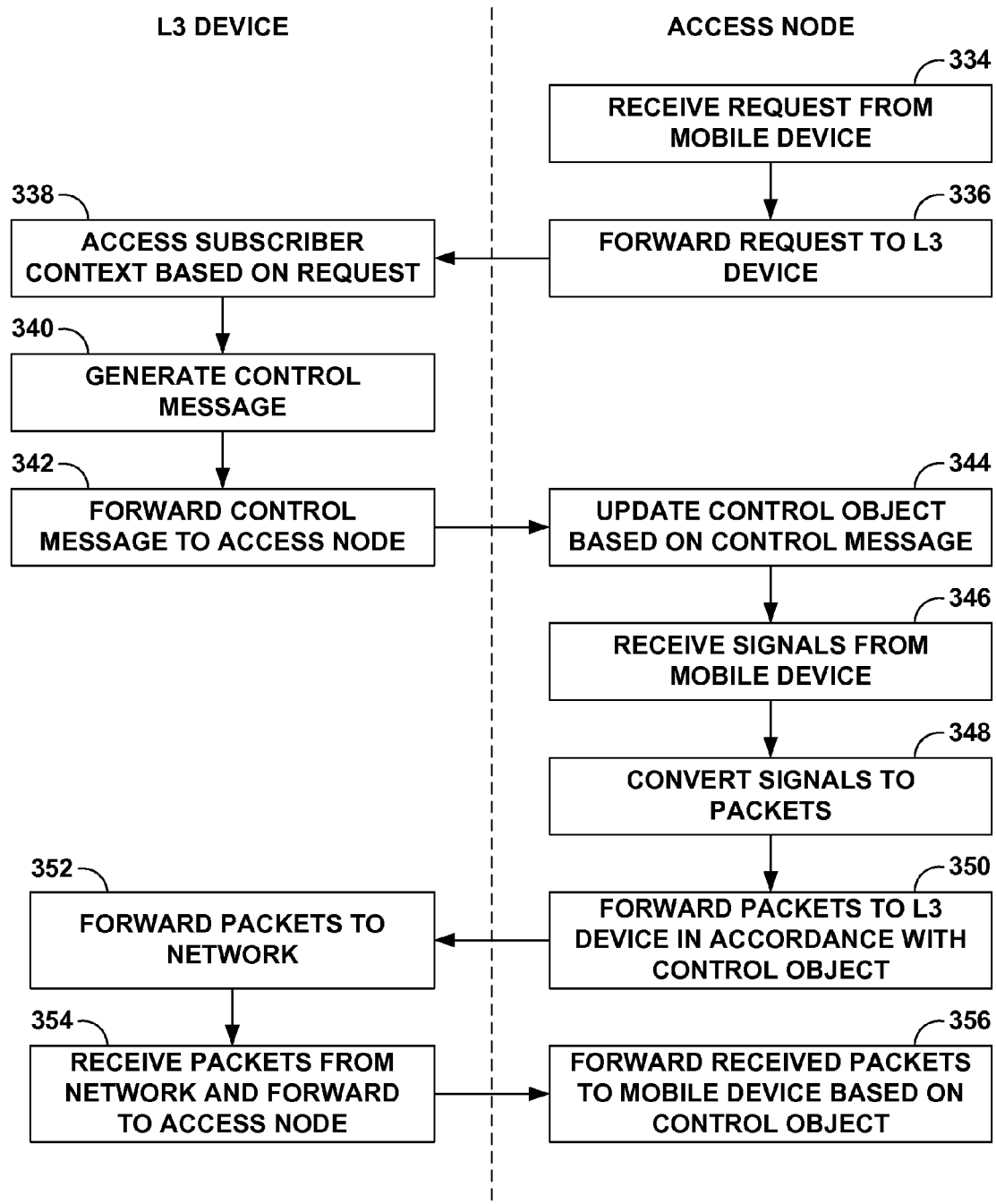
FIG. 19 is a flowchart illustrating general operation of L3 network device and a wireless access node in implementing ANCP to generate and forward control messages in accordance with the techniques described herein.

FIG. 19 is a flowchart illustrating general operation of L3 network device, such as router 276 of FIG. 17, and a wireless access node, such as base station 278A of FIG. 18, in implementing ANCP in accordance with the techniques described herein. Particularly, FIG. 19 illustrates an exemplary implementation of the techniques by router 276 to issue control messages that facilitate delivery of data originating from and destined for a wireless mobile device, such as mobile device 280. Although described below with respect to exemplary embodiments of router 276 of FIG. 17 and base station 278A, the techniques may be implemented by any L3 transport device and any access node whether the data link layer access node wirelessly interacts with a subscriber device or not. In this respect, the techniques provide a general purpose protocol, referred to as ANCP, by which a network device of a transport portion of a network may interact with an access node of an access portion of a network. Moreover, this same general purpose protocol may enable the data link layer access node to interact or at least update the network device of the transport portion.

For example, base station 278A may initially receive a request from a mobile device 280 (334). That is, one of wireless interfaces 318 of base station 278A may receive a signal, such as wireless signal 290 of FIG. 17, from mobile device 280. This one of wireless interfaces 318 then forwards the signal to control unit 320, which processes signal 290 to determine the request. Control unit 320, after determining the request, may forward the request upstream, e.g., towards transport network 275B, to router 276 (336).

Router 276 receives the request and access subscriber context 306 based on the received request (338). That is, one of IFCs 294 may receive the request as a packet or other discreet data unit and forward the request to control unit 300. In some instances, control unit 300 may parse the received request to determine an address or other identifier from the request that uniquely identifies mobile device 280. Based on this identifier, control unit 300 may query one or more of support servers 281 to access remotely or download and then access locally subscriber context 306 associated with mobile device 280. Control unit 300 may access subscriber context 306 to determine, for example, encryption keys, multicast group memberships (e.g., premium or standard memberships), particular QoS class for a subscriber or application, or any other information pertinent to establishing a session with mobile device 280 and delivery content to and from mobile device 280 in the manner described above.

Based on the request, e.g., the type of request, control unit 300 generally and ANCP module 308 particularly may generate a control message (338). To reiterate the above described examples, control unit 300 may determine that the request comprises a request for a new data session and control unit 300 may parse subscriber context 300 to determine encryption keys. ANCP module 308 may generate a control message that includes these encryption keys. Control unit 300 may also determine a QoS class assigned to the particular subscriber from subscriber context 306, and ANCP module 308 may include within either the same or a different control message the QoS class, as well. Alternatively, control unit 300 may determine that the request comprises a request for a particular service, whereupon control unit 300 may access subscriber context 306 to determine a particular QoS class for the requested service. ANCP module 308 may generate a control message in this instance that includes the particular QoS class for the service. As another example, control unit 300 may determine that the request includes a request to join or leave a multicast group. In this instance, ANCP module 308 may generate a control message that defines the action, e.g., join or leave, and the particular multicast group to which the action corresponds. ANCP module 308 may then forward one or more of these control messages to base station 278A (342).

Base station 278A, after receiving the control message, updates a control object based on the control message, as described above (344). To illustrate, control unit 320 of base station 278A may receive the control message via one of IFCs 312 and forward the control message to ANCP module 324. ANCP module 324 may then determine the type of control message and extract information based on the type of control message, e.g., security, multicast, and QoS, as described above. If the type of control message is a security control message, for example, ANCP module 324 may extract the encryption keys from the security control message. Regardless, control unit 320 may then, based on this information extracted from the control message, update one or more of the control objects, e.g., QoS profile 326, service profiles 328, multicast filter information 330, and security information 332, maintained by control unit 320 of base station 278A.

In some instances, base station 278A may also communicate with mobile device 280 in response to receiving the control message. Base station 278A may, as an example, forward the encryption keys to mobile device 280 or may otherwise communicate with mobile device 280 to establish a session or flow according to the QoS class indicated by the control message. Base station 278A may form a tunnel or otherwise ensure secure delivery of traffic between base station 278A and router 276. In other words, base station 278A may perform other operations not explicitly set forth in the flowchart of FIG. 19 in order to establish or otherwise secure communications between two or more of mobile device 280, base station 278A and router 276. The techniques therefore should not be limited to the exemplary steps shown in FIG. 19, but may include other steps, operations, or processes executing either simultaneous to or concurrently with the techniques to facilitate communications.

Regardless, base station 278A receives, at some point after updating the above control objects, signals 290 from mobile device 280 via one of wireless interface 318 (346). Control unit 320 may convert these signals 290 into packets or other discreet data units and forward these packets to router 276 in accordance with the control objects (348, 350). For example, control unit 320 may encrypt the packets in accordance with encryption keys parsed from the control message and stored to a control object shown in FIG. 19 as security information 332. Likewise, control unit 320 may employ the other control objects in the manner described above to process, forward or otherwise deliver the packet to router 276 in accordance with these other control objects.

Router 276 may receive these packets and forward the packet to service provider network 282 (352). Router 276 may also forward these packets in accordance with subscriber context 308. That is, router 276 may forward these packets in accordance with a particular QoS class or otherwise provide services, e.g., contacting SIP server 281N to establish a SIP session for a VoIP call, to facilitate delivery of the packets in accordance with subscriber context 308. Router 276, after forwarding these packets, receive packets in response to the forwarded packets and forward these response packets to base station 278A (354). Base station 278A may receive these response packets from router 276 via IFCs 312, whereupon control unit 320 may forward these response packets in accordance with the control objects, as described above (356).

Figure 20:
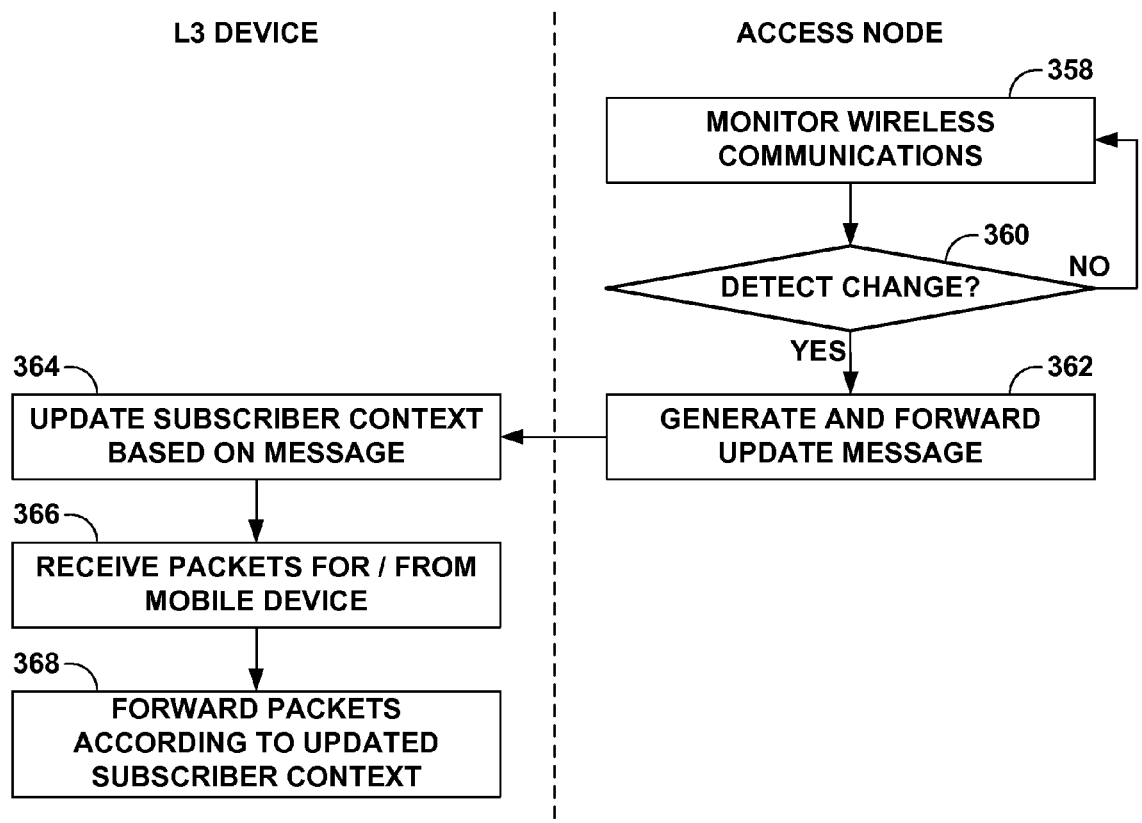
FIG. 20 is a flowchart illustrating general operation of L3 network device and a wireless access node in implementing ANCP to generate and forward update messages in accordance with the techniques described herein.

FIG. 20 is a flowchart illustrating general operation of L3 network device, such as router 276 of FIG. 17, and a wireless access node, such as base station 278A of FIG. 18, in implementing ANCP in accordance with the techniques described herein. Particularly, FIG. 20 illustrates an exemplary implementation of the techniques by base station 278A to issue update messages that facilitate delivery of data originating from and destined for a wireless mobile device, such as mobile device 280. Although described below with respect to exemplary embodiments of router 276 of FIG. 17 and base station 278A, the techniques may be implemented by any L3 transport device and any access node whether the data link layer access node wirelessly interacts with a subscriber device or not. In this respect, the techniques provide a general purpose protocol, referred to as ANCP, by which a network device of a transport portion of a network may interact with an access node of an access portion of a network. Moreover, this same general purpose protocol may enable the data link layer access node to interact or at least update the network device of the transport portion.

Initially, the data link layer access node, which in the example of FIG. 20 is represented by base station 278A, monitors wireless communications, e.g., wireless signals 290, between mobile device 280 and base station 278A (358). Further, base station 278A may include a wireless module 322 executing or included within control unit 320 of base station 278A that monitors wireless signals 290 received via one or more of wireless interfaces 318. Wireless module 322 may maintain a log or other record of various metrics related to signals 290, such as a signal-to-noise ratio, an attenuation level or amount, a signal strength or any other commonly monitored signal metric. Wireless module 322 may determine one or more of these metrics for signals 290 and store the one or more metrics to the log.

Periodically or, in some instances, continually, wireless module 322 may analyze the logs or records to detect changes in the metrics indicative of a change in signals 290 (360). That is, wireless module 322 may determine that the most recently determined attenuation level has changed beyond a threshold level when compared to second recently monitored attenuation level or an average of a set of preceding attenuation levels. Alternatively, wireless module 322 may determine that the most recently determined signal-to-noise ratio has exceeded a threshold signal-to-noise ratio.

As another example, wireless module 322 may detect attenuation of wireless signals 290 and proceed to determine whether a micro-mobility event is about to occur whereby mobile device 290 moves from the cell serviced by base station 278A to an adjacent cell serviced by another one of base stations 278, e.g., base station 278B. If so, wireless module 322 may determine the change as a micro-mobility event. In this respect, detecting a change may generally refer to detecting any change in wireless communications between the mobile device and base station 278A, including changes that may cause base station 278A to hand-off or otherwise stop communicating with mobile device 280. In any event, wireless module 322 may detect a change in signals 290 via any one of a number of methods, algorithms or other processes by which such change is commonly detected.

If no change is detected ("NO" 360), wireless module 322 continues monitoring signals 290 in an attempt to detect a change (358, 360). If a change is detected ("YES" 360), ANCP module 324 may generate and forward an update message that identifies the change and includes any other information necessary to inform router 276 of the change (362). If a change in a status of a wireless communication occurs, for example, ANCP module 324 may generate the above described status update message to indicate the change and forward this status update message to router 276. If a change in location of a wireless communication due to movement of mobile device 280 out of the cell managed by base station 278A occurs, ANCP module 324 may generate the above describe micro-mobility update message to keep router 276 apprised of this wireless communication event.

In response to receiving an update messages, router 276 and more particularly control unit 300 of router 276 may update subscriber context 308 based on the update message (364). Particularly, ANCP module 308 may parse the update message to determine the type of message, e.g., status or micro-mobility, and extract information pertinent to forwarding information, such as the change in status or address of the next base station handling the wireless communications. Control unit 300 may update subscriber context 306 with this information, as well as, update forwarding information 304 or any other information necessary to maintain the contracted QoS class or level for mobile device 280 given update message. Control unit 300 may also take affirmative action in the instance of a micro-mobility event by negotiating a new tunnel with the next one of base stations 278 to which signals 290 are to be handed-off from base station 278A.

Router 276 may then receive packets destined for or originating from mobile device 280 (366), which in the latter case are forwarded by base station 278A (but not shown in FIG. 20 for ease of illustration). Router 276 may forward packets according to the updated subscriber context 368 so as to account for the changes indicated by the update message (368). In this manner, router 276 may receive message as well as generate and forward messages in accordance with ANCP.

Various embodiments of the invention have been described. However, one skilled in the art will appreciate that additions or modifications may be made to the described embodiments without departing from the scope of the invention. For example, although routers described herein as controlling data link layer devices have been primarily described as provider edge (SE) routers, the invention is not so limited. Other routers, such as routers within the core of a network, may perform the functions ascribed to SE routers herein. These and other embodiments are within the scope of the following claims.

The invention claimed is:
1. A method comprising:
receiving, with a network device of a packet-based transport network, a request to provide a service to a subscriber device via an access node of an access network, wherein the subscriber device communicates wirelessly with the access node;
accessing, with the network device, a subscriber context associated with the subscriber device in response to receiving the request, wherein the subscriber context defines information for providing the service to the subscriber device;

generating, with the network device, a control message based on the information defined within the subscriber context; and forwarding, with the network device, the control message to the access node to dynamically configure a control object maintained by the access node in accordance with the subscriber context to facilitate packet transmission between the subscriber device and the network device through the access node.

2. The method of claim 1, wherein receiving the request comprises determining whether the request is a first request from the subscriber device for the service, wherein accessing the subscriber context comprises accessing the subscriber context to retrieve the information defining one or more encryption keys based on the determination that the request is the first request from the subscriber device for the service, wherein generating the control message comprises generating a security control message that includes the one or more encryption keys, and wherein forwarding the control message comprises forwarding the security control message to the access node to dynamically configure security information maintained by the access node with the one or more encryption keys to facilitate packet transmission between the subscriber device and the network device through the access node.

3. The method of claim 1, wherein accessing the subscriber context comprises accessing the subscriber context to retrieve the information defining a quality of service (QoS) class for the subscriber device, wherein generating the control message comprises generating a QoS control message that includes the QoS class for the subscriber device, wherein forwarding the control message comprises forwarding the QoS control message to the access node to dynamically configure a QoS profile maintained by the access node with the QoS class to facilitate transmission of packets for the subscriber device between the subscriber device and the network device through the access node in accordance with the QoS class.

4. The method of claim 1, wherein accessing the subscriber context comprises accessing the subscriber context to retrieve the information defining a quality of service (QoS) class for the particular service requested by the request, wherein generating the control message comprises generating a QoS control message that includes the QoS class for the particular service, wherein forwarding the control message comprises forwarding the QoS control message to the access node to dynamically configure a service profile maintained by the access node with the QoS class for the particular service to facilitate transmission of packets corresponding to the particular service for the subscriber device between the subscriber device and the network device through the access node in accordance with the service attributes for the particular service.

5. The method of claim 1, wherein accessing the subscriber context comprises accessing the subscriber context to retrieve the information defining a set of service attributes for the particular service requested by the request, wherein generating the control message comprises generating a service control message that includes the service attributes for the particular service, wherein forwarding the control message comprises forwarding the service control message to the access node to dynamically configure a service profile maintained by the access node with the service attributes for the particular service to facilitate transmission of packets corresponding to the particular service for the subscriber device between the subscriber device and the network device through the access node, in accordance with the service attributes for the particular service.

6. The method of claim 1, wherein receiving a request to provide a service comprises receiving a request from the subscriber device to join or leave a particular multicast group, wherein accessing the subscriber context comprises:

accessing the subscriber context to retrieve the information defining multicast memberships; and determining, based on the multicast memberships, whether the subscriber device is authorized to be a member of the requested multicast group;

wherein generating the control message comprises generating, based on the determination that the subscriber is authorized to be a member of the requested multicast group, a multicast control message that indicates the subscriber device joined or left the multicast group, and wherein forwarding the control message includes forwarding the multicast control message to dynamically configure multicast filter information maintained by the access node to control multicast elaboration by the access node in accordance with the multicasting protocol message.

7. The method of claim 1, further comprising:

receiving, with the network device, an update message from the access node of the access network, wherein the update message informs the network device of changing conditions of the wireless communications between the access node and the subscriber device;

updating, with the network device, the subscriber context based on the update message; and forwarding, with the network device, one or more packets originating from or destined for the subscriber device in accordance with the updated subscriber context to facilitate packet transmission for the subscriber device.

8. The method of claim 7, wherein receiving the update message comprises receiving a status update message that identifies a current status of the wireless communications between the access node and the subscriber device, wherein the current status is indicated as one or more of an attenuation level, a signal-to-noise ratio, or a signal strength, wherein updating the subscriber context comprises:

determining a type of update message as the status update message;

parsing the status update message in accordance with the determined type to extract the current status of the wireless communications; and updating a quality of service (QoS) defined by the subscriber context based on the extracted current status to account for changes to the current status, wherein forwarding the one or more packets comprises forwarding the one or more packets in accordance with the updated QoS.

9. The method of claim 7,
wherein the network device comprises a router,
wherein the access node comprises a current base station,
wherein the access network comprises a wireless network, and
wherein the subscriber device comprises a mobile device.

10. The method of claim 9,
wherein receiving the update message comprises receiving a micro-mobility update message that identifies movement by the mobile device from the current base station to another base station adjacent to the current base station,
wherein updating the subscriber context comprises:
determining a type of update message as the status update message;
parsing the status update message in accordance with the determined type to extract the adjacent base station; and
updating a location defined by the subscriber context to specify the adjacent base station,
wherein forwarding the one or more packets comprises:
establishing, with the router, a virtual data path between the router and the location defined by the subscriber context such that the virtual data path is formed between the router and the adjacent base station;
receiving the one or more packets from the mobile device via the adjacent base station; and
forwarding the one or more packets received via the adjacent base station in accordance with the subscriber context.

11. A method comprising: receiving, with an access node of an access network, wireless signals from a subscriber device; monitoring, with the access node device, the wireless signals to detect a change in wireless communication between the access node and the subscriber device; generating, with the access node, an update message in response to detecting the change in the wireless communication between the access node and the subscriber device; and forwarding, with the access node, the update message to a network device of a transport network so as to facilitate delivery of packets by the network device for a service associated with the subscriber device.

12. The method of claim 11,
wherein monitoring the wireless signals comprises:
analyzing the wireless signals to determine one or more metrics that include an attenuation level, a signal-to-noise ratio, or a signal strength;
comparing the one or more metrics to corresponding one or more thresholds; and
detecting changing conditions in the wireless signals based on the comparison that the one or more metrics exceed the corresponding one or more thresholds,
wherein generating the update message comprises generating a status update message that indicates the changing conditions in a status of the wireless communications, and
wherein forwarding the update message comprises forwarding the status update message to the network device so as to enable the network device to account for the changing conditions in the status of the wireless communications when forwarding the packets for the service associated with the subscriber device.

13. The method of claim 11,
wherein monitoring the wireless signals comprises:
analyzing the wireless signals to determine one or more metrics that include an attenuation level, a signal-to-noise ratio, or a signal strength;
determining based on the metrics whether the change in the wireless signal indicates a micro-mobility event in which the access node transfers management of the wireless communication to an adjacent access node,
wherein generating the update message comprises generating a micro-mobility update message that indicates micro-mobility event and the adjacent access node, and
wherein forwarding the update message comprises forwarding the micro-mobility update message to the network device so as to enable the network device to establish a tunnel between the adjacent access node and the network device prior to the occurrence of the micro-mobility event.

14. The method of claim 11, further comprising:
receiving, with the access node, a request to provide the service provided by the transport network to the subscriber device;
forwarding, with the access node, the request to the network device, wherein the network device maintains a subscriber context defining information for providing the service to the subscriber; and
receiving, with the access node, a control message from the network device; and
dynamically configuring, with the access node, a control object maintained by the access node in accordance with the control message to facilitate packet transmission for the service associated with the subscriber device between the access node and the network device.

15. The method of claim 14,
wherein receiving the control message comprises receiving a security control message that includes one or more encryption keys,
wherein dynamically configuring the control object comprises dynamically configuring security information to include the encryption keys of the security control message to facilitate secure packet transmission for the service associated with the subscriber device between the subscriber device and the network device through the access node, and
the method further comprising:
encrypting and decrypting packets received from and destined for the subscriber device using the one or more encryption keys; and
forwarding the encrypted and decrypted packets to the network device and the subscribe device respectively.

16. The method of claim 14,
wherein receiving the control message comprises receiving a quality of service (QoS) control message that includes a QoS class for the subscriber device,
wherein dynamically configuring the control object comprises dynamically configuring a QoS profile to define a QoS class for the subscriber device to facilitate delivery of packets for the subscriber device by the access node in accordance with the QoS class.

17. The method of claim 14,
wherein receiving the control message comprises receiving a QoS control message that includes a QoS class for the particular service requested by the request,
wherein dynamically configuring the control object comprises dynamically configuring a service profile maintained by the access node with the QoS class for the particular service to facilitate transmission of packets corresponding to the particular service for the subscriber device between the subscriber device and the network device through the access node in accordance with the QoS class for the particular service.

18. The method of claim 14,
wherein receiving the control message comprises receiving a multicast control message that indicates the subscriber device joined a multicast group, and
wherein dynamically configuring the control object comprises dynamically configuring multicast filter information maintained by the access node to control multicast elaboration by the access node in accordance with the multicasting protocol message.

19. The method of claim 11,
wherein the network device comprises a router,
wherein the access node comprises a base station,
wherein the access network comprises a wireless network, and
wherein the subscriber device comprises a mobile device.

20. A router included within a transport network, the router comprising: at least one interface card that receives a request to provide a service to a subscriber device via an access node of an access network, wherein the subscriber device communicates wirelessly with the access node; and a control unit, comprising a hardware processor, that accesses a subscriber context associated with the subscriber device in response to receiving the request, wherein the subscriber context defines information for providing the service to the subscriber device, and generates a control message based on the information defined within the subscriber context, wherein the at least one interface card that forwards the control message to the access node to dynamically configure a control object maintained by the access node in accordance with the subscriber context to between the subscriber device and the network device through the access node.

21. The router of claim 20,
wherein the control unit further determines whether the request is a first request from the subscriber device for the service, accesses the subscriber context to retrieve the information defining one or more encryption keys based on the determination that the request is the first request from the subscriber device for the service, and generates a security control message that includes the one or more encryption keys, and
wherein the at least one interface card forwards the security control message to the access node to dynamically configure security information maintained by the access node with the one or more encryption keys to facilitate secure packet transmission for the subscriber device between the subscriber device and the router through the access node.

22. The router of claim 20,
wherein the control unit accesses the subscriber context to retrieve the information defining a quality of service (QoS) class for the subscriber device, and generates a QoS control message that includes the QoS class for the subscriber device, and
wherein the at least one interface card further forwards the QoS control message to the access node to dynamically configure a QoS profile maintained by the access node with the QoS class to facilitate transmission of packets for the subscriber device between the subscriber device and the router through the access node in accordance with the QoS class.

23. The router of claim 20,
wherein the control unit accesses the subscriber context to retrieve the information defining a quality of service (QoS) class for the particular service requested by the request, and generates a QoS control message that includes the QoS class for the particular service, and
wherein the at one interface card forwards the QoS control message to the access node to dynamically configure a service profile maintained by the access node with the QoS class for the particular service to facilitate transmission of packets corresponding to the particular service for the subscriber device between the subscriber device and the router through the access node in accordance with the QoS class for the particular service.

24. The router of claim 20,
wherein the control unit accesses the subscriber context to retrieve the information defining a set of service attributes for the particular service requested by the request, and generates a service control message that includes the service attributes for the particular service, and
wherein the at one interface card forwards the service control message to the access node to dynamically configure a service profile maintained by the access node with the service attributes for the particular service to facilitate transmission of packets corresponding to the particular service for the subscriber device between the subscriber device and the router through the access node in accordance with the service attributes for the particular service.

25. The router of claim 20,
wherein the at least one interface card receives a request from the subscriber device requesting to join or leave a particular multicast group,
the control unit further accesses the subscriber context to retrieve the information defining multicast memberships, determines, based on the multicast memberships, whether the subscriber device is authorized to be a member of the requested multicast group, and generates, based on the determination that the subscriber is authorized to be a member of the requested multicast group, a multicast control message that indicates the subscriber device joined or left the multicast group, and
wherein the at least one interface card further forwards the multicast control message to dynamically configure multicast filter information maintained by the access node to control multicast elaboration by the access node in accordance with the multicasting protocol message.

26. The router of claim 20,
wherein the at least one interface card further receives an update message from the access node of the access network, wherein the update message informs the router of the wireless communications between the access node and the subscriber device,
wherein the control unit further updates the subscriber context based on the update message, and
wherein the at least one interface card forwards one or more packets originating from or destined for the subscriber device in accordance with the updated subscriber context to facilitate packet transmission for the subscriber device.

27. The router of claim 26,
wherein the at least one interface card receives a status update message that identifies a current status of the wireless communications between the access node and the subscriber device,
wherein the current status is indicated as one or more of an attenuation level, a signal-to-noise ratio, or a signal strength,
wherein the control unit further determines a type of update message as the status update message, parses the status update message in accordance with the determined type to extract the current status of the wireless communications, and updates a quality of service (QoS) defined by the subscriber context based on the extracted current status to account for changes to the current status, and wherein the at least one interface card forwards the one or more packets in accordance with the updated QoS.

28. The router of claim 27, wherein the access node comprises a current base station, wherein the access network comprises a wireless network, and wherein the subscriber device comprises a mobile device.

29. The router of claim 28, wherein the at least one interface card receives a micro-mobility update message that identifies movement by the mobile device from the current base station to another base station adjacent to the current base station, wherein the control unit determines a type of update message as the status update message, parses the status update message in accordance with the determined type to extract the adjacent base station updates a location defined by the subscriber context to specify the adjacent base station and establishes a virtual data path between the router and the location defined by the subscriber context such that the virtual data path is formed between the router and the adjacent base station, and wherein the at least one interface card further receives the one or more packets from the mobile device via the adjacent base station and forwards the one or more packets received via the adjacent base station in accordance with the subscriber context.

30. A base station included within a wireless access network, the base station comprising: at least one wireless interface that receives wireless signals from a subscriber device; a control unit, comprising a hardware processor, that monitors the wireless signals to detect a change in wireless communication between the access node and the subscriber device, and generates an update message in response to detecting the change in the wireless communication between the access node and the subscriber device; and at least one interface card that forwards the update message to a network layer device of a transport network so as to facilitate delivery of packets by the network layer device for a service associated with the subscriber device.

31. The base station of claim 30, wherein the control unit further analyzes the wireless signals to determine one or more metrics that include an attenuation level, a signal-to-noise ratio, or a signal strength, compares the one or more metrics to corresponding one or more thresholds, detects changing conditions in the wireless signals based on the comparison that the one or more metrics exceed the corresponding one or more thresholds, and generates a status update message that indicates the changing conditions in a status of the wireless communications, and wherein the at least one interface card forwards the status update message to the network layer device so as to enable the network layer device to account for the changing conditions in the status of the wireless communications when forwarding the packets for the service associated with the subscriber device.

32. The base station of claim 30, wherein the control unit analyzes the wireless signals to determine one or more metrics that include an attenuation level, a signal-to-noise ratio, or a signal strength, determines based on the metrics whether the change in the wireless signal indicates a micro-mobility event in which the base station transfers management of the wireless communication to an adjacent access node, and generates a micro-mobility update message that indicates micro-mobility event and the adjacent access node, and wherein the at least one interface card forwards the micro-mobility update message to the network layer device so as to enable the network layer device to establish a tunnel between the adjacent access node and the network layer device prior to the occurrence of the micro-mobility event.

33. The base station of claim 30, wherein the at least one wireless interface receives a request to provide the service provided by the transport network to the subscriber device, wherein the at least one interface card forwards the request to the network layer device, wherein the network layer device maintains a subscriber context defining information for providing the service to the subscriber and receives a control message from the network layer device, and wherein the control unit dynamically configures a control object maintained by the access node in accordance with the control message to facilitate packet transmission for the service associated with the subscriber device between the base station and the network layer device.

34. The base station of claim 33, wherein the at least one interface receives a security control message that includes one or more encryption keys, wherein the control unit dynamically configures security information to include the encryption keys of the security control message to facilitate secure packet transmission for the service associated with the subscriber device between the subscriber device and the network layer device through the access node, and encrypts and decrypts packets received from and destined for the subscriber device using the one or more encryption keys, wherein the at least one wireless interface further forwards the decrypted packets to the subscribe device, and wherein the at least one interface card further forwards the encrypted packets to the network layer device.

35. The base station of claim 33, wherein the at least one interface card receives a quality of service (QoS) control message that includes a QoS class for the subscriber device, wherein the control unit dynamically configures a QoS profile to define a QoS class for the subscriber device to facilitate delivery of packets for the mobile device by the base station in accordance with the QoS class.

36. The base station of claim 33, wherein the at least one interface card receives a QoS control message that includes a QoS class for the particular service requested by the request, wherein the control unit dynamically configures a service profile maintained by the base station with the QoS class for the particular service to facilitate transmission of packets corresponding to the particular service for the subscriber device between the subscriber device and the network layer device through the base station in accordance with the QoS class for the particular service.

37. The base station of claim 33, wherein the at least one interface card receives a multicast control message that indicates the subscriber device joined a multicast group, and wherein the control unit dynamically configures multicast filter information maintained by the base station to control multicast elaboration by the base station in accordance with the multicasting protocol message.

38. The base station of claim 30,
wherein the network layer device comprises a router,
wherein the access network comprises a wireless network, and
wherein the subscriber device comprises a mobile device.

39. A network system comprising:
a transport network that includes a router; and
an access network that includes a base station for wirelessly communicating with a mobile subscriber device,
wherein the router comprises:
a first interface card that receives a request to provide a service to the mobile subscriber device via the base station of the access network; and
a first control unit that accesses a subscriber context associated with the mobile subscriber device in response to receiving the request, wherein the subscriber context defines information for providing the service to the subscriber device, and generates a control message based on the information defined within the subscriber context,
wherein the first interface card forwards the control message to the base station, and
wherein the base station comprises:
a second interface card that receives the control message from the router;
a second control unit that stores a control object and, in response to receiving the control message, dynamically configures the control object in accordance with the subscriber context to facilitate packet transmission for the service associated with the subscriber device between the subscriber device and the router through the base station; and
at least one wireless interface that receives wireless signals from the subscriber device that define packets,
wherein the second interface card forwards the packets in accordance with the dynamically configured control object to the router.

40. The network system of claim 39,
wherein the second control unit further dynamically monitors the wireless signals to detect changing conditions in the wireless communication between the base station and the mobile subscriber device, and generates an update message in response to detecting the changing conditions in the wireless communication between the base station and the mobile subscriber device, and
wherein the second interface card forwards the update message to the router so as to facilitate delivery of packets by the router for the service associated with the subscriber device.

41. A non-transitory computer readable storage medium computer-readable storage medium comprising instructions that cause a programmable processor to: receive, with a network layer device of a packet-based transport network, a request to provide a service to a subscriber device via an access node of an access network, wherein the subscriber device communicates wirelessly with the access node; access, with the network device, a subscriber context associated with the subscriber device in response to receiving the request, wherein the subscriber context defines information for providing the service to the subscriber device; generate, with the network device, a control message based on the information defined within the subscriber context; and forward, with the network device, the control message to the access node to dynamically configure a control object maintained by the access node in accordance with the subscriber context to facilitate packet transmission between the subscriber device and the network device through the access node.

42. A non-transitory computer-readable storage medium comprising instructions that cause a programmable processor to: receive, with an access node of an access network, wireless signals from a subscriber device; monitor, with the access node, the wireless signals to detect a change in wireless communication between the access node and the subscriber device; generate, with the access node, an update message in response to detecting the change in the wireless communication between the access node and the subscriber device; and forward, with the access node, the update message to a network device of a transport network so as to facilitate delivery of packets by the network device for a service associated with the subscriber device.

* * * * *